US011219896B2

(12) United States Patent
Chiu et al.

(10) Patent No.: US 11,219,896 B2
(45) Date of Patent: Jan. 11, 2022

(54) SELF-DIGITIZATION OF SAMPLE VOLUMES

(71) Applicant: University of Washington through its Center for Commercialization, Seattle, WA (US)

(72) Inventors: Daniel T. Chiu, Seattle, WA (US); Thomas Schneider, Vancouver (CA); Jason E. Kreutz, Marysville, WA (US)

(73) Assignee: UNIVERSITY OF WASHINGTON THROUGH ITS CENTER FOR COMMERCIALIZATION, Seattle, WA (US)

( * ) Notice: Subject to any disclaimer, the term of this patent is extended or adjusted under 35 U.S.C. 154(b) by 0 days.

(21) Appl. No.: 14/900,926

(22) PCT Filed: Jun. 25, 2014

(86) PCT No.: PCT/US2014/044167

§ 371 (c)(1),
(2) Date: Dec. 22, 2015

(87) PCT Pub. No.: WO2014/210207

PCT Pub. Date: Dec. 31, 2014

(65) Prior Publication Data

US 2016/0354777 A1 Dec. 8, 2016

Related U.S. Application Data

(60) Provisional application No. 61/839,250, filed on Jun. 25, 2013, provisional application No. 61/875,311, filed on Sep. 9, 2013.

(51) Int. Cl.
*B01L 3/00* (2006.01)
*B01L 7/00* (2006.01)
*G01N 27/447* (2006.01)

(52) U.S. Cl.
CPC ......... *B01L 3/50273* (2013.01); *B01L 3/5027* (2013.01); *B01L 3/50851* (2013.01);
(Continued)

(58) Field of Classification Search
USPC .......................... 422/502–504, 506; 436/180
See application file for complete search history.

(56) References Cited

U.S. PATENT DOCUMENTS 4,857,453 A 8/1989 Ullman et al.
5,061,381 A 10/1991 Burd
(Continued)

FOREIGN PATENT DOCUMENTS

CN 1208464 A 2/1999
CN 102187216 A 9/2011
(Continued)

OTHER PUBLICATIONS

Adamo, et al. Microfluidic based single cell microinjection. Lab Chip, Jul. 1, 2008, 8: 1258-1261.
(Continued)

*Primary Examiner* — Dean Kwak
(74) *Attorney, Agent, or Firm* — Christensen O'Connor Johnson Kindness PLLC

(57) ABSTRACT

Devices, systems and apparatuses for the discretization and manipulation of sample volumes are provided. Related methods are also provided.

22 Claims, 27 Drawing Sheets

(52) U.S. Cl.
CPC ......... *B01L 7/52* (2013.01); *B01L 2200/0605* (2013.01); *B01L 2200/0642* (2013.01); *B01L 2200/0673* (2013.01); *B01L 2300/0627* (2013.01); *B01L 2300/0803* (2013.01); *B01L 2300/0864* (2013.01); *B01L 2400/0406* (2013.01); *B01L 2400/0409* (2013.01); *B01L 2400/0487* (2013.01); *G01N 27/44791* (2013.01)

(56) References Cited

U.S. PATENT DOCUMENTS

| | | | |
|---|---|---|---|
| 6,124,138 A | 9/2000 | Woudenberg et al. | |
| 6,499,499 B2 | 12/2002 | Dantsker et al. | |
| 6,706,519 B1 * | 3/2004 | Kellogg | B01F 13/0064 422/64 |
| 7,338,760 B2 | 3/2008 | Gong et al. | |
| 7,390,676 B2 | 6/2008 | Seul et al. | |
| 8,062,903 B2 | 11/2011 | Chiu et al. | |
| 8,277,759 B2 | 10/2012 | Sundberg et al. | |
| 8,926,811 B2 | 1/2015 | Wu | |
| 8,940,147 B1 | 1/2015 | Bartsch et al. | |
| 9,180,453 B2 | 11/2015 | Chiu et al. | |
| 2002/0187072 A1 | 12/2002 | Karp | |
| 2003/0138941 A1 | 7/2003 | Gong et al. | |
| 2003/0138973 A1 | 7/2003 | Wagner et al. | |
| 2003/0152994 A1 | 8/2003 | Woudenberg et al. | |
| 2004/0018116 A1 * | 1/2004 | Desmond | B01L 3/5027 422/502 |
| 2004/0163958 A1 | 8/2004 | Kao et al. | |
| 2004/0219590 A1 | 11/2004 | Dickinson et al. | |
| 2004/0241693 A1 | 12/2004 | Ricoul et al. | |
| 2007/0003443 A1 | 1/2007 | Sandell et al. | |
| 2007/0052781 A1 | 3/2007 | Fraden et al. | |
| 2007/0092924 A1 | 4/2007 | Anderson | |
| 2008/0014589 A1 | 1/2008 | Link et al. | |
| 2009/0071833 A1 | 3/2009 | Gorfinkel et al. | |
| 2009/0169430 A1 * | 7/2009 | Yamamoto | B01L 3/50273 422/72 |
| 2009/0217742 A1 | 9/2009 | Chiu et al. | |
| 2010/0015715 A1 | 1/2010 | Cho et al. | |
| 2010/0041046 A1 | 2/2010 | Chiu et al. | |
| 2011/0053151 A1 | 3/2011 | Hansen et al. | |
| 2013/0065280 A1 | 3/2013 | Park et al. | |
| 2013/0309780 A1 | 11/2013 | Meltzer et al. | |
| 2014/0087386 A1 | 3/2014 | Chiu et al. | |
| 2014/0138312 A1 | 5/2014 | Bunner et al. | |
| 2014/0272981 A1 | 9/2014 | Yamana et al. | |
| 2014/0360877 A1 | 12/2014 | Ramsey et al. | |
| 2016/0096172 A1 | 4/2016 | Chiu et al. | |
| 2018/0364270 A1 | 12/2018 | Chiu et al. | |

FOREIGN PATENT DOCUMENTS

| | | |
|---|---|---|
| JP | 2009-109249 A | 5/2009 |
| KR | 20020096070 A | 12/2002 |
| WO | WO-2007013562 A1 | 2/2007 |
| WO | WO-2007116909 A1 | 10/2007 |
| WO | WO-2008083526 A1 | 7/2008 |
| WO | 2009/139274 A1 | 11/2009 |
| WO | WO-2010019388 A2 | 2/2010 |
| WO | WO-2010019388 A3 | 5/2010 |
| WO | WO-2012033765 A1 | 3/2012 |
| WO | WO-2014210207 A1 | 12/2014 |
| WO | WO-2017007954 | 1/2017 |

OTHER PUBLICATIONS

Biebuyck, et al. Self-Organization of Organic Liquids on Patterned Self-Assembled Monolayers of Alkanethiolates on Gold. Langmuir, 1994, 10: 2790-2793.
European search report and opinion dated Mar. 13, 2014 for EP Application No. 09807058.4.
Extended European search report and opinion dated Jan. 2, 2017 for EP Application No. 14817344.
International search report and written opinion dated Mar. 11, 2010 for PCT/US2009/052299.
International search report and written opinion dated Sep. 23, 2016 for PCT Application No. US-2016041369.
Jackman, et al. Fabricating Large Arrays of Microwells with Arbitrary Dimensions and Filling Them Using Discontinuous Dewetting. Anal. Chem., 1998, 70(11): 2280-2287.
Lorenz et al. "Microfluidic and Optical Systems for the On-Demand Generation and Manipulation of Single Femtoliter-Volume Aqueous Droplets," Anal. Chem. 2006, vol. 78, No. 18, pp. 6433-6439.
Morrison et al. Nanoliter high through quantitative PCR. Nucleic Acids Res 34(18):e123 (2006).
Office action dated Jan. 20, 2017 for U.S. Appl. No. 14/869,871.
Ottesen et al. Microfluidic digital PCR enables multigene analysis of individual environmental bacteria. Science 314(5804):1464-1467 (2006).
Pollack, et al. Electrowetting-based actuation of liquid droplets for microfluidic applications. Appl. Phys. Lett., 2000, 77:1725.
Rossi, et al., Tapered microfluidic chip for the study of biochemical and mechanical response at subcellular level of endothelial cells to shear flow, Lab on A Chip, 2009, 9(10):1403-11.
Sgro et al. "Thermoelectric Manipulation of Aqueous Droplets in Microfluidic Devices," Anal. Chern. 2007, vol. 79, No. 13, pp. 4848-4851.
Shi et al "Droplet-based microfluidic system for individual Caenorhabditis elegans assay" Lab Chip, 2008, 8: 1432-1435.
Unger, et al. Monolithic microfabricated valves and pumps by multilayer soft lithography. Science. 2000; 288:113-116.
Wu, et al., Fabrication of microchannels using polynorbomene photosensitive sacrificial materials, J. of the Electrochemical Society, 2003, 150(9):H205-H213.
International search report and written opinion dated Oct. 20, 2014 for PCT/US2014/044167.
Office action dated Aug. 21, 2017 for U.S. Appl. No. 14/869,871.
Office Action dated Nov. 6, 2017 for CN Patent Application No. 201480042392.6.
Co-pending U.S. Appl. No. 15/741,462, filed Jan. 2, 2018.
U.S. Appl. No. 14/869,871 Office Action dated Jan. 26, 2018.
Chinese office action dated Aug. 1, 2018 for Chinese application No. 201480042392.
Hatch et al. 1-Million droplet array with wide-field fluorescence imaging for digital PCR, Lab on a Chip, 11(22):3838-3845 (2011).
"JP 2016-521913 Office Action dated May 1, 2018 (w/ English translation)".
Notice of allowance dated Jan. 2, 2019 for U.S. Appl. No. 14/869,871.
Office action dated Jul. 24, 2018 for U.S. Appl. No. 14/869,871.
Shen et al. Digital PCR on a SlipChip. Lab Chip 10:2666-2672 (2010).
Song et al. A nanoliter self-priming compartmentalization chip for point-of-care digital PCR analysis, Biomedical Microdevices, 17:64, 8 pages (2015.
Tanaka et al. Hands-Off Prepration of Monodisperse Emulsion Droplets Using a Poly(dimethlsiloxane) Microfluidic Chip for Droplet Digital PCR, Anal. Chem. 87(8):4134-4143 (2015).
European search report with written opinion dated Feb. 5, 2019 for EP Application No. 16821991.
Fourth Office Action dated Aug. 2, 2019, for Chinese Patent Application No. 201480042392.6. (with partial English translation; 25 pages).
Decision of Rejection dated Nov. 1, 2019, for Chinese Application No. 201480042392.6. (22 pages).
Office Action dated Mar. 2, 2020, for Japanese Patent Application No. 2019-066682. (with English translation, 14 pages).
Communication Pursuant to Article 94(3) EPC dated Jun. 8, 2020, for European Patent Application No. 14817344.6. (6 pages).
Notice on Reexamination dated Apr. 21, 2021, with English Translation, in corresponding Chinese Patent Application No. 201480042392.6, 34 pages.

(56) References Cited

OTHER PUBLICATIONS

Communication Pursuant to Article 94(3) EPC dated Mar. 22, 2021, for corresponding European Application No. 14817344.6, 6 pages.

* cited by examiner a)

b)

a)

b)

A) B) C) D) E)

b)

a)

C)

B)

A)

b)

a)

SELF-DIGITIZATION OF SAMPLE VOLUMES

CROSS-REFERENCE

This application is a U.S. National Phase Application under 35 U.S.C. § 371 of International Application No. PCT/US2014/044167, filed Jun. 25, 2014, which claims the benefit of U.S. Provisional Application No. 61/839,250, filed Jun. 25, 2013 and 61/875,311, filed Sep. 9, 2013, which applications are incorporated herein by reference in their entirety for all purposes.

STATEMENT REGARDING FEDERALLY SPONSORED RESEARCH

This invention was made with government support under R21GM103459 awarded by the National Institutes of Health. The government has certain rights in the invention.

BACKGROUND

Discretization of samples into small fluidic harbor-defined volumes is valuable in many chemical and biological applications. Many mechanisms exist to achieve this, highlighting the significance. Nebulizers and agitation based emulsion generators are easy to use, but do not provide sufficient control for many applications. Many methods based on microfluidic technology have been developed that give very precise control, but often involve great complexity and cost.

Thus, there is a need for improved methods, systems and devices for generating discrete volumes of sample for further analysis.

SUMMARY OF THE INVENTION

The present invention provides devices, systems, and apparatuses for use, e.g., in the discretization and manipulation of sample volumes. Related methods are also provided. In various aspects, the present disclosure provides microfluidic devices comprising: a disc-shaped body having a center region and an outer edge, the body being configured for rotating about a central axis and further comprising: a fluid inlet port located in the center region of the disc-shaped body; a flow channel having a proximal end, a distal end, and a flow axis, the flow channel in fluidic communication with the fluid inlet port; a plurality of fluidic harbors in fluidic communication with the flow channel and offset from the flow axis; and a fluid outlet port in communication with the flow channel, wherein the fluid outlet port is located closer to the center region of the disc-shaped body than the distal end of the flow channel.

In various aspects, the present disclosure provides microfluidic devices comprising: a disc-shaped body having a center region, an outer edge and a central axis, the disc-shaped body being configured for rotating about the central axis and further comprising: a fluid inlet port positioned in the center region of the disc-shaped body; a flow channel having a flow axis and an outermost region, wherein the outermost region of the flow channel is the region of the flow channel that is farthest from the center region, and wherein the flow channel is in fluidic communication with the fluid inlet port; a plurality of fluidic harbors in fluidic communication with the flow channel and offset from the flow axis; and a fluid outlet port in fluidic communication with the flow channel, wherein the distance from the center region to the fluid outlet port is smaller than the distance from the center region to the outermost region of the flow channel.

In various aspects, the present disclosure provides methods for introducing a fluid into a microfluidic device, the methods comprising: providing any of the microfluidic devices of the present disclosure and providing a second fluid to a second fluid inlet port of the microfluidic device. In certain aspects, the methods comprise rotating the microfluidic device about its central axis to load the flow channel of the microfluidic device with the second fluid. In other aspects, the methods comprise applying pressure to the second fluid, wherein the pressure is sufficient to urge the second fluid through the flow channel of the microfluidic device. In further aspects, the pressure is a positive or negative pressure.

In various aspects, the present disclosure provides analytical systems comprising: a rotation component configured for rotating any microfluidic device of the present disclosure about its central axis; an optical detection component configured to optically analyze at least one of the fluidic harbors of the microfluidic device; and a processing unit configured for controlling the rotation component and the optical detection component, and configured for storing data generated from the optical detection component.

In various aspects, the present disclosure provides microfluidic devices comprising: a microwell plate comprising a plurality of wells, wherein each of the wells further comprises: a fluid inlet port in fluidic communication with the well; a fluid outlet port in fluidic communication with the well; a flow channel having a flow axis, the flow channel in fluidic communication with the fluid inlet port and the fluid outlet port; and a plurality of fluidic harbors in fluidic communication with the flow channel and offset from the flow axis.

In various aspects, the present disclosure provides methods for introducing a fluid into a microfluidic device, the method comprising: providing a microfluidic device according to the present disclosure; and introducing a first fluid into the flow channel of the microfluidic device.

In various aspects, the present disclosure provides methods for introducing a fluid into a microfluidic device, the method comprising: providing a microfluidic device according to the present disclosure; and introducing a second fluid into the flow channel of the microfluidic device, wherein the second fluid is an aqueous solution.

In various aspects, the present disclosure provides methods for introducing a fluid into a microfluidic device, the method comprising: providing a microfluidic device according to the present disclosure; introducing a first fluid into the flow channel of the microfluidic device; introducing a second fluid into the flow channel of the microfluidic device; introducing a third fluid into the flow channel of the microfluidic device; introducing a fourth fluid into the flow channel of the microfluidic device; and introducing a fifth fluid into the flow channel of the microfluidic device, wherein the first fluid is an oil, the second fluid is an aqueous solution, the third fluid is an oil, the fourth fluid is an oil, and the fifth fluid is an oil, and wherein the first, third, fourth, and fifth fluids are independently the same or different from one another.

In various aspects, the present disclosure provides methods of introducing a fluid into a microfluidic device, the methods comprising: providing a microfluidic device according to the present disclosure; introducing a first fluid into the flow channel of the microfluidic device; introducing a second fluid into the flow channel of the microfluidic device; introducing a third fluid into the flow channel of the microfluidic device; optionally introducing a fourth fluid into the flow channel of the microfluidic device; and optionally introducing a fifth fluid into the flow channel of the microfluidic device, wherein the first fluid is an oil, the second fluid is an aqueous solution, the third fluid is an oil, the fourth fluid is an oil, and the fifth fluid is an oil, and wherein the first, third, fourth, and fifth fluids are independently the same or different from one another.

In various aspects, the present disclosure provides analytical systems comprising: a chamber configured to accept a microfluidic device according to the present disclosure; a fluid pressuring unit configured to apply pressure to the flow channel, the pressure being sufficient to urge the fluid through the flow channels; an optical detection component for optically analyzing at least one of the fluidic harbors of the microfluidic device; and a processing unit configured to control the optical detection component, and being configured to store data generated from the optical detection component.

In various aspects, the present disclosure provides analytical systems comprising: a chamber configured to accept a microfluidic device according to the present disclosure; a fluid introducing component configured to introduce a fluid through at least a portion of a flow channel; an optical detection component configured to optically analyze a fluidic harbor; and a processing unit configured to control the optical detection component, and configured to store data generated from the optical detection component.

In various aspects, the present disclosure provides apparatuses comprising: a flow channel having a flow axis, an upstream end, and a downstream end; and a plurality of fluidic harbors in fluidic communication with the flow channel and offset from the flow axis, wherein each of the fluidic harbors has an upstream and a downstream end, and wherein the flow channel comprises a constriction positioned upstream or downstream of each of the fluidic harbors.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIG. 2*c* shows a bright field image of a region of the device master of one embodiment of the device. FIG. 2*d* shows a fluorescent image of a digitized array of one embodiment of the device design.

FIG. 5*a* shows filling of the device with oil and sample is loaded into the inlet. FIG. 5*b* shows the use of force to drive the sample into the channels where the sample spontaneously partitions into the fluidic harbors. FIG. 5*c* depicts additional oil following the sample through the channel and displacing the fluid in the channel, but not in the fluidic harbors. FIG. 5*d* shows the resulting individual isolated samples. FIG. 5*e* shows a schematic mechanism for the loading of a single fluidic harbor. The fluidic harbor is deeper than the channel, which helps drive sample into the fluidic harbor and keep it contained. A "Greek Key" (GK) drain is used to help displace oil from the fluidic harbor increasing the rate of sample loading.

FIG. 10*a* depicts arrays of fluidic harbors are created by parallel filling of main-channel segments containing n fluidic harbors. The main channels are connected through bifurcations to a single inlet and single outlet. FIG. 10*b* depicts another embodiment has each main channel individually connecting to a large outlet reservoir with each channel experiencing a flow constrictor to serve as a resistor that helps keep flow between channels uniform.

FIG. 18A depicts 24 sets of 304×200 nL fluidic harbor arrays useful for high sensitivity applications due to the relatively large sample volume processed. FIG. 18B depicts 48 sets of 6,050×0.5 nL fluidic harbor arrays useful for higher-resolution applications.

FIG. 21A shows an optical disc motion/tracking system that will serve as a template/model for the SD based loading and imaging system. FIG. 21B depicts a breadboard scale design for a loading and imaging system. FIG. 21C depicts a more compact system that incorporates the motion control components of existing optical disc systems.

DETAILED DESCRIPTION OF THE INVENTION

Figure 1:
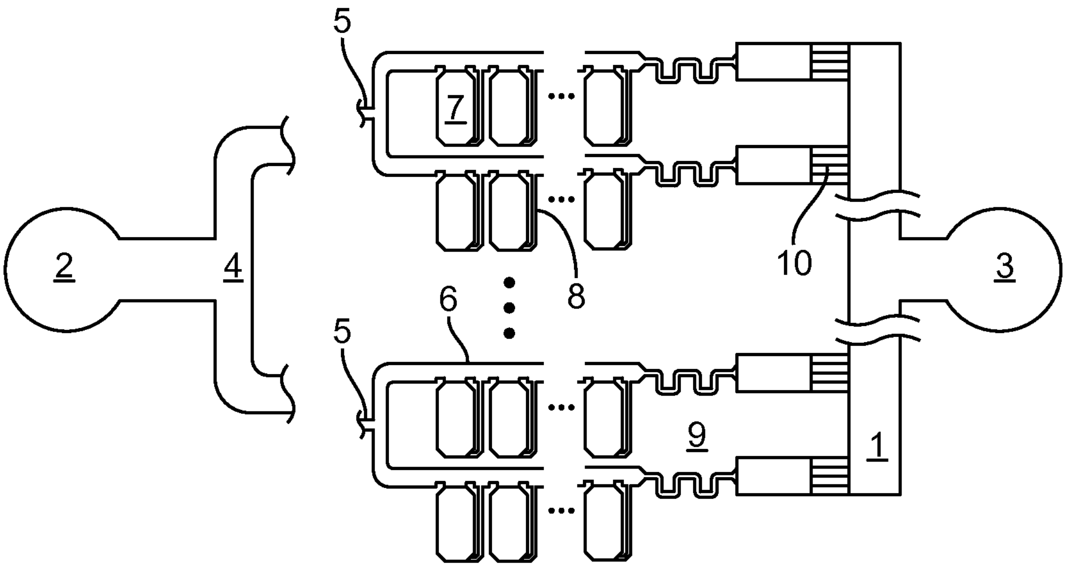
FIG. 1*a* shows an example overview schematic of general self-digitization (SD) design components. These can include, e.g., an outlet reservoir (common fluid reservoir) 1, an inlet/inlet reservoir 2, an outlet 3, inlet channels 4, branching elements 5, main filling channels 6, fluidic harbors 7, drainage channels 8, outlet channels 9 and resistor channels 10.
FIG. 1*b* depicts a simplified version of a device, in accordance with an embodiment of the present invention.
Figure 1:
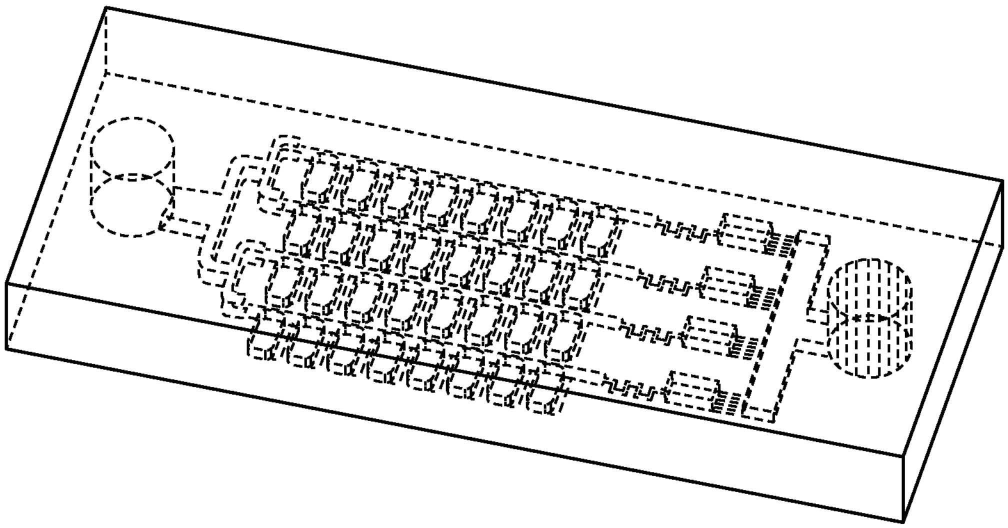

The present invention provides devices, systems and apparatuses for use, e.g., in the discretization and manipulation of sample volumes. Related methods are also provided.

In some embodiments, the present invention provides methods, systems, devices and apparatuses for the discretization (also referred to as digitization), manipulation, and analyses of sample volumes that is robust and versatile. In some aspects, a fluidic device can partition a sample by exploiting the interplay between fluidic forces, interfacial tension, channel geometry, and the final stability of the formed droplet and/or discretized volume. These compartmentalized volumes allow for isolation of samples and partitioning into a localized array that can subsequently be manipulated and analyzed. The devices of the present invention can be filled using a variety of methods, e.g., with either or both centrifugal force or fluidic pressure.

Some embodiments of the present invention can include methods and apparatuses for the analysis of species that include, but are not limited to, chemicals, biochemicals, genetic materials, or biological cells, using fluidic lattices to form fluidic packets. Potential applications for embodiments of the invention include but are not limited to, polymerase chain reaction (PCR), nucleic acid sequence-based amplification (e.g., loop mediated isothermal amplification (LAMP) and nucleic acid sequence-based amplification (NASBA)), crystallization of proteins and small molecules, and the analysis of cells (e.g., rare cells or single cells) or biological particles (e.g., isolated mitochondria) present in biological fluids. In some embodiments, the devices, methods and systems of the present invention can be used for polymerase chain reaction (PCR), reverse transcriptase PCR (RT-PCR), ligase chain reaction (LCR), loop mediated amplification (LAMP) (RT-LAMP), helicase dependent amplification (HDA) (RT-HDA), recombinase polymerase amplification (RPA) (RT-RPA), and/or strand displacement amplification (SDA) (RT-SDA). In certain embodiments, the devices, methods and systems of the present invention can be used for nucleic acid sequence based amplification (NASBA), transcription mediated amplification (TMA), self-sustained sequence replication (3SR), and single primer isothermal amplification (SPIA). Other techniques that can be used include, e.g., signal mediated amplification of RNA technology (SMART), rolling circle amplification (RCA), hyper branched rolling circle amplification (HRCA), exponential amplification reaction (EXPAR), smart amplification (SmartAmp), isothermal and chimeric primer-initiated amplification of nucleic acids (ICANS), and multiple displacement amplification (MDA).

In some aspects, the present invention includes devices for sample volume discretization and manipulation that can be tailored to suit a large variety of different applications and analysis methods. The components of the device can include, e.g., a main, or flow, channel(s) that is/are lined with arrays of adjacent sample compartments. The terms "main channel" and "flow channel" are used interchangeably herein. In one embodiment, the sample compartments can be positioned on and connect to the side of the main channel, and can be referred to as a side-harbor design. In another embodiment, the sample compartments can be at the bottom or top of the main channel, and can be referred to as a bottom-harbor design. The dimensions of the main channel, and the sample compartments can be varied to define the volume of the discretized sample, the compartment locations and the overall array size. The sample compartments, or chambers, that are in fluidic communication with a flow channel are hereafter also referred to as "fluidic harbors." These fluidic harbors can be offset from an axis of flow through the main channel and can be located along a channel that provides shelter from the flow in the channel so that fluidic packets can be formed in the harbors.

As used herein, the term "in fluidic communication with" (and variations thereof) refers to the existence of a fluid path between components, and neither implies nor excludes the existence of any intermediate structures or components, nor implies that a path is always open or available for fluid flow.

Devices and Apparatuses for Self-Digitization of Sample Volumes

In certain embodiments, the inventions of the present disclosure include devices and apparatuses that comprise a plurality of channels, fluidic harbors, and reservoirs. Referring to FIG. 1*a*, the devices of the present invention can include, e.g., reservoirs (1), which can include large chambers used to store oil or aqueous samples near at least one inlet (2) or outlet (3). Reservoirs are optional depending on the design. The devices can also include multiple types of flow channels. For example, the inlet channel(s) (4) is/are where various fluids and sample can be introduced onto the chip. Branching elements (5) can also be used to distribute the fluids and to sample many sets of flow channels and fluidic harbors simultaneously. The main filling channels (6) can deliver the sample to the fluidic harbors (7), and can come in direct contact with the fluidic harbors. In some embodiments, the main channel can have features (e.g., indents or protrusions) to help direct fluid flow and connect it with fluidic harbors. The connection between the main channel and fluidic harbors can also vary depending on the shape, offset and orientation of the fluidic harbor relative to the main channel. Drainage channels (8) can be smaller and connect from the fluidic harbor to the main filling channel to provide a path for oil to drain out during filling. Drainage channels are not always necessary and can have varying complexity, with one or more drainage junctions connected to a given fluidic harbor. Some embodiments with fluidic harbors on the sides of channels utilize drainage channels, while embodiments with fluidic harbors on the bottom/top of channels do not. Outlet channels (9) are capable of delivering any excess sample or oil away from the fluidic harbors to the outlet or outlet reservoir. They can include "resistor" channels (10) to help establish more uniform flow between main channels. They can either connect to the outlet (reservoir) jointly in a de-branching fashion or individually. In some embodiments, the fluidic harbors can be, e.g., connected to both the main channel and any drainage channels. FIG. 1*b* depicts a simplified version of a device of the present invention.

In some aspects, the fluidic harbors can also function to discretize samples via geometric differences between the fluidic harbors and the channels and because of positional differences between the fluidic harbors and the channels (e.g., the fluidic harbors can be offset from the channels).

In certain embodiments, one or more of the fluidic harbor dimensions is greater than a corresponding dimension in the main channel. In such embodiments, the differences between the fluidic harbor dimensions and the corresponding dimensions of the flow channel facilitate the expansion of an aqueous solution loaded on the device into the larger volume of the fluidic harbor. Without being bound by theory, it is believed that this expansion occurs spontaneously because the larger dimensions in the fluidic harbor lowers the interfacial energy between the two fluids relative to what they are in the main channel.

In certain embodiments comprising fluidic harbors above or below the flow channels, the vertical dimension of the fluidic harbors, or height is larger than height of the channel. For embodiments with fluidic harbors on the sides of the main channel, both the vertical and a lateral dimension of the fluidic harbor can be larger than the same flow channel dimensions.

In certain embodiments, the space between the downstream end of one of the fluidic harbors and the upstream end of a downstream fluidic harbor is between 0.1 and 3.0 times the length of the fluidic harbors. In certain preferred embodiments, the space between the downstream end of one of the fluidic harbors and the upstream end of a downstream fluidic harbor is between 0.1 and 1.

In certain embodiments, the width of the flow channel is greater than the width of the fluidic harbors. In certain further embodiments, the difference between the width of the flow channel and the width of the fluidic harbors is between 0.001 and 3 times the width of the fluidic harbors. In certain preferred embodiments, the difference between the width of the flow channel and the width of the fluidic harbors is between 0.01 and 1.5 times the width of the fluidic harbors.

The fluidic harbors can be positioned in many different orientations. In certain embodiments the fluidic harbors are connected to the top/bottom of the main channel. In other embodiments the fluidic harbors are connected to the side of the main channel. In certain embodiments the "long" axis of the fluidic harbor still runs parallel to the main axis, but the harbor is offset from the channel. (The "long" axis refers to the direction of the longest dimension of the fluidic harbor). In certain further embodiments, the ratio of the long axis to the short axis is between 1 and 5.

Figure 2:
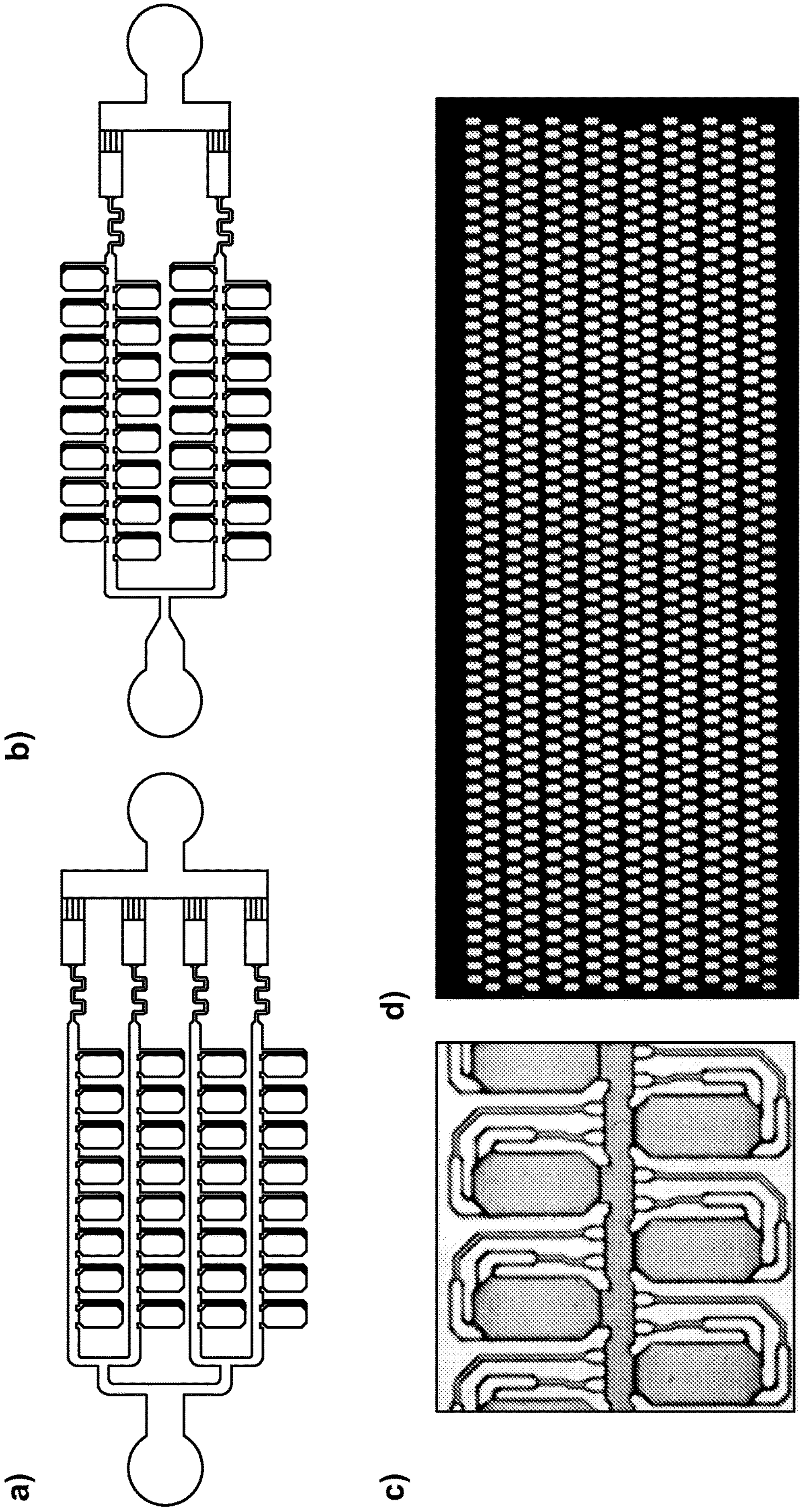
FIGS. 2*a*-2*b* provide simplified schematics showing potential device layout with (FIG. 2*a*) fluidic harbors on a single side of each main channel and (FIG. 2*b*) fluidic harbors on both sides of each main channel.
FIGS. 2*c*-2*d* show a device with fluidic harbors on both sides.

For embodiments with fluidic harbors on the top/bottom of the main channels, the vertical dimension can be increased. For embodiments with fluidic harbors on the sides of the main channel, both the vertical and a lateral dimension can increase. In certain embodiments, the fluidic harbors are located on just one side of the main channel. In other embodiments, the fluidic harbors can be located on two sides of the main channel, as shown, e.g., in FIG. 2*b*. Having fluidic harbors on two sides of the main channel can apply to both side- and bottom-harbor designs, and in certain embodiments fluidic harbors can be positioned on three or four sides. Fluidic harbors can take on various geometries, including but not limited to shape where the cross section is circular, oval, square, rectangular, triangular, or has some other polygonal dimensions. The fluidic harbors can also have rounded or beveled corners and can be asymmetrical in shape.

The fluidic harbors can be positioned in many different orientations. In certain embodiments the fluidic harbors are connected to the top/bottom of the main channel. In other embodiments the fluidic harbors are connected to the side of the main channel. In certain embodiments the "long" axis of the fluidic harbor still runs parallel to the main axis, but the harbor is offset from the channel. (The "long" axis refers to the direction of the longest dimension of the fluidic harbor). In other embodiments the "long" axis of the harbor is perpendicular to the main channel. In other embodiments the "long" axis is positioned at some other angle relative to the main flow axis. A fluidic harbor can also be said to be offset from an axis of flow through the flow channel if a line drawn between the center of harbor and the centerline of the flow channel is longer than the shortest distance between a channel wall and its centerline.

Figure 3:
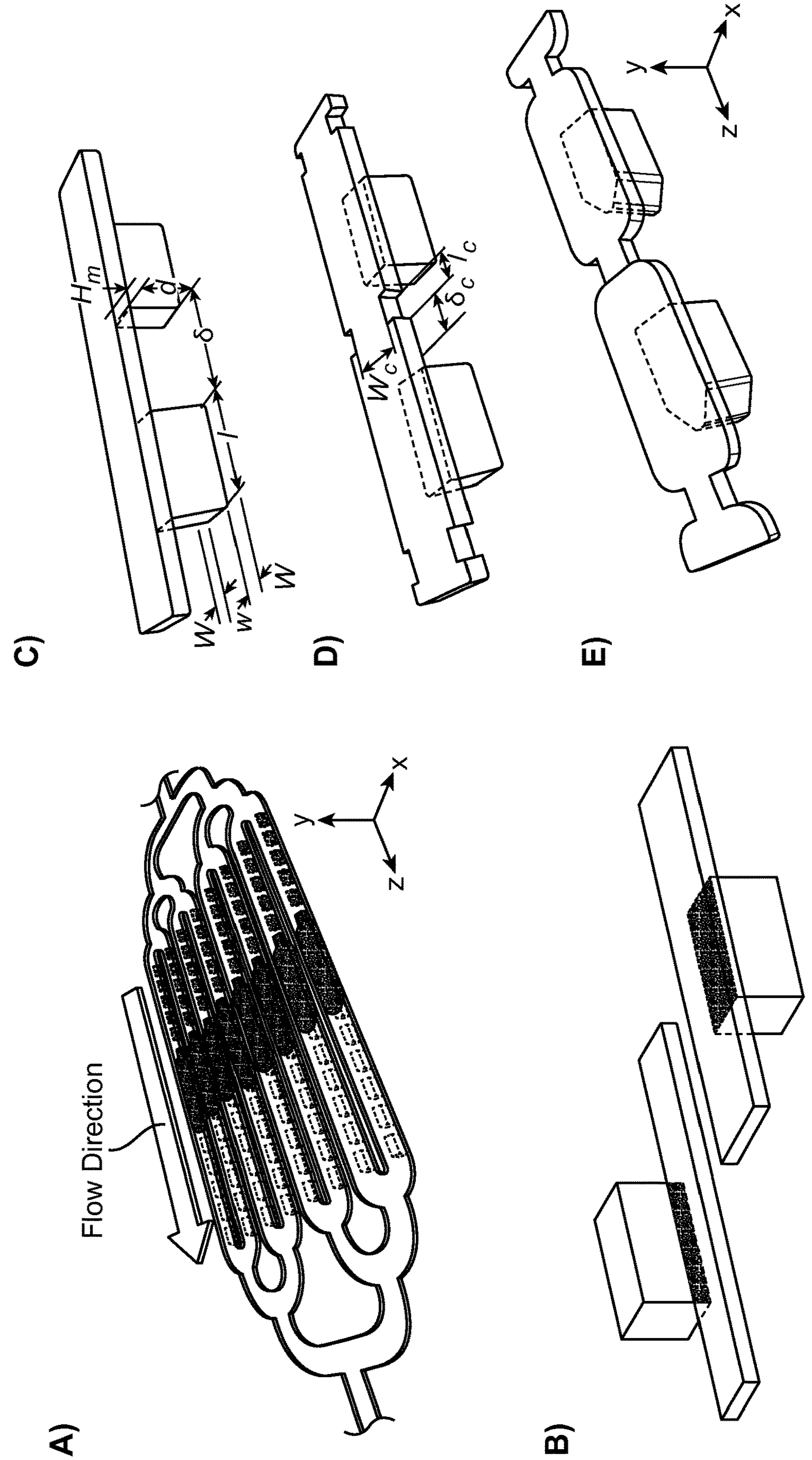
FIG. 3A depicts a scheme of digitization in an SD chip with fluidic harbors positioned on the bottom (or top, if the fluidic harbor/channel or chip is flipped upside down) of the main channel.
FIG. 3B depicts a schematic comparison of devices with fluidic harbors on the side and on the bottom of the main channel. Dark areas indicate the area where the fluidic harbor and channel overlap.
FIGS. 3C-3E depict various embodiments of the device design with bottom-fluidic harbors.
Figure 4:
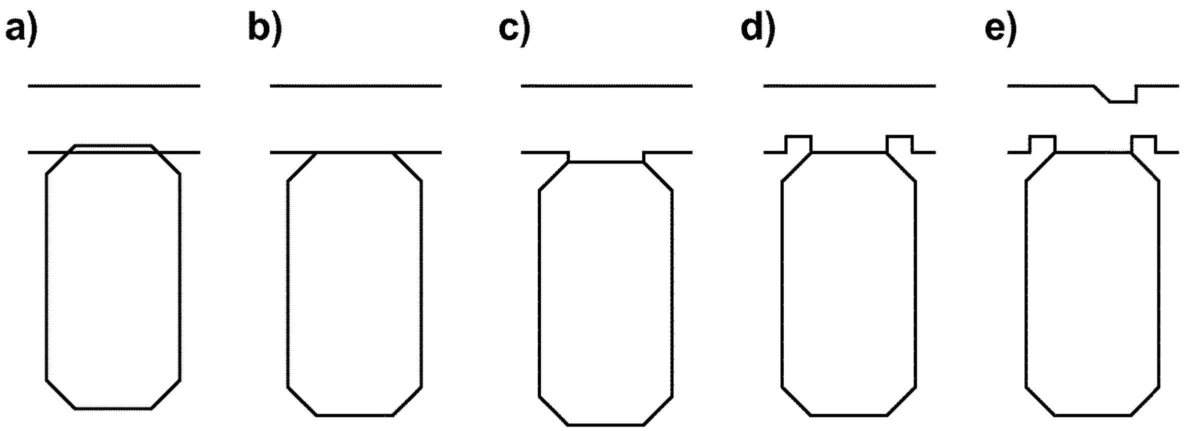
FIGS. 4*a*-4*e* depict different connection geometries between main channel and fluidic harbors, and different features in main channels. The fluidic harbor can overlap with the main channel (FIG. 4*a*), be flush with the main channel (FIG. 4*b*), or connect via a protrusion from the main channel (FIG. 4*c*). Additionally there can be indents on the same side of the main channel (FIG. 4*d*), or the opposite side of the main channel (FIG. 4*e*).
Figure 5:
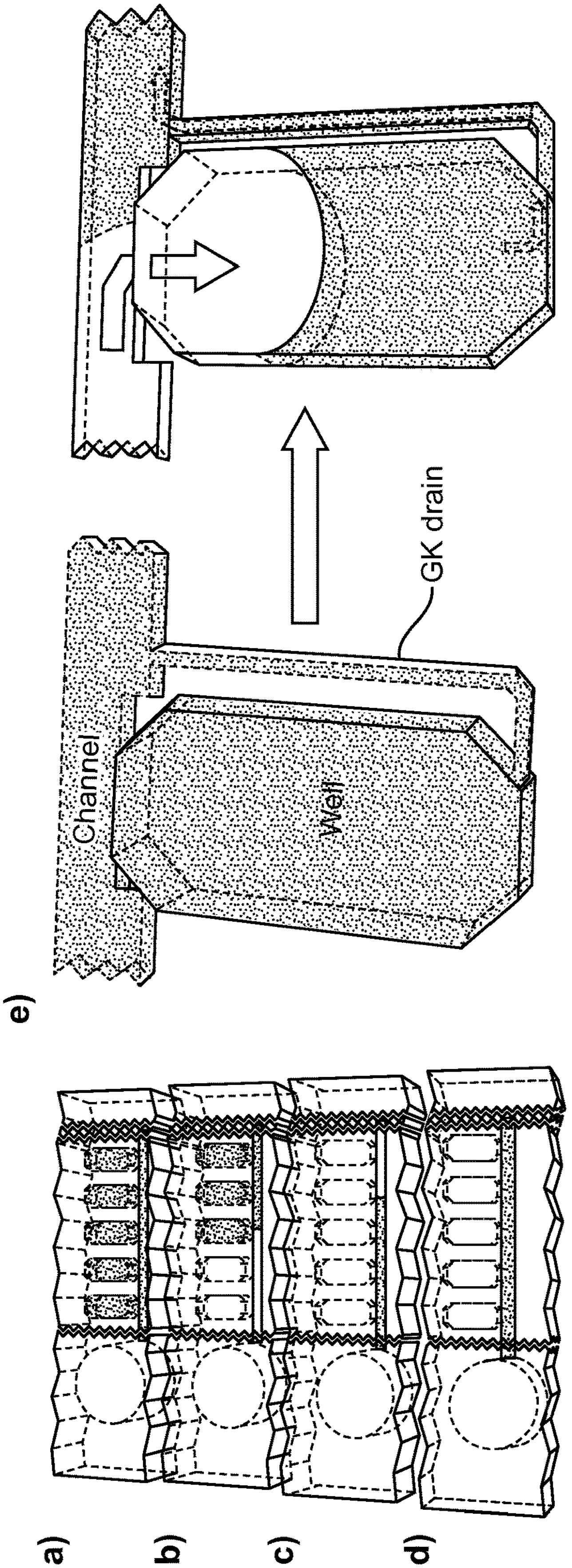
FIGS. 5*a*-5*e* depicts an example stepwise sequence of the self-digitization process of the present invention.

In some embodiments, the main channel can have a constant rectangular cross section. In certain embodiments additional constrictive or expansive features in the flow channel can be used to facilitate transport of sample to fluidic harbors and to discretize samples within the harbors. For example, FIGS. 3A and 3B show fluidic harbors that can be positioned above or below a flow channel in the device. As shown in FIG. 3C-3E, for example, the fluidic harbors and/or the flow channels can be designed to have various dimensions according to a desired application. In certain embodiments the fluidic harbor can overlap with the channel (see, e.g., FIG. 4*a*), in other embodiments the fluidic harbor can be flush with the channel wall (see, e.g., FIG. 4*b*), and in other embodiments the fluidic harbor can be connected to the channel by a protrusion (see, e.g., FIG. 4*c*). Alternatively, or in addition to these connections, indents in the channel can in effect recreate overlap with the channel or the use of a protrusion or a flush meeting of the channel and fluidic harbor, without adjusting the position of the fluidic harbor relative to the main axis of the channel. In certain embodiments these additional channel features (e.g., indents or protrusions) in the channel are used to redirect flow and/or to help isolate fluidic harbors. The indents and protrusions can have various shapes and sizes to suite particular performance requirements. In certain embodiments, such as side-harbor designs, the features can be on the same side of the channel as the connection with the fluidic harbor (see, e.g., FIG. 4*d*). In some embodiments, constrictive or expansive features can be located on the opposite side of the channel (see, e.g., FIG. 4*e*). In other embodiments, there can be features on other channel sides as well. In certain embodiments, such as in bottom-harbor designs, the constrictive or expansive features can be adjacent to the bottom harbors but in the plane of the channel (see, e.g., FIGS. 3D and 3E).

To assist with improved loading, the present invention also includes a microfluidic device that can include, e.g., a body (e.g., a disc-shaped body) having a center region and an outer edge. The body can be configured for rotating about a central axis and can include a variety of components. The body can have a variety of shapes. For example, the body can be generally disc-shaped. The disc-shaped body can be circular, oblate, elliptical, square, or rectangular. The body can have an axis (e.g., a central axis) that can be placed in the disc-shaped body to allow for rotation around the axis.

In some aspects, the microfluidic devices can include one or more fluid inlet ports. The fluid inlet ports can be located in the center region of the disc-shaped body. The devices can also include one or more flow channels. The flow channels can include a proximal end, a distal end, and a flow axis. The flow channels can also be in fluid communication with the fluid inlet port. In some embodiments, the proximal end of the flow channel is near or in the vicinity of the center region and the distal end is located near the outer edge of the body. The location of the fluid inlet ports in the center region of the body can be designed, e.g., such that upon spinning of the disc body fluid will be directed into the flow channels and towards the outer edge of the disc-shaped body. Alternatively, other methods for loading fluid in the channels can also be used, e.g., by pressure loading. The devices can further include a plurality of fluidic harbors in fluid communication with the flow channel and offset from the flow axis. The fluidic harbors are explained in more detail below.

The microfluidic devices of the present invention can also include one or more fluid outlet ports. The fluid outlet ports can be in fluid communication with the flow channel. In some embodiments, the one or more fluid outlet ports can be located closer to the center region of the disc-shaped body than the distal end of the flow channel. The location of the fluid outlet ports can affect loading of the flow channels and fluidic harbors with fluid. In some embodiments, the outlet can be at the same radial position of the inlet, or closer to the exterior or edge of the device than the inlet, or even closer to the interior or center of the device than the inlet. Having the outlet located in the center region rather than near the outer edge of the disc-shaped body can provide, e.g., an additional level of control for loading the flow channels and fluidic harbors.

In some embodiments, the devices described herein can have a disc-shaped body that can have a circular shape and can be configured to be rotated for, e.g., filling of the channels in the devices. In some aspects, the central region and outer edge of the device can be defined according to a radius of the circular disc-shaped body. The disc-shaped body can have a radius extending from the center of the body to the body's outer edge. The center region of the body can be defined according to a position along the radius of the body. For example, the center region can be a circle within the circular disc body. In some embodiments, the center region can include the dead center of a disc-shaped body, e.g., the dead center of a circle. If the radius from the center of the disc body to the outer edge is a length of 1, then the center region can be defined according to a percentage or ratio of that radius of length 1. In certain aspects, the center region on the disc body can be defined by a circle having a radius of between about 0 to less than about 0.8, between about 0.01 to less than about 0.8, between about 0.01 to less than about 0.7, between about 0.01 to less than about 0.6, between about 0.01 to less than about 0.5, between about 0.01 to less than about 0.4, between about 0.01 to less than about 0.3, between about 0.01 to less than about 0.2, or between about 0.01 to less than about 0.1 of the radius of length 1. In some aspects, the center region on the disc body can be defined by a circle having a radius of between about 0.1 to about 0.40, between about 0.2 to about 0.3, between about 0.1 to about 0.3, or between about 0.1 to about 0.2 of the radius of length 1.

As provided herein, one or more fluid outlet ports in the devices can be located in the center region of the disc-shaped body. The fluid outlet ports can be positioned in the same radial position of the fluid inlet ports. For example, the fluid inlet and outlet ports can be positioned in the center region at radial positions of between about 0.05 to less than about 0.50 of the radius of length 1. In some aspects, the center region on the disc body can be defined by a circle having a radius of between about 0.1 to about 0.40, between about 0.2 to about 0.3, between about 0.1 to about 0.3, or between about 0.1 to about 0.2 of the radius of length 1. In some aspects, the device can include one inlet port that is located at the dead center of a device, e.g., a circular device. One or more outlet ports can be coupled to the inlet port and positioned at a variety of radial positions in the device. Alternatively, the fluid outlet ports can be positioned in the center region but at a different radial position of the fluid inlet ports. For instance, the fluid outlet ports can be located at a radial position of 0.1 along the full radius of length 1, and the fluid inlet ports can be located at a radial position of 0.2 along the full radius of length 1. In some embodiments, the fluid outlet ports can be located at a radial position of 0.2 along the full radius of length 1, and the fluid inlet ports can be located at a radial position of 0.1 along the full radius of length 1. In some embodiments, different fluid inlet and outlet ports can be positioned at different radial positions in the center region. For example, one fluid inlet port can be located at a radial position of 0.1 and another fluid inlet port can be located at a radial position of 0.2. One fluid outlet port can be located at a radial position of 0.15 and another fluid inlet port can be located at a radial position of 0.25.

In another aspect, the present invention can also include microfluidic devices that can include one or more microwell plates. The microwell plates can include a plurality of wells (e.g., 96 well plates) that can be designed to provide a fluidic system for, e.g., loading and analysis of samples in each well. In some aspects, the wells can include one or more fluid inlet ports, one or more flow channels, and one or more fluid outlet ports. Each of the components can be in fluidic communication. The wells can also include fluidic harbors that can, e.g., be arranged along one or more of the flow channels that take in samples from the wells.

The wells can be arranged on the devices or microwell plates in a variety of ways. For example, the wells can be arranged in an array format to allow, e.g., for high throughput analysis of the fluidic harbors. In some embodiments, the wells can be arranged in a square matrix array or a rectangular matrix array having a 2:3 ratio or a 3:4 ratio of rows to columns. The microfluidic devices can include any number of wells that can adequately fit on a device, if desired. For example, the number of wells present can be, e.g., 6, 12, 24, 48, 96, 384 or 1536 wells. Other well configurations and numbers can be used.

In various aspects, the present disclosure provides microfluidic devices comprising: a disc-shaped body having a center region and an outer edge, the body being configured for rotating about a central axis and further comprising: a fluid inlet port located in the center region of the disc-shaped body; a flow channel having a proximal end, a distal end, and a flow axis, the flow channel in fluidic communication with the fluid inlet port; a plurality of fluidic harbors in fluidic communication with the flow channel and offset from the flow axis; and a fluid outlet port in communication with the flow channel, wherein the fluid outlet port is located closer to the center region of the disc-shaped body than the distal end of the flow channel.

In various aspects, the present disclosure provides microfluidic devices comprising: a disc-shaped body having a center region, an outer edge and a central axis, the disc-shaped body being configured for rotating about the central axis and further comprising: a fluid inlet port positioned in the center region of the disc-shaped body; a flow channel having a flow axis and an outermost region, wherein the outermost region of the flow channel is the region of the flow channel that is farthest from the center region, and wherein the flow channel is in fluidic communication with the fluid inlet port; a plurality of fluidic harbors in fluidic communication with the flow channel and offset from the flow axis; and a fluid outlet port in fluidic communication with the flow channel, wherein the distance from the center region to the fluid outlet port is smaller than the distance from the center region to the outermost region of the flow channel.

In some aspects, the microfluidic device further comprises a flow cell, wherein the flow cell comprises the fluid inlet port, the fluid outlet port, and a plurality of the flow channels, wherein each of the flow channels is in fluidic communication with the fluid inlet port and the fluid outlet port. In other aspects, the devices comprise a plurality of flow channels configured such that the flow axis of each flow channel is perpendicular to the outer edge of the disc-shaped body. In some aspects, the plurality of flow channels is configured such that the flow channels are arranged in parallel. In certain aspects, at least one of the fluidic harbors is at an angle other than orthogonal to the flow axis.

In some aspects, at least one of the fluidic harbors is at an angle orthogonal to the flow axis. In other aspects, each of the fluidic harbors is in fluidic communication with the flow channel by an opening conduit. In further aspects, at least one of the fluidic harbors further comprises at least one channel in fluidic communication with the flow channel.

In some aspects, the device comprises a material selected from polydimethylsiloxane (PDMS), thermoset polyester (TPE), polymethylmethacrylate (PMMA), polyurethane methacrylate, polyethylene, polyester (PET), polytetrafluoroethylene (PTFE), polycarbonate, parylene, polyvinyl chloride, fluoroethylpropylene, lexan, polystyrene, cyclic olefin copolymers, polyurethane, polyurethane blended with polyacrylate, polyestercarbonate, polypropylene, polybutylene, polyacrylate, polycaprolactone, polyketone, polyphthalamide, cellulose acetate, polyacrylonitrile, polysulfone, an epoxy polymer, a thermoplastic, polyvinylidene fluoride, polyamide, polyimide, glass, quartz, silicon, a gallium arsenide, a silicon nitride, fused silica, ceramic, metal, or a combination thereof.

In certain aspects, at least one of the flow channel and the plurality of fluidic harbors comprise a hydrophobic surface. In other aspects, at least a portion of the disc-shaped body comprises natively hydrophobic or surface-treated polydimethylsiloxane (PDMS), polycarbonate (PC), glycol modified polyethylene terephthalate (PETG), cyclic olefin copolymer (COC), cyclic olefin polymer (COP), polychlorotrifluoroethylene (PCTFE), a multilaminate material, or a combination thereof. In further aspects, at least one of the flow channel and the plurality of fluidic harbors comprise a fluorophilic surface.

In some aspects, the present disclosure provides microfluidic devices that are loaded with a first fluid. In various aspects, the first fluid comprises an oil. In further aspects, the first fluid comprises a fluorinated oil, a hydrocarbon oil, a silicone oil, or a combination thereof.

In some aspects, the microfluidic device further comprises a common fluid reservoir, wherein the common fluid reservoir is in fluidic communication with the distal end of each of the flow channels and wherein the common fluid reservoir is in fluidic communication with the fluid outlet port. In other aspects, the fluid outlet port is located closer to a center of the disc-shaped body than the fluid inlet port. In further aspects, the fluid outlet port is located farther from a center of the disc-shaped body than the fluid inlet port.

In yet further aspects, the fluid outlet port is located as close to a center of the disc-shaped device as the fluid inlet port.

In some aspects, the present disclosure provides microfluidic devices further comprising a plurality of flow cells, wherein each flow cell comprises: a plurality of flow channels; a fluid inlet port; and a fluid outlet port, wherein the fluid outlet port is located closer to the center region of the disc-shaped body than the distal ends of the flow channels.

In other aspects, the present disclosure provides a plurality of flow cells, wherein each flow cell comprises: a plurality of flow channels; a fluid inlet port; and a fluid outlet port, wherein the distance from the center region to the fluid outlet port is smaller than the distance from the center region to an outermost region of the flow channel.

In some aspects, each of the flow cells comprises a plurality of fluid inlet ports, a plurality of fluid outlet ports, or a combination thereof.

In various aspects, the present disclosure provides analytical systems comprising: a rotation component configured for rotating any microfluidic device of the present disclosure about its central axis; an optical detection component configured to optically analyze at least one of the fluidic harbors of the microfluidic device; and a processing unit configured for controlling the rotation component and the optical detection component, and configured for storing data generated from the optical detection component.

In certain aspects, the analytical systems further comprise a plurality of fluid reservoirs each capable of containing a fluid, wherein the plurality of fluid reservoirs is configured to provide the fluid to the fluid inlet port of the microfluidic device. In some aspects, the analytical systems further comprise a heat-control component configured to apply heat to the plurality of fluidic harbors.

In some aspects, the heat control component is configured to heat the plurality of fluidic harbors sufficiently to perform polymerase chain reaction (PCR), isothermal amplification, or a combination thereof.

In some aspects, the analytical systems further comprise a fluid introduction component configured to move a fluid through the flow channel. In certain aspects, the fluid introduction component comprises a source of pressure in fluidic communication with at least one of the fluid inlet ports, wherein the source of pressure is configured to apply positive or negative pressure sufficient to move a fluid through the flow channel, and wherein the positive or negative pressure is selected from a group consisting of: air pressure, pneumatic pressure, hydraulic pressure, or a combination thereof. In other aspects, the fluid introduction component is configured to move a fluid through the flow channel by means of capillary action, wicking, or centrifugal force driven flow.

In some aspects, the optical detection component is configured to analyze the microfluidic device rotating between 50 RPM and 2000 RPM. In certain aspects, the optical detection component comprises a microscope, a laser scanner, an optical disc drive, or a combination thereof.

In some aspects, the rotation component is configured to adjust a speed of rotation of the microfluidic device to match a readout speed of the optical detection component. In certain aspects, the rotation component is configured to rotate the device microfluidic between 50 RPM and 5000 RPM. In further aspects, the analytical systems further comprise an optical disc drive. In other aspects, the optical disc drive is a compact disc (CD) drive, a digital video disc (DVD) drive, a Blu-ray drive, or a modified version thereof, or a combination thereof.

In some aspects, the analytical systems are configured for housing, rotating, and processing a plurality of the microfluidic devices.

In various aspects, the present disclosure provides microfluidic devices comprise: a microwell plate comprising a plurality of wells, wherein each of the wells further comprises: a fluid inlet port in fluidic communication with the well; a fluid outlet port in fluidic communication with the well; a flow channel having a flow axis, the flow channel in fluidic communication with the fluid inlet port and the fluid outlet port; and a plurality of fluidic harbors in fluidic communication with the flow channel and offset from the flow axis.

In some aspects, at least one of the wells comprises a plurality of the flow channels. In other aspects, at least one of the wells comprises a plurality of the fluid inlet ports. In further aspects, at least one of the wells comprises a plurality of the fluid outlet ports. In certain aspects, the plurality of wells is arranged in an array. In further aspects, the plurality of wells is arranged in square matrix array. In yet further aspects, the plurality of wells is arranged in a rectangular matrix array having a 2:3 ratio or a 3:4 ratio of rows to columns. In other aspects, the microfluidic device contains 6, 12, 24, 48, 96, 384 or 1536 wells. In some aspects, at least one of the fluidic harbors is at an angle other than orthogonal to the flow axis. In other aspects, at least one of the fluidic harbors is at an angle orthogonal to the flow axis. In further aspects, each of the fluidic harbors is in fluidic communication with the flow channel by an opening conduit. In some aspects, at least one of the fluidic harbors comprises a channel in fluidic communication with the flow channel.

In some aspects, at least one of the flow channel and the fluidic harbor comprises a hydrophobic surface. In certain aspects, the microfluidic devices of the present disclosure comprise a material selected from polydimethylsiloxane (PDMS), thermoset polyester (TPE), polymethylmethacrylate (PMMA), polyurethane methacrylate, polyethylene, polyester (PET), polytetrafluoroethylene (PTFE), polycarbonate, parylene, polyvinyl chloride, fluoroethylpropylene, lexan, polystyrene, cyclic olefin copolymers, polyurethane, polyurethane blended with polyacrylate, polyestercarbonate, polypropylene, polybutylene, polyacrylate, polycaprolactone, polyketone, polyphthalamide, cellulose acetate, polyacrylonitrile, polysulfone, an epoxy polymer, a thermoplastic, polyvinylidene fluoride, polyamide, polyimide, glass, quartz, silicon, a gallium arsenide, a silicon nitride, fused silica, ceramic, metal, or a combination thereof.

Figure 22A:
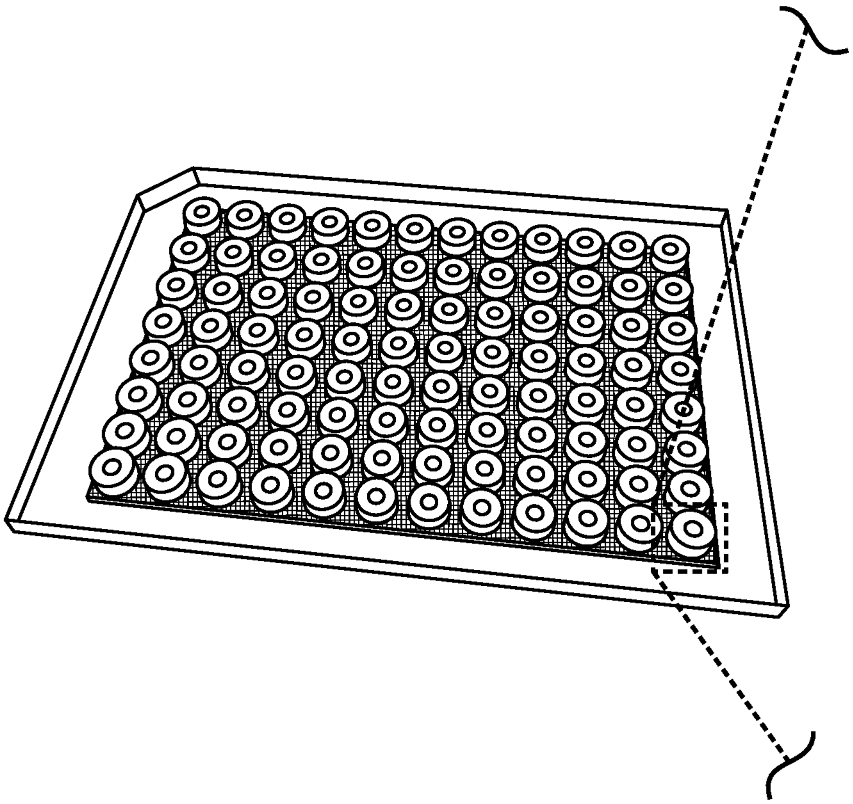
FIG. 22A depicts a fluidic harbor array design compatible with the 96-well plate format for performing SD experiments.
Figure 22B:
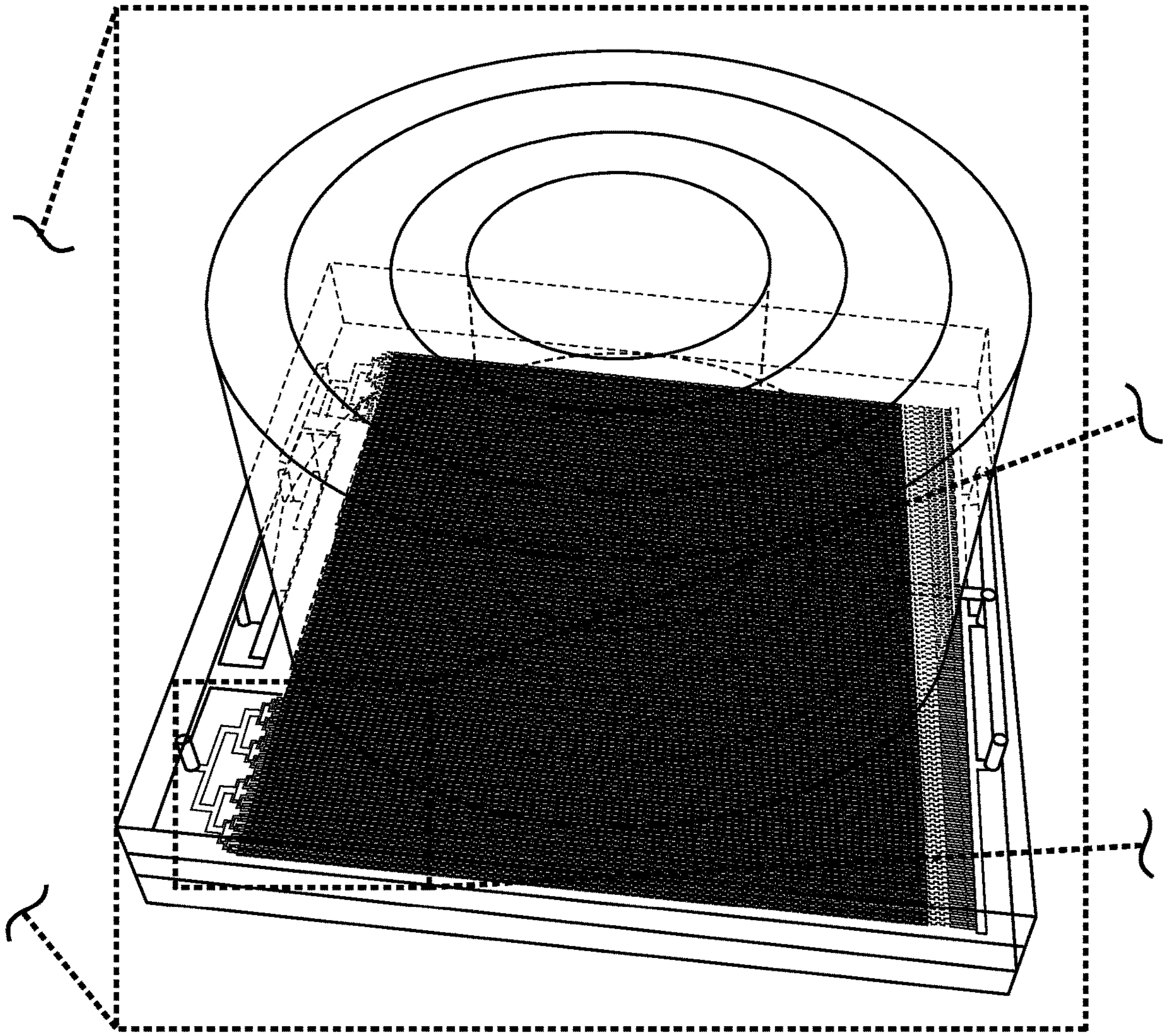
FIGS. 22B-22C depict that each well has an inner region to serve as the inlet and outer region to serve as the outlet, so it would be compatible with commercially existing automated 96-well plate loading systems. The fluidic harbor array is positioned below the well, where >10,000 fluidic harbors that are ~80 pL in volume fit within the footprint of one well of a 96-well plate.

In certain aspects, each well further comprises an inner chamber and an outer chamber, wherein the inner chamber is in fluidic communication with the inlet port and the outer chamber is in fluidic communication with the outlet port. In further aspects, the configuration of the inner chamber and the outer chamber is sufficient to create a non-circular direction of flow through the flow channel. FIG. 22B depicts the inner and outer chambers according to certain aspects.

In some aspects, at least a portion of the device comprises natively hydrophobic or surface treated polydimethylsiloxane (PDMS), polycarbonate (PC), glycol modified polyethylene terephthalate (PETG), cyclic olefin copolymer (COC), cyclic olefin polymer (COP), polychlorotrifluoroethylene (PCTFE), or multilaminate materials to provide a hydrophobic surface for the flow channel, the plurality of fluidic harbors, or a combination thereof.

In certain aspects, the device is loaded with a first fluid, the first fluid comprising an oil. In further aspects, the first fluid comprises a fluorinated oil, a hydrocarbon oil, a silicone oil, or a combination thereof.

Materials for Self-Digitization of Sample Volumes

In certain embodiments, the devices of the present invention can be composed of a material with suitable surface properties to facilitate the digitization process. For example, devices of the present invention can be fabricated from polydimethylsiloxane (PDMS) or/and glass. Other substrate materials can include but are not limited to silicon, thermoset polyester (TPE), polymethylmethacrylate (PMMA), polyurethane methacrylate, polyethylene, polyester (PET), polytetrafluoroethylene (PTFE), polycarbonate, parylene, polyvinyl chloride, fluoroethylpropylene, lexan, polystyrene, cyclic olefin copolymers, polyurethane, polyurethane blended with polyacrylate, polyestercarbonate, polypropylene, polybutylene, polyacrylate, polycaprolactone, polyketone, polyphthalamide, cellulose acetate, polyacrylonitrile, polysulfone, epoxy polymers, thermoplastics, fluoropolymer, and polyvinylidene fluoride, polyamide, polyimide, inorganic materials (glass, quartz, silicon, gallium arsenides, silicon nitride), fused silica, ceramic, glass (organic), metals and/or other materials and combinations thereof.

For biological assays, a device can be based on a polymer material so the device is disposable for one-time use. In some embodiments, a portion of a device of the present invention (e.g., the disc-shaped body) can include natively hydrophobic or surface treated polydimethylsiloxane (PDMS), polycarbonate (PC), glycol modified polyethylene terephthalate (PETG), cyclic olefin copolymer (COC), cyclic olefin polymer (COP), polychlorotrifluoroethylene (PCTFE) and multilaminate materials that can, e.g., provide a hydrophobic surface for the flow channel, the plurality of fluidic harbors, or a combination thereof.

The surface properties of the devices (e.g., channels and/or fluidic harbors) can be tailored for a specific application. For example, some or all surfaces of the devices can be hydrophobic or hydrophilic. In some embodiments, certain surfaces can be hydrophobic and certain surfaces can be hydrophilic. In certain embodiments, some or all of the surfaces can be fluorophilic. The surfaces that are hydrophilic or hydrophobic can be designed so as to allow loading of oils in certain channels and/or fluidic harbors and aqueous solution in certain channels and/or fluidic harbors in the device.

In some embodiments, some or all of the fluidic harbors and/or channels can be modified with chemical or biological reagents to render the surfaces in contact with fluids preferential for wetting by a selected fluid (e.g., either the first or third fluid described above, such as an oil). For example, the surfaces can be modified to allow an oil (e.g., the first fluid) to preferentially wet the channel and the fluidic harbors. This wetting can prime the surface of the device, which can, for example, facilitate discretization because this makes it easier for the first fluid (e.g., an oil) to be drained and displaced by the second fluid (e.g., an aqueous solution) and more difficult for the third fluid (e.g., an oil) to displace the second fluid.

Fluids for Self-Digitization of Sample Volumes

A diverse variety of fluids or liquids can be used with the various devices, systems and methods of the present invention. The various fluids, e.g., can include water-based or aqueous solutions. In some embodiments, the fluids can include liquids that are sparingly soluble in aqueous solutions. For example, the fluids can include oils, such as fluorinated oils, hydrocarbon oils, silicone oils, or mineral oils. Organic solvents can also be used. In some aspects, devices of the present invention can function as at least a two-phase system, utilizing two or more immiscible fluids. For example, a first fluid, e.g., an oil phase fluid, can initially fill a device to displace any air. The first fluid can be selected to preferentially wet the device surface relative to a second fluid. The second fluid, which is typically immiscible with the first fluid, e.g., an aqueous phase containing the sample of interest, can then flow through the device and enter the fluidic harbors, displacing the oil. A third fluid, which can but need not be the same as the first fluid, and which can but need not be miscible with the first fluid, and which is typically immiscible with the second fluid can then be flowed through the device to displace the aqueous phase within the main channels but not the fluidic harbors. In certain aspects, the fluidic harbors can serve as shelters to isolate and digitize individual fluidic packets of the aqueous phase within the fluidic harbors. The fluidic harbors can, though not necessarily required, be substantially occupied by the aqueous phase such that the fluidic packets assume substantially the shape of the fluidic harbor and the volume of the fluidic packet can, essentially, be defined by the dimensions of the harbor. For example, if a fluidic harbor is rectangular shaped, the fluidic packet contained within, should substantially assume a rectangular shape.

In one embodiment, the oil used as the first and/or third fluid is mineral oil based. In another embodiment, it is fluorocarbon based. In another embodiment, the oil is a silicone oil based oil. Other embodiments can use other "oil" phases or alternative materials. The first/third fluid also typically includes a surfactant and/or wetting agent to improve desired interaction with the device surface and with the second fluid. In certain embodiments, the first and the third fluid are identical. While in other embodiments, the first and third fluid can be composed of the same base material, but have different surfactant/additive concentrations or compositions. When a plurality of oils are used in a given method of operation (e.g., the first fluid, the third fluid and/or the fourth fluid), the compositions of the oils can be the same or different. Each of the oil compositions is independently selected regardless of the composition of the other oils in use. While in still other embodiments, the third fluid can be of a completely different composition and can but need not be miscible with the first fluid. In certain embodiments, the first and/or third fluid can contain components that interact with the second fluid and/or components within the second fluid.

In some aspects, a fourth fluid is provided. In further aspects, the fourth fluid comprises an oil, such as a fluorinated oil, a hydrocarbon oil, a silicone oil, or a combination thereof. In still further aspects, a fluid that is compatible with an amplification reaction, such as PCR or isothermal amplification, is used as the fourth fluid. In some aspects, the fourth fluid can be used to displace the third fluid in the flow channel before beginning an amplification reaction to amplify a digitized analyte. The fourth fluid may be miscible or immiscible with any of the first, second and/or the third fluids. In certain aspects, the fourth fluid may be the same as the first fluid.

In some embodiments, a fifth fluid is provided. In some aspects, the fifth fluid comprises an oil, such as a fluorinated oil, a hydrocarbon oil, a silicone oil, or a combination thereof. In certain aspects, the fifth fluid can be used to flush the first, second, third and/or fourth fluid from the device.

In some aspects, any of the first, second, third, fourth and fifth fluids can be provided to a fluid inlet port on the microfluidic device. The first, second, third, fourth and fifth fluids can be provided to the same fluid inlet port or to different fluid inlet ports. In certain aspects, the first, second, third, fourth and fifth fluids are provided to a device in a sequential order that is different from the sequential orders provided herein. The first, second, third, fourth and fifth fluids can be provided to a device in any order, and any of the first, second, third, fourth and fifth fluids may be omitted in some aspects of the method. The sequential orders described herein are exemplary and non-limiting to the practice of the disclosed methods.

In some aspects, the second fluid comprises an aqueous solution. In certain aspects, the methods further comprise providing the first fluid to the fluid inlet port or to a different fluid inlet port on the microfluidic device. In other aspects, the methods further comprise providing a third fluid to the fluid inlet port or to a different fluid inlet port on the microfluidic device, wherein the third fluid comprises an oil. In further aspects, the third fluid comprises a fluorinated oil, a hydrocarbon oil, a silicone oil, or a combination thereof.

In various aspects, the present disclosure provides methods for introducing a fluid into a microfluidic device, the method comprising: providing a microfluidic device according to the present disclosure; and introducing a first fluid into the flow channel of the microfluidic device.

The terms "providing" and "introducing" are used interchangeably herein to refer to the movement of fluid into or through a structure, such as for example an inlet or a channel.

In some aspects, the first fluid comprises an oil. In further aspects, the oil is selected from a fluorinated oil, a hydrocarbon oil, a silicone oil, or a combination thereof.

In various aspects, the present disclosure provides methods for introducing a fluid into a microfluidic device, the method comprising: providing a microfluidic device according to the present disclosure; and introducing a second fluid into the flow channel of the microfluidic device, wherein the second fluid is an aqueous solution.

In some aspects, the second fluid comprises an analyte and the method further comprises performing an analysis of the analyte within at least one of the fluidic harbors. In certain aspects, the analyte comprises a biological material. In further aspects, the biological material is selected from a cell, a bacteria, a virus, a prion, a nucleic acid, a protein, an expressed product of a genetic material, a crystallizing molecule, a particle, or a combination thereof. In yet further aspects, the second fluid comprises a first nucleic acid molecule and a second nucleic acid molecule and the method further comprises distributing the first nucleic acid molecule into a first fluidic harbor, wherein the first fluidic harbor does not comprise the second nucleic acid molecule.

In some aspects, the present methods further comprise introducing a first fluid into the flow channel of the microfluidic device, wherein the first fluid is introduced into the flow channel before the second fluid is introduced into the flow channel. In some aspects, the first fluid comprises an oil. In further aspects, the oil is selected from a fluorinated oil, a hydrocarbon oil, a silicone oil, or a combination thereof.

In some aspects, the methods further comprise introducing a third fluid into the flow channel of the microfluidic device. In certain aspects, the third fluid is introduced into the flow channel after the second fluid is introduced into the flow channel. In other aspects, the first fluid is an oil, the second fluid is an aqueous solution, and the third fluid is an oil.

In some aspects, the methods further comprise introducing a fourth fluid into the flow channel of the microfluidic device. In certain aspects, the fourth fluid is introduced into the flow channel after the first fluid is introduced into the flow channel and before the second fluid is introduced into the flow channel. In other aspects, the fourth fluid is introduced into the flow channel after the second fluid is introduced into the flow channel and before the third fluid is introduced into the flow channel. In some aspects, the fourth fluid is introduced into the flow channel after the third fluid is introduced into the flow channel. In further aspects, the first fluid is an oil, the second fluid is an aqueous solution, the third fluid is an oil, the fourth fluid is an oil, and the fifth fluid is an oil, and wherein the first, third, fourth, and fifth fluids are independently the same or different from one another. In yet further aspects, each of the oils are independently selected from a fluorinated oil, a hydrocarbon oil, a silicone oil, or a combination thereof.

In some aspects, the methods further comprise introducing a fifth fluid into the flow channel of the microfluidic device. In certain aspects, the fifth fluid is introduced into the flow channel after the second fluid is introduced into the flow channel. In other aspects, the fifth fluid is introduced into the flow channel after the third fluid is introduced into the flow channel. In some aspects, the method further comprises introducing a fourth fluid into the flow channel, wherein the fourth fluid is introduced into the flow channel after the first fluid is introduced into the flow channel and before the second fluid is introduced into the flow channel. In certain aspects, the first fluid is an oil, the second fluid is an aqueous solution, the third fluid is an oil, the fourth fluid is an oil, and the fifth fluid is an oil, and wherein the first, third, fourth, and fifth fluids are independently the same or different from one another. In further aspects, each of the oils are independently selected from a fluorinated oil, a hydrocarbon oil, a silicone oil, or a combination thereof.

In certain embodiments, the fluids (e.g., aqueous solutions) herein can contain a variety of analytes that include but are not limited to chemicals, biochemicals, genetic materials (e.g., DNA, RNA, etc.), expressed products of genetic materials (e.g., proteins and/or metabolites), crystallizing molecules, biological cells, exosomes, mitochondria, drugs, biological particles that circulate in peripheral blood or lymphatic systems, rare cells, or particles. Possible aqueous samples that can be used, e.g., as the second fluid, include but are not limited to various PCR and RT-PCR solutions, isothermal amplification solutions such as for LAMP or NASBA, blood samples, plasma samples, serum samples, solutions that contain cell lysates or secretions or bacterial lysates or secretions, and other biological samples containing proteins, bacteria, viral particles and/or cells (eukaryotic, prokaryotic, or particles thereof) among others. In certain embodiments, the aqueous solutions can also contain surfactants or other agents to facilitate desired interactions and/or compatibility with immiscible fluids (e.g., the first/third fluid) and/or the material of the device. In certain embodiments, the aqueous solutions loaded on the devices can have cells expressing a malignant phenotype, fetal cells, circulating endothelial cells, tumor cells, cells infected with a virus, cells transfected with a gene of interest, or T-cells or B-cells present in the peripheral blood of subjects afflicted with autoimmune or autoreactive disorders, or other subtypes of immune cells, or rare cells or biological particles (e.g., exosomes, mitochondria) that circulate in peripheral blood or in the lymphatic system or spinal fluids or other body fluids. The cells or biological particles can, in some circumstances, be rare in a sample and the discretization can be used, e.g., to spatially isolate the cells thereby allowing for detection of the rare cells or biological particles.

In some aspects, an apparatus comprising one or more of the devices disclosed herein is provided.

Methods for Self-Digitization of Sample Volumes

FIGS. 5*a*-5*e* describe an example sequence for loading the fluidic harbors. As shown, the device operation can include providing a first fluid that is shown in darker gray in the reservoir, channel and fluidic harbors. In certain embodiments, the first fluid can include an oil that can be introduced to device, e.g., to displace any air bubbles. In certain embodiments, a second fluid such as an aqueous sample is provided through the inlet/inlet reservoir (see, e.g., FIG. 5*b*), via some loading mechanism, and distributed by the branching inlet to the main channels where it then enters the fluidic harbors, displacing the first fluid (e.g., the oil). In certain embodiments, drainage channels facilitate oil drainage (see, e.g., FIG. 5*e*). After the aqueous sample is loaded, a third fluid, which can be the same oil as the first fluid or a different oil, is provided that displaces the aqueous sample from the channels (see, e.g., FIG. 5*c*), but not the fluidic harbors. This isolates or compartmentalizes the aqueous sample into discrete volumes determined by the fluidic harbor dimensions (see, e.g., FIG. 5*d*). Such isolation or compartmentalization can be characterized as digitization or discretization. The compartmentalized volumes can be referred to as discretized or digitized volumes. In one embodiment, all aqueous sample is compartmentalized into fluidic harbors resulting in "loss-less" filling, though not all fluidic harbors would be fully filled. In another embodiment all fluidic harbors are fully filled, but some sample is lost into the outlet/outlet reservoir.

Drainage channels can impact the rate of oil displacement by the aqueous sample and can impact the device loading rate as well as the completeness of filling of the fluidic harbors. In some embodiments, drainage channels are utilized in side-harbor designs. While side-harbor and bottom-harbor designs can share many similar features, the relative size of the connection between the fluidic harbor and the main channel, as shown, e.g., in FIG. 3B, can affect the rate of oil drainage/fluid exchange. Bottom-harbor designs may not benefit from drainage channels, while side-harbor designs can benefit from their presence.

Figure 6:
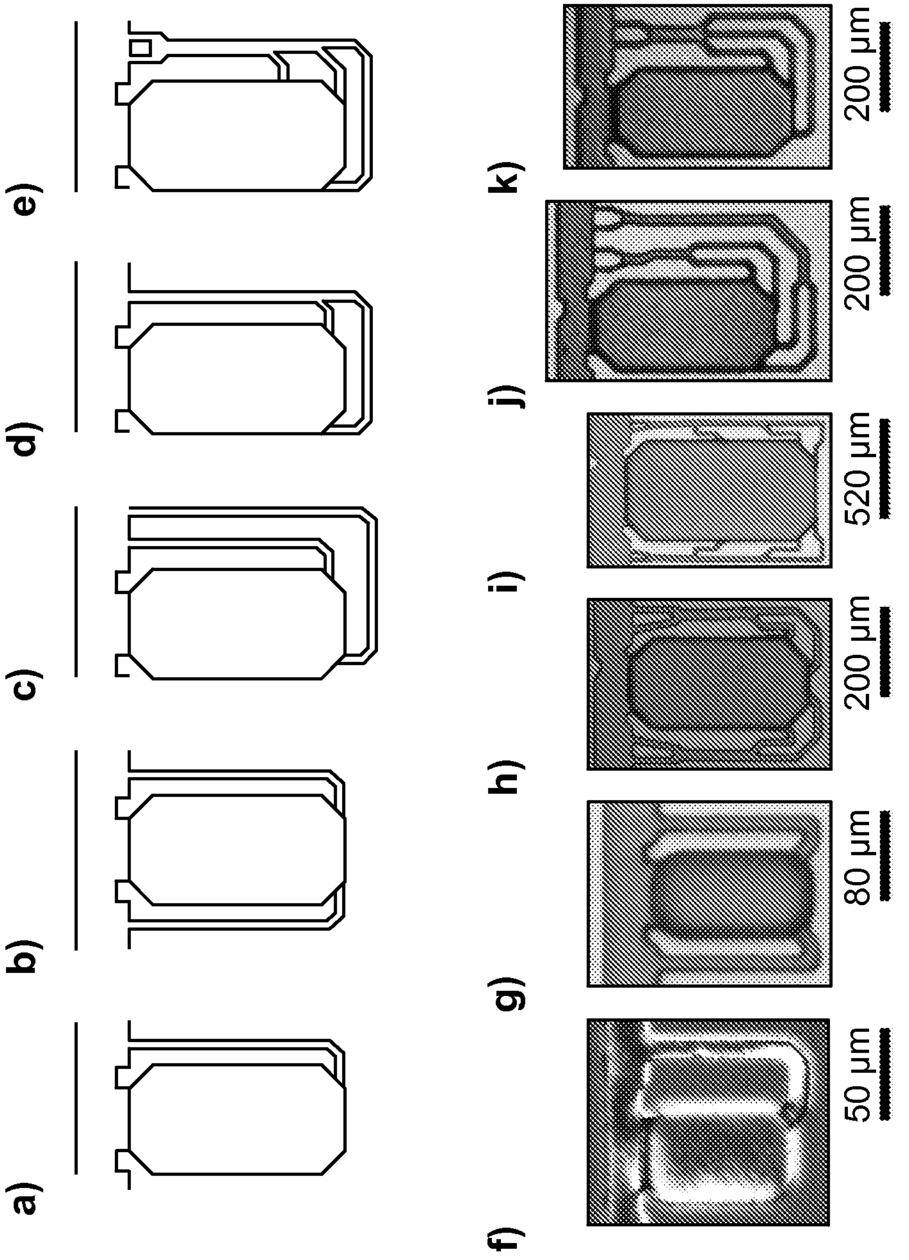
FIGS. 6*a*-6*k* show example drainage/GK channels, in accordance with various embodiments of the present invention.

In certain embodiments, particularly for side-harbor designs, a range of different drainage geometries can be used depending on such parameters as the volume of the fluidic harbor and the flow rate of the samples. For example, FIG. 6*a* depicts a fluidic harbor with a single drainage channel. FIG. 6*b* depicts a fluidic harbor with two drainage channels with one draining on each side of the fluidic harbor. FIG. 6*c* depicts a fluidic harbor with two drainage channels, with both draining down-stream of the fluidic harbor. FIG. 6*d* depicts a fluidic harbor with multiple (two) drainage channels that merge before connecting to main channel. FIG. 6*e* depicts a fluidic harbor with multiple (three) drainage channels that merge before connecting to the main channel, but that branches at the junction with the main channel to maintain small junction geometry. FIG. 6*f* shows a fluidic harbor with a single drainage channel. FIG. 6*g* shows a fluidic harbor with two drainage channels with one draining on each side of the fluidic harbor. FIG. 6*h* shows a fluidic harbor with two sets of drainage channels, with two ports per channel that merge and then split before connecting to the main channel. The channels drain on each side of the fluidic harbor. FIG. 6*i* shows a fluidic harbor with two sets of drainage channels, with three ports per channel that merge and then split into two before connecting to the main channel. The channels drain on each side of the fluidic harbor. FIG. 6*j* shows a fluidic harbor with two sets of drainage channels, with two ports per channel that merge and then split before connecting to the main channel. Both channels drain to the same, downstream, side of the harbor. FIG. 6*k* shows a fluidic harbor with one set of drainage channels, with three ports per channel that merge and then split before connecting to the main channel.

While the smaller interface between the channel and side-harbor designs can involve the use of drainage channels, which can add complexity to the design, it also helps to cleanly isolate fluidic harbors from each other and achieve complete digitization/discretization. For bottom-harbor designs the lack of drainage channels can result in a simpler design, which along with the location of the well within the footprint of the channel, can result in greater density of fluidic harbors. The increased interface can also increase the chance of fluidic connections between harbors. Different embodiments of the design can improve digitization through the introduction of a channel overhang relative to the fluidic harbor width, through the introduction of constrictions in the main channel between fluidic harbors, by adjusting the spacing between fluidic harbors along the channel axis, and by modifying the geometry of the fluidic harbors. FIGS. 3C-3E show, for example, constrictions in the channel. The dimensions of the channels are defined by a main channel height, $H_m$, and width of $W_{main}$=w+2W, wherein W is the overhang of the main channel measured perpendicular to the flow direction (z-direction). Bottom fluidic harbors of width, length and depth (w×l×d) are spaced apart by δ or separated by a constriction of width, $W_c$, and length, $l_c$, placed at a distance of $\delta_c$ before and after each fluidic harbor. The overhang and constrictions in the main channel (FIG. 3D and FIG. 3E) improve isolation of small volumes between fluidic harbors. Altering the dimension and/or shape of the fluidic harbor (compare FIG. 3D and FIG. 3E) can also influence isolation of sample volumes. In the embodiments that incorporate constrictions to the flow channel greater droplet isolation can be achieved.

Figure 7:
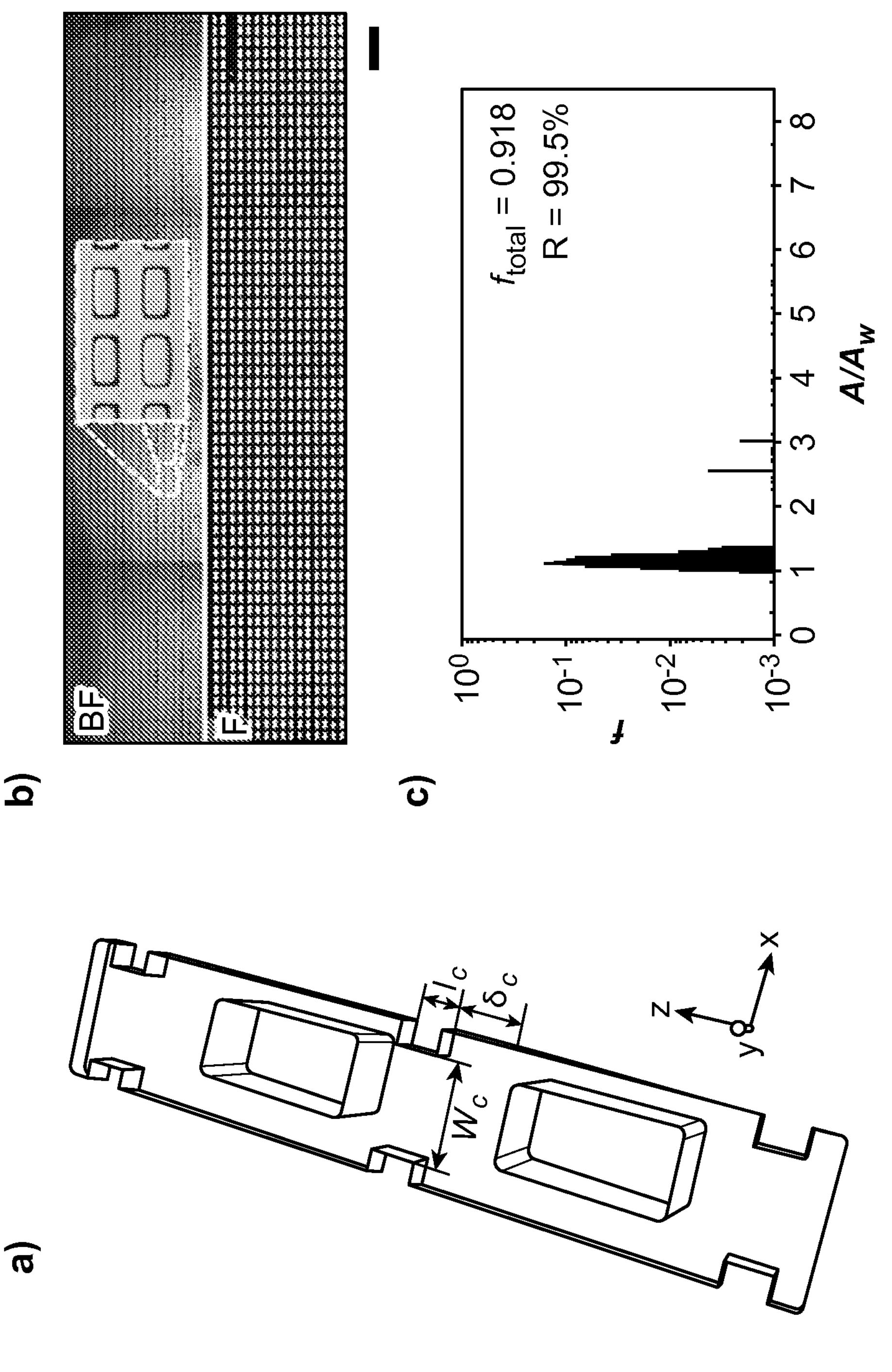
FIGS. 7*a*-7*c* show a summary of example results from device designs with fluidic harbors on the bottom of a main channel that contains restrictions, according to an embodiment of the present invention.
Figure 8:
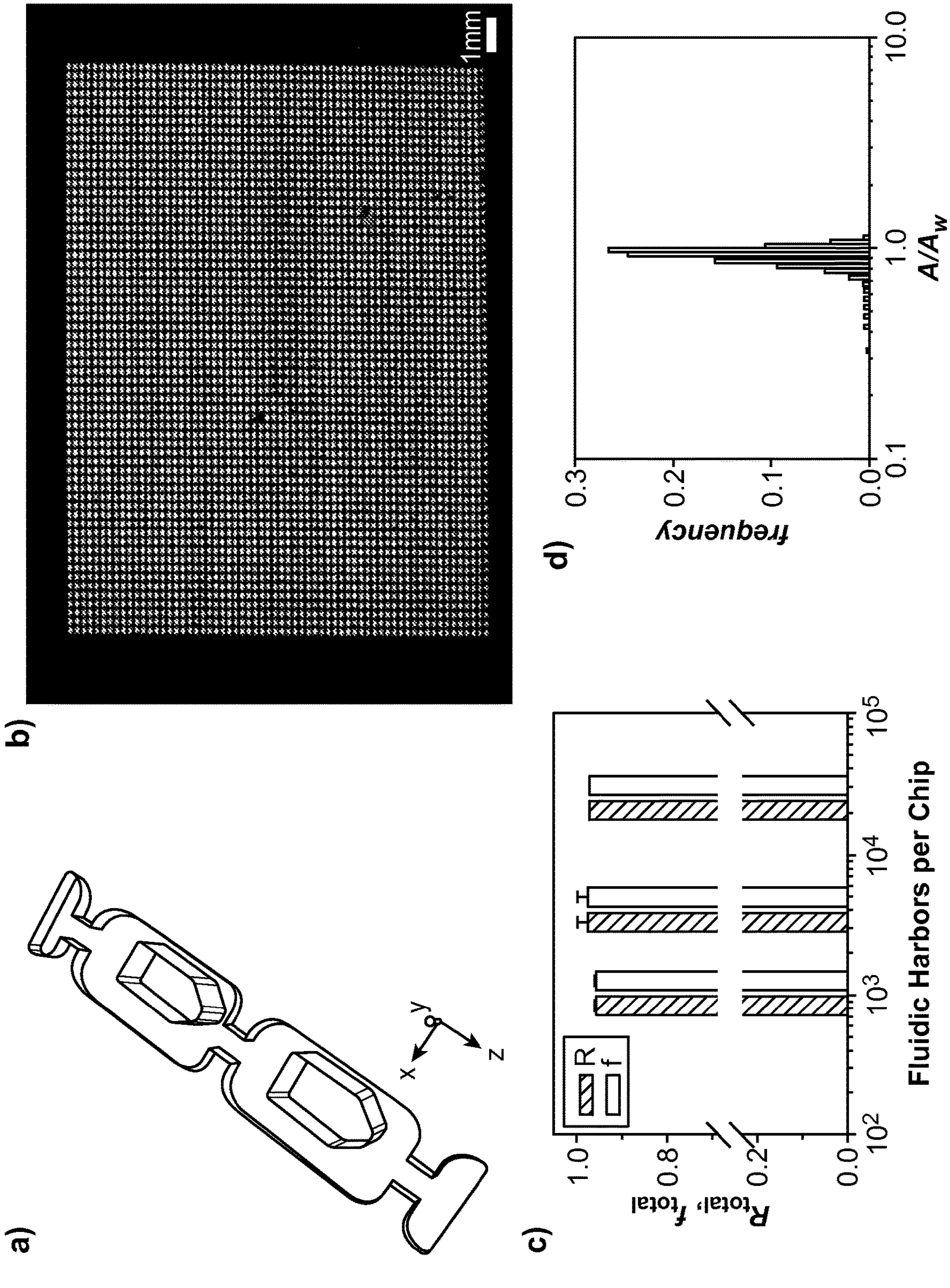
FIGS. 8*a*-8*d* provide a summary of example results, including scale up, for a device with fluidic harbors on the bottom of a constricted main channel and where the fluidic harbors have a tapered geometry, according to an embodiment of the present invention.
Figure 9:
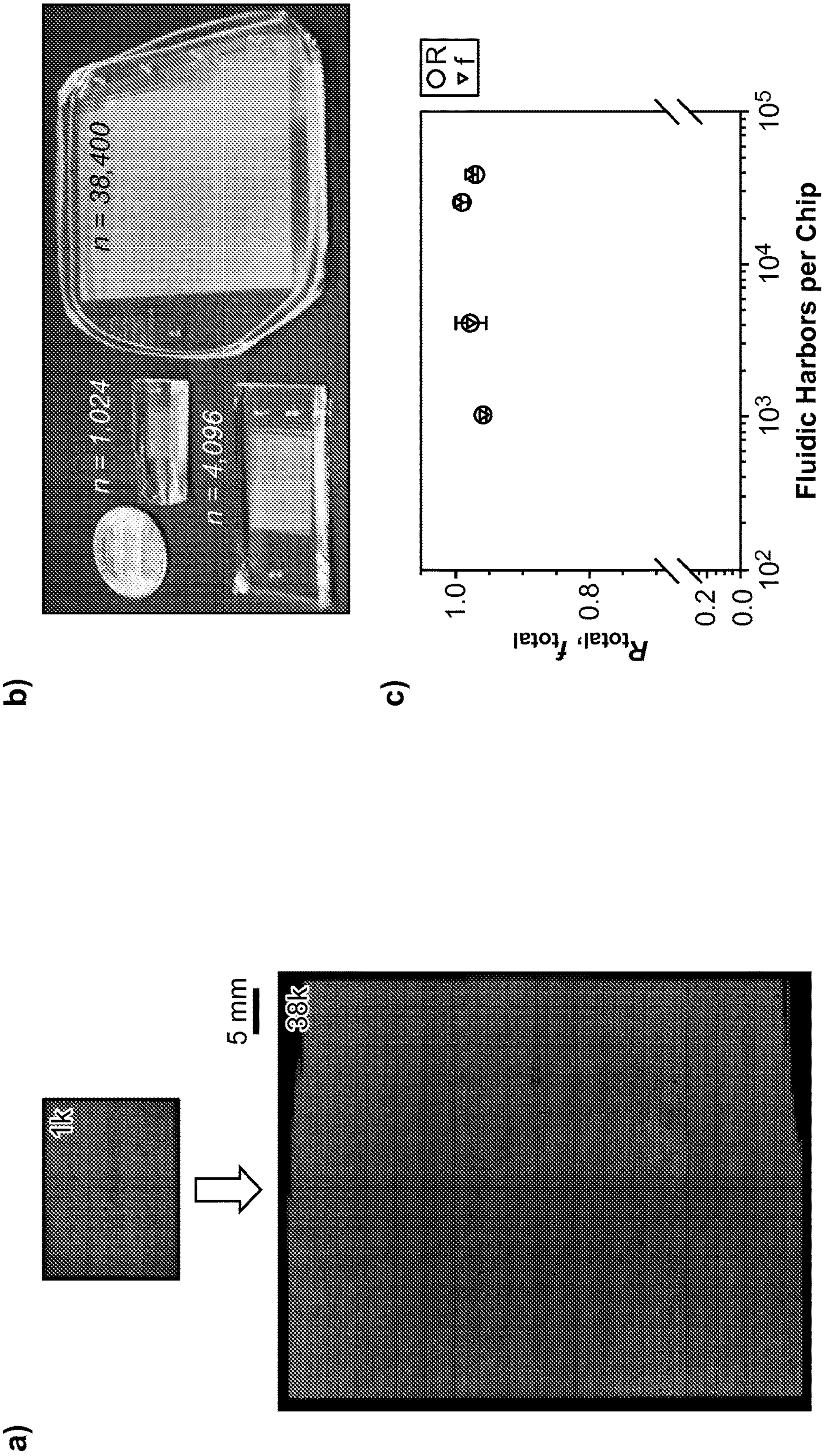
FIGS. 9*a*-9*c* show additional studies of scaling up to greater numbers of fluidic harbors, according to an embodiment of the present invention.

FIGS. 7-9 show various embodiments that depict a high percentage of fluidic harbors being filled in the devices. FIG. 7*a* depicts a schematic of design modifications to the main channel geometry by placing constrictions before and after each fluidic harbor ($\delta_C$). The constrictions have length of $l_C$ and channel width $W_C$. FIG. 7*b* shows brightfield (BF) and fluorescence (F) images of a 1,024 fluidic harbor chip with constrictions in the main channel (lC=$\delta_C$=25 μm, $W_C$=w=100 μm) which was filled at Ca (capillary number) =0.004 and resulted in 99.5% sample retention and 91.8% filling efficiency, $f_{total}$. Scale bar corresponds to 1.0 mm. FIG. 7*c* depicts a histogram of the chip shown in (b) based on analysis for singles, doubles, and multi-fluidic harbor filling. In FIG. 8*a* the constrictions in the main channel were ⅓ of the maximum width and the fluidic harbors had a taper only on the downstream end. FIG. 8*b* shows an example of an SD Chip with 4,096 bottom fluidic harbors ($V_w$=2 nL). FIG. 8*c* shows the sample retention in this example was 99.9% with 98.8% of the fluidic harbors present as individual droplets. FIG. 8*d* provides a comparison of sample retention and filling efficiency in bottom fluidic harbor SD Chips with different numbers of fluidic harbors (e.g., 1,024, 4,096, or 25,600). FIGS. 9*a*-9*c* show devices include from 1,024 up to 38,400 fluidic harbors per array. FIG. 9*a* shows fluorescent images of digitized samples in microfluidic bottom-fluidic harbor chips with 2 nL fluidic harbors and FIG. 9*b* shows photographs of the chip scale-up. FIG. 9*c* provides a summary of retention and digitization efficiency.

Figure 10:
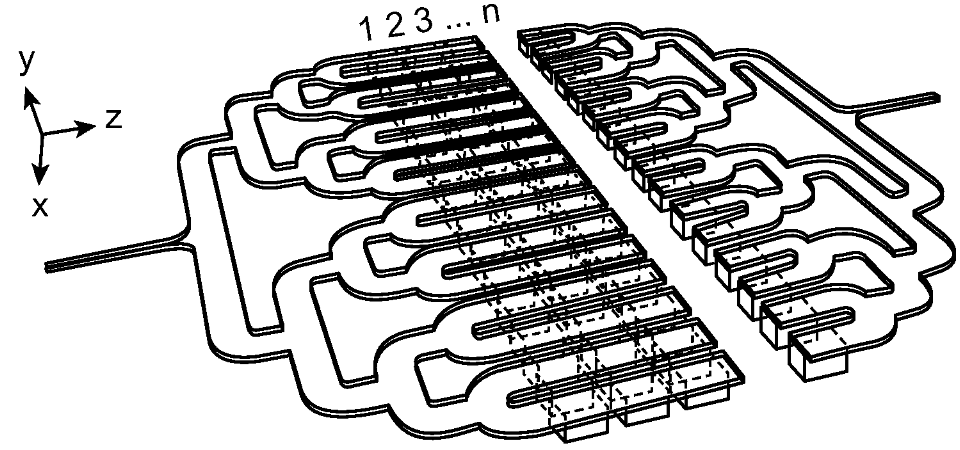
FIGS. 10*a*-10*b* depict device designs with fluidic harbors on the bottom of the channel.
Figure 10:
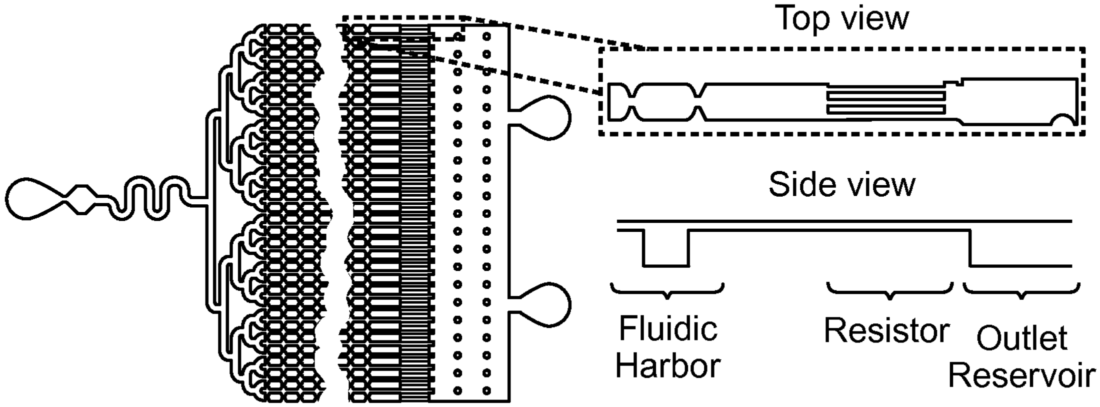

In certain embodiments, an inlet, outlet and the corresponding channels can be used to deliver fluids to the channel/fluidic harbor arrays. In other embodiments, inlet and outlet reservoirs are used to store/collect the fluids prior to and after digitization. In certain embodiments, the inlet/inlet reservoir can lead to a single channel that delivers fluids to all the harbors, where as in other embodiments the inlet can bifurcate/branch into many main channels to parallelize the process and increase throughput of the digitization. Similarly, in certain embodiments the outlet channels can reunite in a debranching fashion into a single outlet (see, e.g., FIG. 10*a*). While in other embodiments, each main channel connects to an outlet channel that individually connects with the outlet (see, e.g., FIG. 10*b*). In certain embodiments, small resistor channels are used that can help create more uniform flow between channels.

Figure 11:
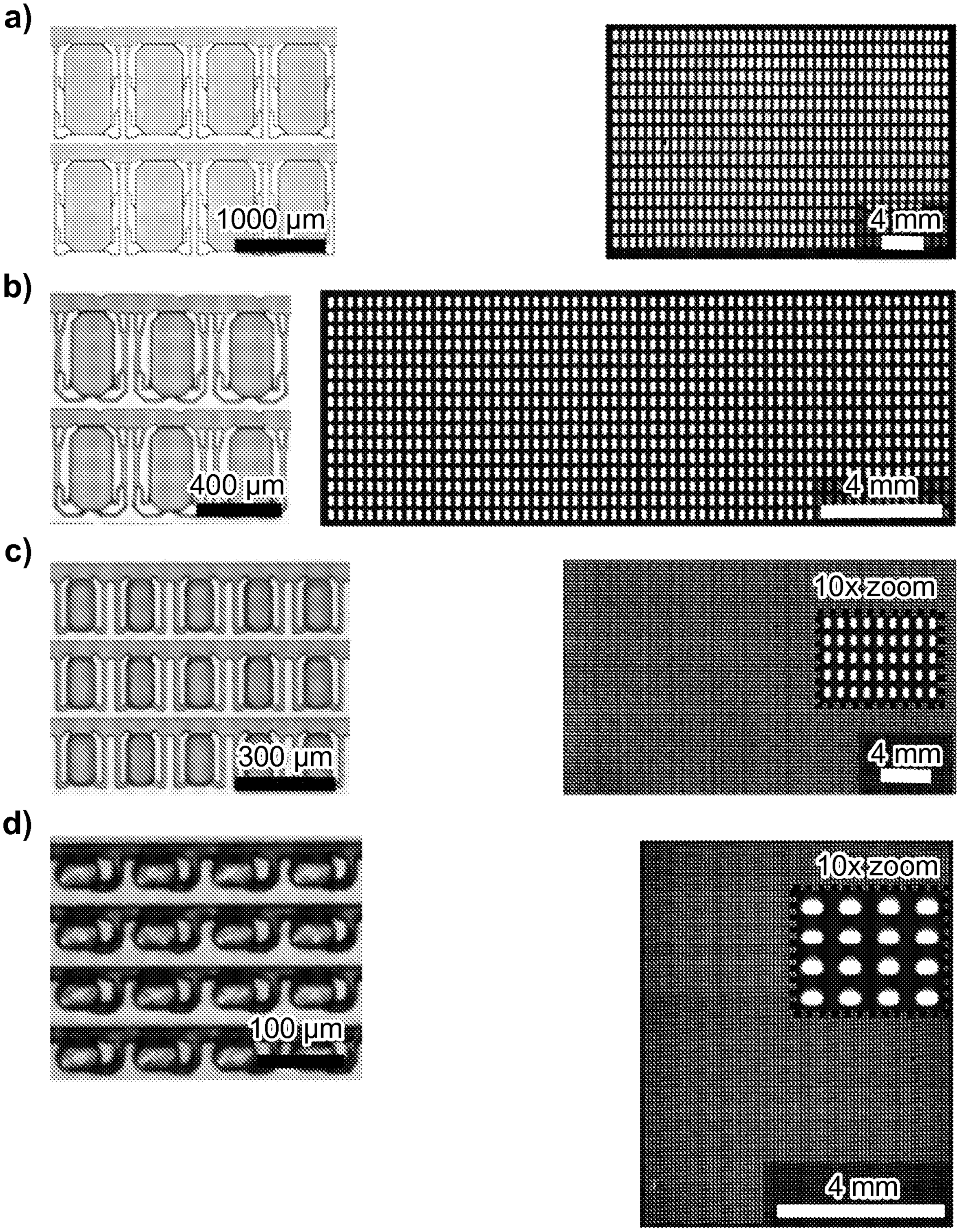
FIGS. 11*a*-11*d* provide images of device masters and loaded devices for several different designs, in accordance with various embodiments of the present invention.

In some embodiments, the present invention further includes methods of filling the devices described further herein. For example, the devices can be simply filled by providing a fluid to one or more of the fluid inlet ports on the device. In certain aspects, the platforms described herein can be robust and a sample can be digitized/discretized over a range of loading conditions. Loading conditions can include but are not limited to the fluid composition, flow rate and flow inducing mechanism. Additionally, different samples can be digitized/discretized using the same or very similar loading conditions. Further, similar conditions can be used to achieve digitization/discretization in devices over a range of fluidic harbor volumes, and/or number of fluidic harbor arrays. See, e.g., FIGS. 9 and 11-14. Discretizations up to ~38,000 per array have been achieved and arrays with discretization volumes from ~50 pL to ~100 nL have been achieved, and with total array volumes ranging from ~0.5 μL to ~60 μL. FIG. 11*a*, for example, shows a design comprised of two sets of GK drains per fluidic harbor with three drain ports per drain, and an array of 640×~100 nL fluidic harbors filled with PCR mix. FIG. 11*b* shows a design comprised of two sets of GK drains per fluidic harbor with two drain ports per drain, and an array of 1024×~8 nL fluidic harbors filled with PCR mix. FIG. 11*c* shows a design comprised of two sets of GK drains per fluidic harbor with one port per drain, and a region of ~10,000×~1 nL fluidic harbors from a larger array. FIG. 11*d* shows a design comprised of one GK drain per fluidic harbor with one port per drain, and an array of 10,240×~50 pL fluidic harbors filled with PCR mix.

Digitization can be achieved using a wide range of channel loading or filling mechanisms. Any suitable channel filling mechanism or channel filling component can be used to move a fluid through the flow channel. Different loading mechanisms include, but are not limited to, syringe pump driven flow, positive pressure or negative (vacuum) pressure driven flow, and by centrifugal force driven flow. In some aspects, loading can be carried out by rotating a microfluidic device herein about its central axis so as to drive fluid loading into channels through centrifugal force. Fluid pressure can also be applied, using e.g., positive or negative pressure, to drive fluid into fluid inlet ports on the device. In other aspects, the channel filling component can be a source of air pressure, pneumatic pressure, hydrodynamic or hydraulic pressure, or the like, or a combination thereof. In further aspects, the source of pressure is in fluidic communication with a fluid inlet port or a fluid outlet port of the device.

Other suitable channel filling mechanisms and components can be used for loading fluids into a device. For example, loading of fluids can be achieved using capillary action. In some aspects, the capillary action is generated using a structure having geometric features that are sufficient to cause a liquid in fluidic communication with the structure to enter the structure due to the surface tension of the liquid and/or adhesive forces between the liquid and an inner surface of the structure. In some aspects this can be achieved using a capillary tube, such as a capillary electrophoresis (CE) tube. In other aspects, capillary action can be generated with a wicking material, such as a filter paper, that transfers a fluid through a flow channel of the device by absorbing the fluid.

As used herein, the term "fluid pressure" means any pressure or force that is capable of inducing a fluid to move in a channel, including, without limitation, a positive or negative air pressure, a pneumatic pressure, a hydrodynamic pressure, a hydraulic pressure, a centrifugal force, capillary action, wicking, an interfacial or surface tension gradient, a thermal gradient, or a combination thereof.

Pressures applied to load the fluids can be tailored for a given chip design. For example, fluid channel dimensions can affect how much pressure is needed to load fluid into a microfluidic device of the present invention. For centrifugal loading, the rate of rotation can be tailored to provide filling of the various structures on the microfluidic devices. In some embodiments, rotation speeds for spinning a device of the present invention can be, e.g., on the order of hundreds to thousands of revolutions per minute (RPMs). In certain aspects, the rates of spinning can range, e.g., between about 1 and 5000 RPM, between about 100 to about 3000 RPM, between about 100 to about 1000 RPM, between about 100 to about 500 RPM, between about 500 to about 2000 RPM, between about 1000 to about 2000 RPM, or between about 500 to about 1500 RPM. In certain aspects, the rates of spinning can range, e.g., between 1 and 500 RPM, between 500 and 1000 RPM, between 1000 and 1500 RPM, between 1500 and 2000 RPM, between 2000 and 2500 RPM, between 2500 and 3000 RPM, between 3000 and 3500 RPM, between 3500 and 4000 RPM, between 4000 and 4500 RPM, or between 4500 and 5000 RPM.

Loading of the different types of fluids and sequences of loading can be carried out using one or more of the fluid inlet ports. In some embodiments, the fluids are loaded through the same fluid inlet port. In alternative embodiments, the fluids can be loaded on all different fluid inlet ports or some fluids can be loaded in one fluid inlet port and some fluids can be loaded in different fluid inlet ports.

Figure 12:
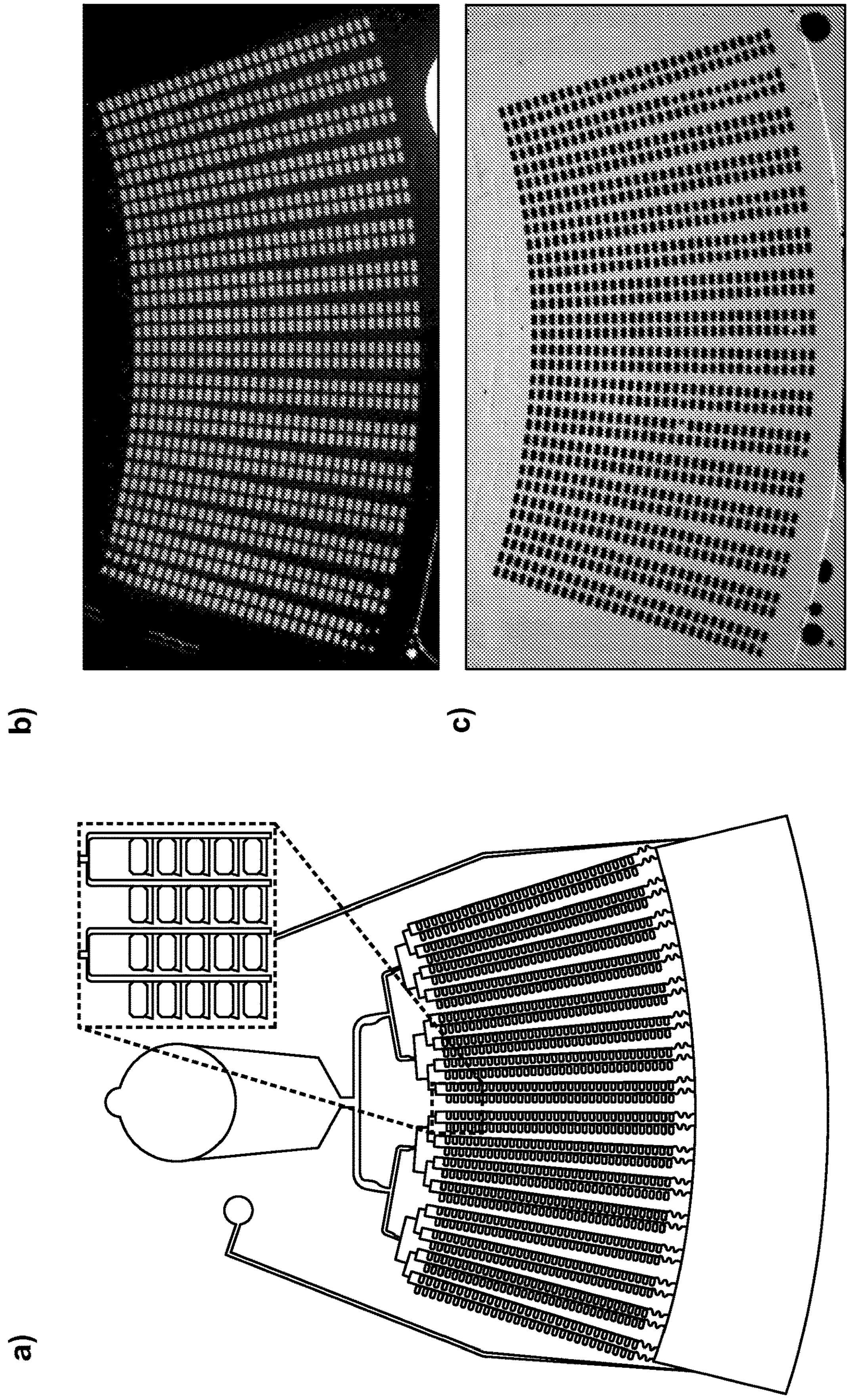
FIG. 12*a* depicts a centrifugal design with fluidic harbors positioned in a radial fashion (with main channels perpendicular to the outer edge of the disc-shaped body of the device) and with outlet port or ports positioned at an interior location near the inlet port, with individual channel outlets. The zoom shows the design of the drainage channels.
FIG. 12*b* shows a fluorescent image of device filled with PCR mix.
FIG. 12*c* shows a bright field image of device filled with PCR mix containing food dye.
Figure 13:
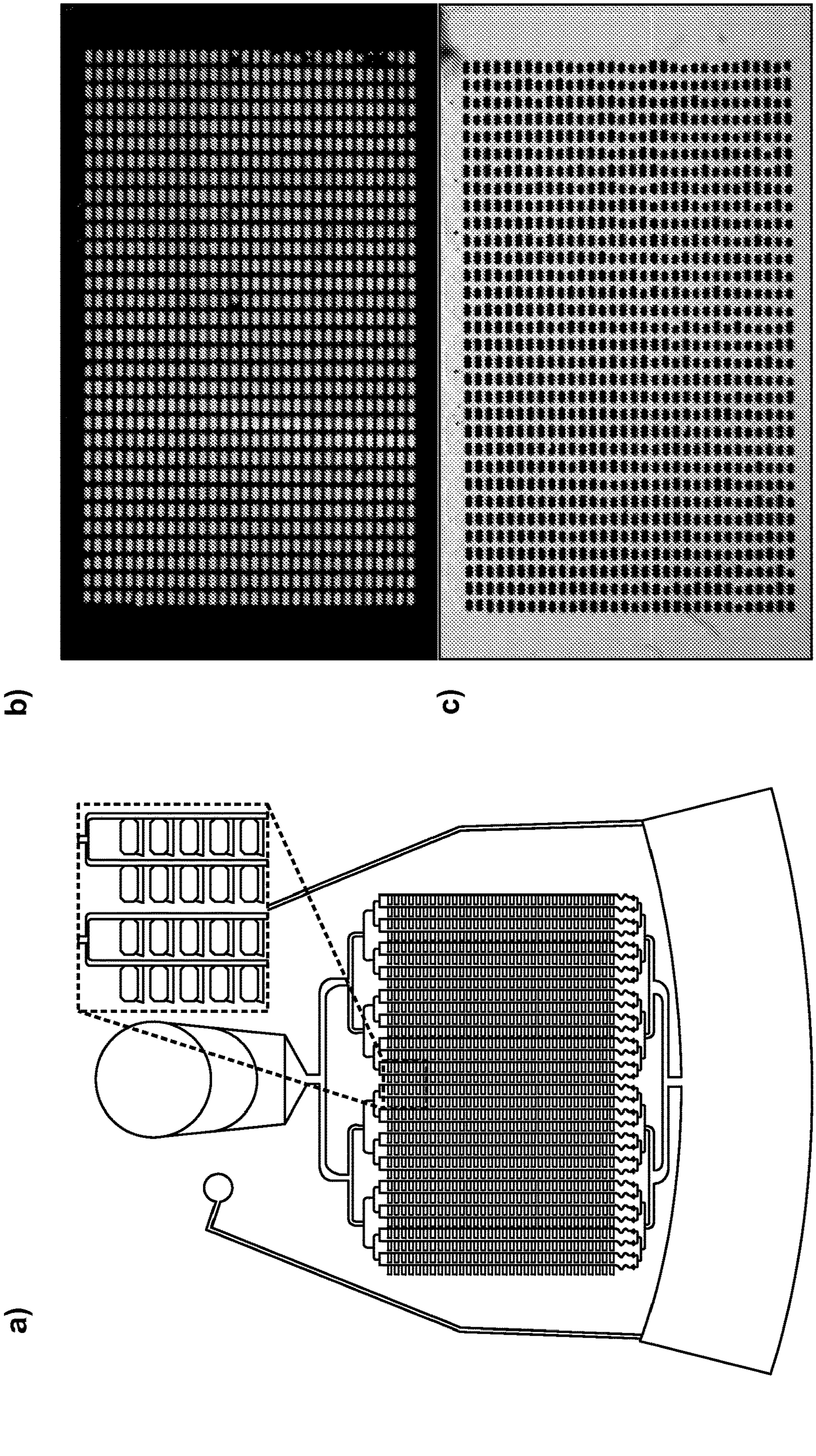
FIG. 13*a* depicts a centrifugal design with fluidic harbors positioned in a linear array (with main channels parallel to each other) and with outlet port or ports positioned at an interior location near the inlet port, with reconnecting channel outlets. The zoom shows the design of the drainage channels.
FIG. 13*b* shows a fluorescent image of device filled with PCR mix.
FIG. 13*c* shows a bright field image of device filled with PCR mix containing food dye.
Figure 14:
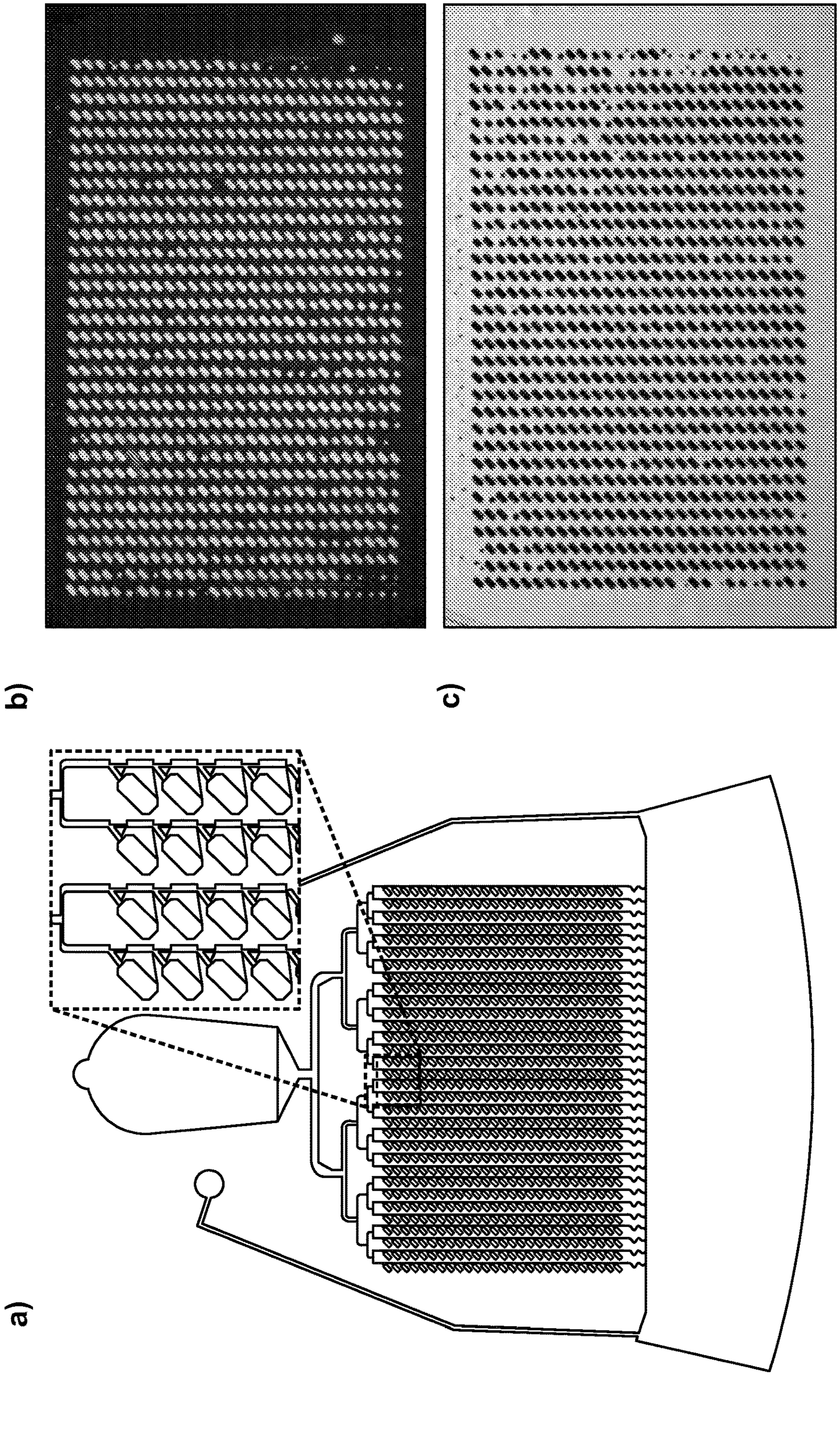
FIG. 14*a* depicts a centrifugal design with fluidic harbors that are at a 45° angle to the main channel and positioned in a linear array (with main channels parallel to each other) and with outlet port or ports positioned at an interior location near the inlet port, with reconnecting channel outlets. The zoom shows the design of the drainage channels.
FIG. 14*b* shows a fluorescent image of device filled with PCR mix.
FIG. 14*c* shows a bright field image of device filled with PCR mix containing food dye.

The present invention provides a variety of device embodiments that can be filled using the various loading mechanisms described herein. For example, FIG. 12*a* depicts a centrifugal design with fluidic harbors positioned in a radial fashion and with outlet port or ports positioned at an interior location near the inlet port, with individual channel outlets. The zoom shows the design of the drainage channels. FIG. 12*b* shows a fluorescent image of device filled with PCR mix. FIG. 12*c* shows a bright field image of device filled with PCR mix containing food dye. FIG. 13*a* depicts another centrifugal design with fluidic harbors positioned in a linear array (with main channels parallel to each other) and with outlet port or ports positioned at an interior location near the inlet port, with reconnecting channel outlets. The zoom shows the design of the drainage channels. FIG. 13*b* shows a fluorescent image of device filled with PCR mix. FIG. 13*c* shows a bright field image of device filled with PCR mix containing food dye. In some device aspects (e.g., FIGS. 12 and 13), at least one of a plurality of fluidic harbors is at an angle orthogonal to the flow axis. In other device embodiments (e.g., FIGS. 12 and 13), at least one of a plurality of fluidic harbors is at an angle other than orthogonal to the flow axis (e.g., FIG. 14). FIG. 14*a* depicts another centrifugal design with fluidic harbors that are at a 45° angle to the main channel and positioned in a linear array (with main channels parallel to each other) and with outlet port or ports positioned at an interior location near the inlet port, with reconnecting channel outlets. The zoom shows the design of the drainage channels. FIG. 14*b* shows a fluorescent image of device filled with PCR mix. FIG. 14*c* shows a bright field image of device filled with PCR mix containing food dye. Various modifications to these embodiments can be made.

In some embodiments, the present invention includes methods for conducting polymer chain reactions in the devices described further herein. PCR can be carried out in a variety of ways. In one aspect, fluid including a plurality of nucleic acid molecules can be loaded in the devices using a suitable loading mechanism. The nucleic acid molecules can be distributed amongst fluidic harbors arranged in the devices, such that e.g., at least one nucleic acid molecule is present in at least some of the fluidic harbors. In some embodiments, the nucleic acid molecules can be distributed amongst fluidic harbors arranged in the devices, such that no more than one nucleic acid molecule is present in at least some of the fluidic harbors. The number of nucleic acid molecules in each fluidic harbor can depend, e.g., on the concentration of the nucleic acid molecules in the loaded sample and/or the size of the fluidic harbors. After loading and fluidic isolation of the nucleic acid molecules, PCR can be conducted on chip. Reagents for performing PCR on the nucleic acid molecules can also be present in the sample that is loaded on the device. The heating component of the analytical system can then be used to cycle through temperature cycles for performing PCR. Given the distribution of the nucleic acid molecules in the devices, digital PCR can also be performed and applied to a variety of applications that can be used, e.g., for biological and/or chemical analysis.

Figure 15:
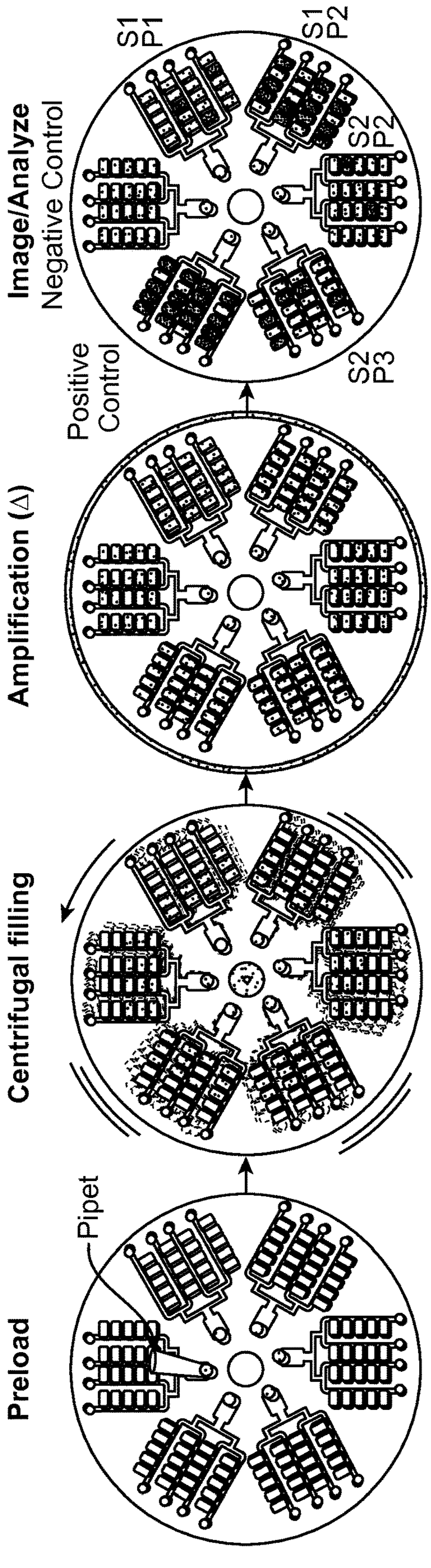
FIG. 15 depicts an example schematic for performing digital PCR that includes a centrifugal based filling mechanism capable of loading multiple samples simultaneously. The samples are loaded into inlets at the interior of the device. During device rotation, centrifugal forces drive the sample into the channels and fluidic harbors resulting in several arrays of isolated harbors. After thermal cycling and PCR amplification the individual arrays give unique results based on the sample that was loaded.

Referring to FIG. 15, the present invention can include methods for pre-loading, filling, amplification, and detection (e.g., imaging and/or analyzing) of a reaction. A microfluidic device of the present invention can, e.g., be used for performing digital PCR, which can include a centrifugal based filling mechanism capable of loading multiple samples simultaneously. A pre-loading step can be performed to prime the device, e.g., with a primer (first fluid) of oil. Aqueous samples (including, e.g., nucleic acid and amplification reagents) can be loaded into inlets in the center region of the device. During device rotation, centrifugal forces drive the sample into the channels and fluidic harbors resulting in several arrays of isolated harbors. The primer oil (first fluid) can be driven out of the device. Alternatively, the device can be dry before loading of the first fluid and then the aqueous samples, as well. An amplification step can be carried out to generate a detectable signal from fluidic harbors that contain nucleic acids from the sample. After thermal cycling, the individual arrays can give unique results based on the sample that was loaded. For example, positive and negative controls can be run and analyzed along with various samples containing nucleic acids.

Figure 16:
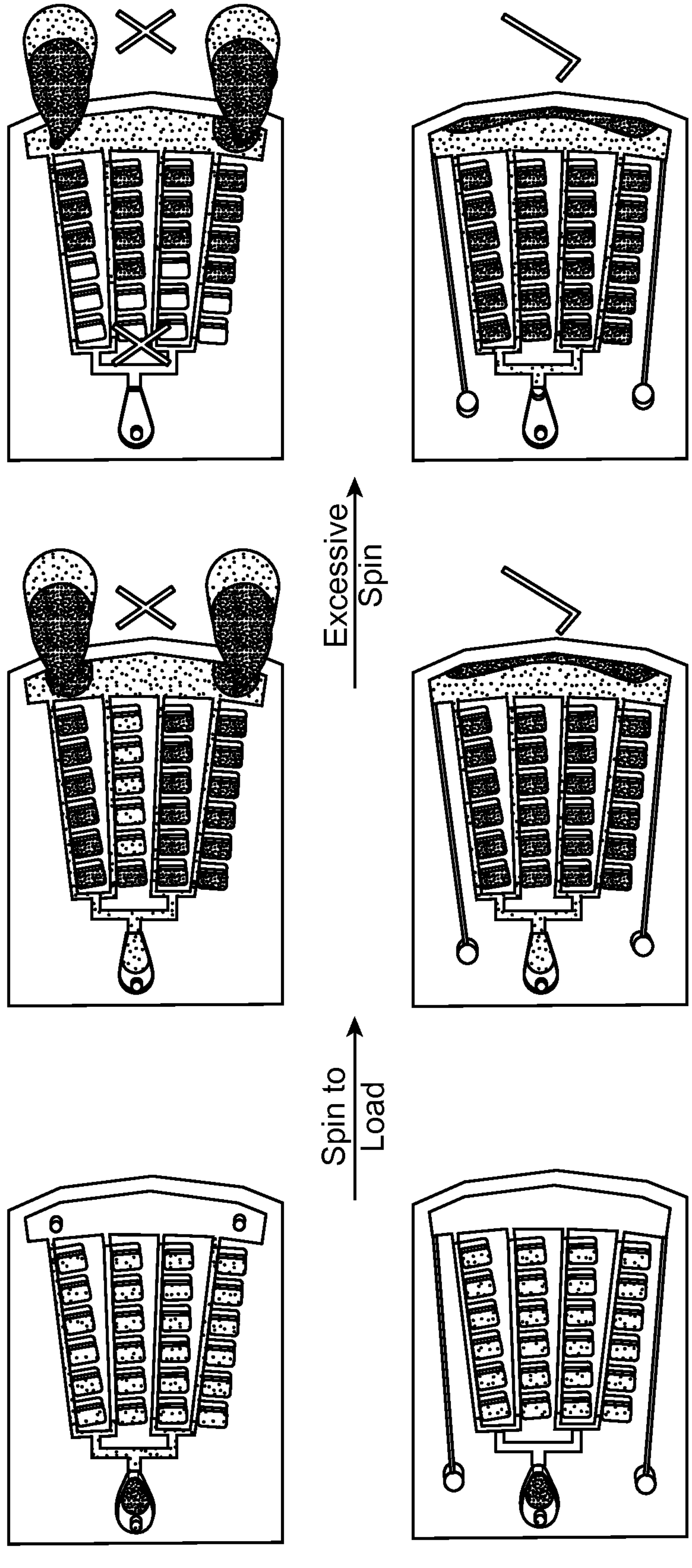
FIG. 16 depicts a schematic showing potential drawbacks to placing the outlets at the exterior portion or outer edge (top row) of the centrifugal device. Interior outlets (bottom row) keep all solutions within the device and serve a self-metering role that slows and then stops fluid flow before fluidic harbors are disrupted.

In some aspects, for centrifugal filling, the aqueous sample can be loaded into an inlet or inlet reservoir near the center of the device, with the fluidic harbor arrays positioned in an outer region of the device, and an outlet reservoir at the outermost part of the device, though the actual outlet can be located at either the interior or exterior position on the device (see, e.g., FIG. 16). In some aspects, the outlet reservoir is a common fluid reservoir, wherein a plurality of flow channels is in fluidic communication with the common fluid reservoir on the device, and the common fluid reservoir is in fluidic communication with a fluid outlet port (e.g., FIG. 16).

FIG. 16 shows potential drawbacks to placing the outlets at the exterior portion or outer edge (top row) of the centrifugal device. Sample and oil can leak out from the outlet when they are placed at the outer edge of the device, creating a mess; additionally, sample also gets displaced from fluidic harbors more easily. Interior outlets (bottom row) keep all solutions within the device and serve a self-metering role that slows and then stops fluid flow before fluidic harbors are disrupted.

The outlet reservoir can initially contain either oil or air. When the device is spun, the centrifugal force drives the sample out of the inlet reservoir and ultimately into the fluidic harbors, and any displaced fluid enters the outlet reservoir. With the outlet at the exterior position, if the reservoir fills with fluid, it can easily escape through the outlet allowing continued flow and enabling more rapid sample loading (see, e.g., FIG. 16 top). This design can result in oil or sample release, out of the device and into the exterior environment. If the outlet is at an interior position then flow rates can slow as the reservoir fills up as the fluid is unable to escape through the outlet (see, e.g., FIG. 16 bottom). This design feature provides a self-metering mechanism in which a set volume of sample/oil will pass through the fluidic harbor region before flow is automatically stopped. This then prevents further flow of the aqueous or oil enabling rotational imaging without the risk of disrupting the digitized samples. Typical loading speeds are around 1000 RPM, easily attainable by modified bench top centrifuges or optical disc platforms (see, e.g., FIG. 17).

Figure 17:
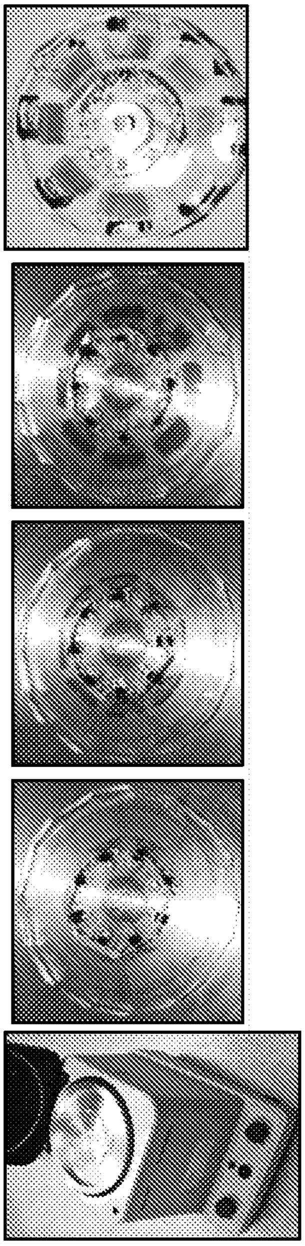
FIG. 17A shows a bench top centrifuge with a custom made insert to spin centrifugal SD devices.
FIGS. 17B-17E show a time series of a device 17B) at the beginning, (FIGS. 17C and 17D) during and (FIG. 17E) after loading.
Figure 18:
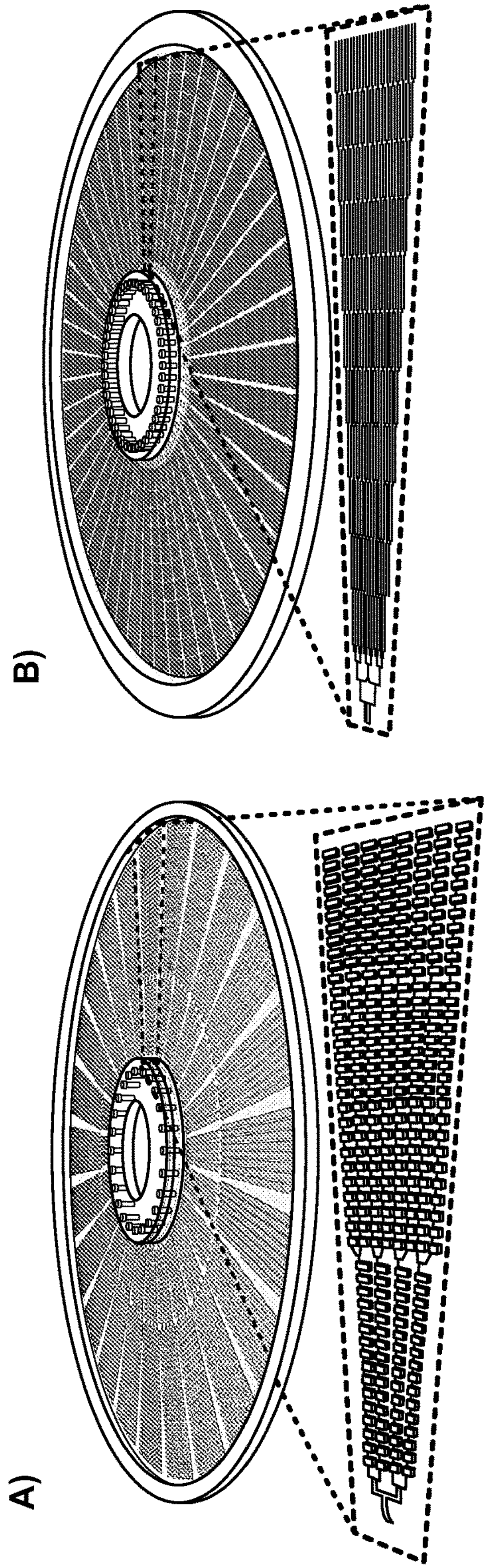
FIGS. 18A and 18B show two example arrays for the compact disc (CD) scale multiplexed devices.
Figure 19:
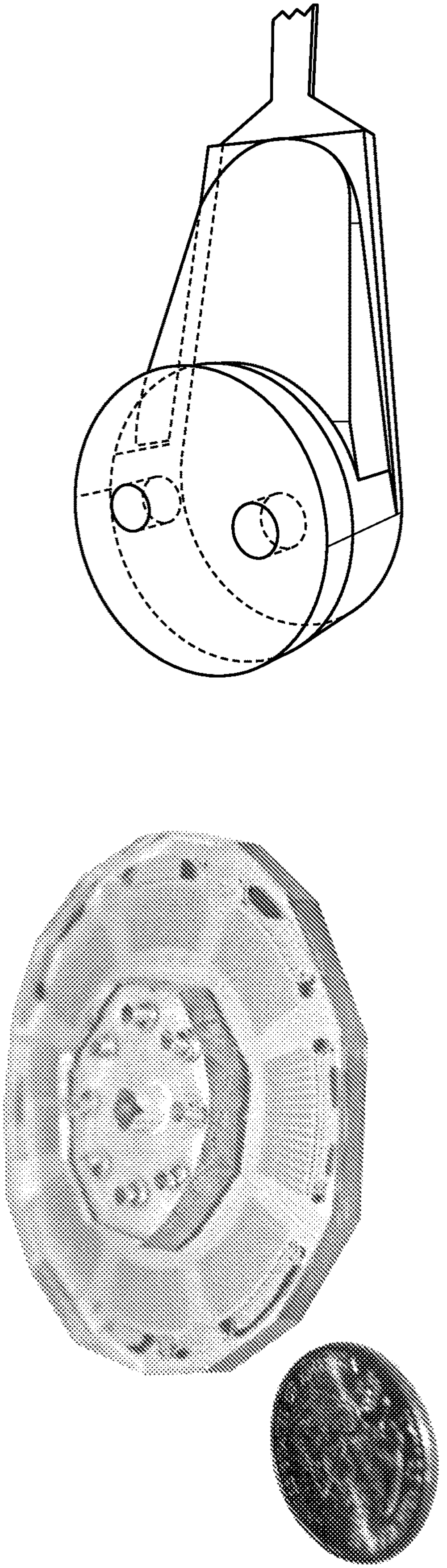
FIG. 19*a* shows a prototype device, comprising 8 sets of 1024×~4 nL fluidic harbors.
FIG. 19*b* depicts an example schematic of a device inlet.
Figure 20:
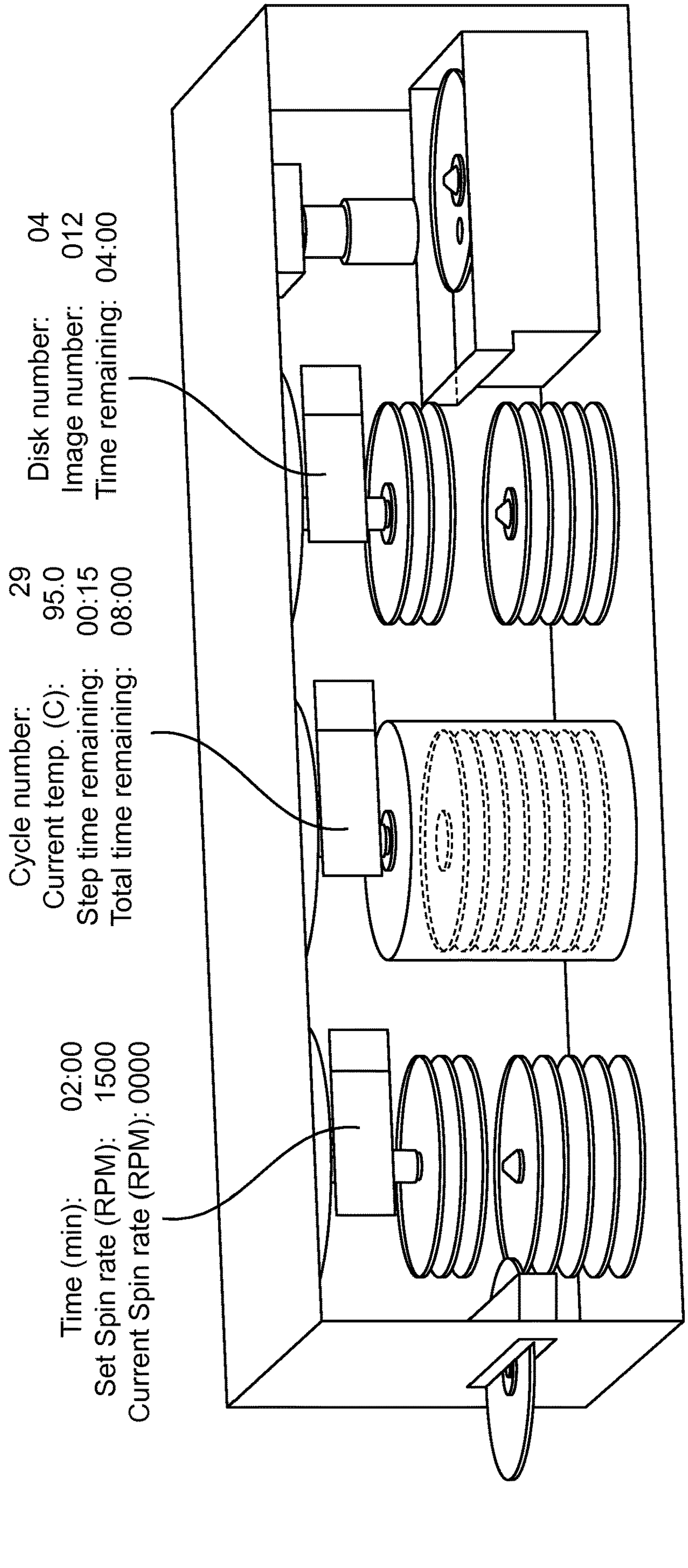
FIG. 20 depicts an example design for a high-throughput instrument that would be capable of loading and thermal cycling multiple discs at one time and then rapidly imaging them, in accordance with an embodiment of the present invention.
Figure 23:
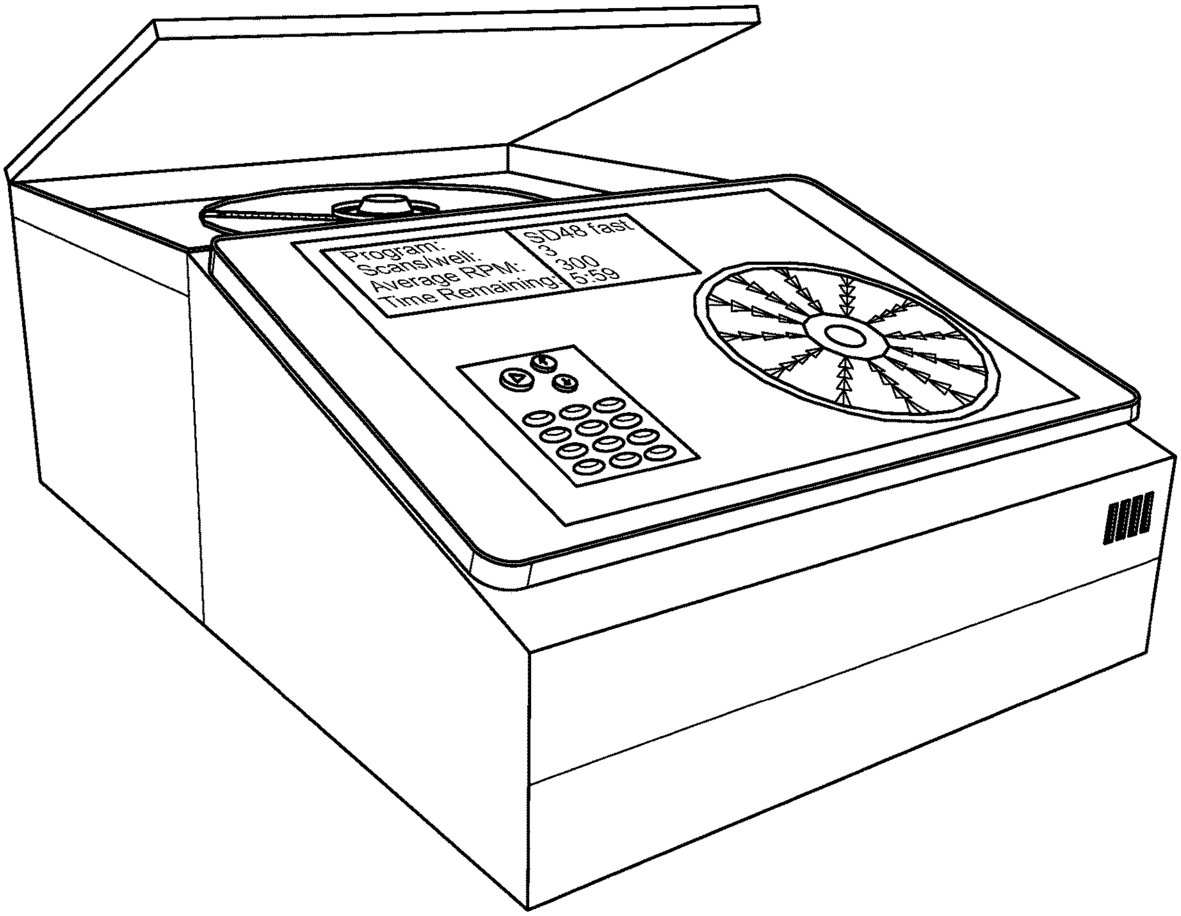
FIG. 23 depicts a centrifugal SD loading, imaging and analysis prototype system.

As shown, e.g., in FIGS. 18 and 19, centrifugal force can also provide the ability to load multiple samples simultaneously. For example, designs to load 24 to 48 or more individual samples per device simultaneously are possible, and actual devices capable of loading 8 samples is shown in FIG. 17. This loading mechanism would also allow multiple devices to be loaded simultaneously further boosting throughput. FIG. 20, for example, depicts an example design for a high-throughput instrument that would be capable of loading and thermal cycling multiple discs at one time and then rapidly image them, in accordance with an embodiment of the present invention. In FIG. 20, the system can include a port for providing microfluidic devices. At a first step, the microfluidic devices can be loaded and filled with fluids as described herein. As shown, for example, the spin time and spin RPM can be set according to desired instructions. At a second step, the microfluidic devices can then be transferred to another portion of the system to undergo reaction conditions, such as thermal cycling for PCR. After the reactions are terminated, a third step can include analyzing the results of the reaction on the microfluidic devices. For example, the system can include imaging and rotating components to allow analysis of amplified DNA present in the microfluidic devices. The system can also be coupled to a computer system that can process and store the recorded analysis data. FIGS. 21A-21C provide other aspects of the present invention that can include the potential to utilize existing manufacturing and instrumentation infrastructure to reduce instrument and consumables cost. This would occur by fabricating devices using materials and equipment within the existing optical disc manufacturing process. It would also occur by utilizing components from the motion control platforms of optical disc readers. FIG. 23 depicts another example of a centrifugal SD loading, imaging and analysis prototype system, in accordance with an embodiment of the present invention.

In various aspects, the present disclosure provides methods for introducing a fluid into a microfluidic device, the methods comprising: providing any of the microfluidic devices of the present disclosure and providing a second fluid to a second fluid inlet port of the microfluidic device. In certain aspects, the methods further comprise rotating the microfluidic device about its central axis to load the flow channel of the microfluidic device with the second fluid. In other aspects, the methods comprise applying pressure to the second fluid, wherein the pressure is sufficient to urge the second fluid through the flow channel of the microfluidic device. In further aspects, the pressure is a positive or negative pressure.

In some aspects, the second fluid comprises an aqueous solution. In certain aspects, the methods further comprise introducing a first fluid into a first fluid inlet port of the microfluidic device, wherein the first fluid inlet port and the second fluid inlet port are independently the same ports or different ports, and wherein the first fluid comprises an oil. In other aspects, the methods further comprise introducing a third fluid to a third fluid inlet port of the microfluidic device, wherein the first fluid inlet port, the second fluid inlet port, and the third fluid inlet port are independently the same ports or different ports, and wherein the third fluid comprises an oil. In further aspects, the third fluid comprises a fluorinated oil, a hydrocarbon oil, a silicone oil, or a combination thereof.

In various aspects, the present disclosure provides methods for introducing a fluid into a microfluidic device, the method comprising: providing a microfluidic device according to the present disclosure; and introducing a first fluid into the flow channel of the microfluidic device.

In some aspects, the first fluid comprises an oil. In further aspects, the oil is selected from a fluorinated oil, a hydrocarbon oil, a silicone oil, or a combination thereof.

In various aspects, the present disclosure provides methods for introducing a fluid into a microfluidic device, the method comprising: providing a microfluidic device according to the present disclosure; and introducing a second fluid into the flow channel of the microfluidic device, wherein the second fluid is an aqueous solution.

In some aspects, the second fluid comprises an analyte and the method further comprises performing an analysis of the analyte within at least one of the fluidic harbors. In certain aspects, the analyte comprises a biological material. In further aspects, the biological material is selected from a cell, a bacteria, a virus, a prion, a nucleic acid, a protein, an expressed product of a genetic material, a crystallizing molecule, or a particle. In yet further aspects, the second fluid comprises a plurality of nucleic acid molecules and the method further comprises distributing at least some of the nucleic acid molecules into separate fluid harbors of the fluidic harbors such that no more than one nucleic acid molecule is contained within at least some of the fluidic harbors.

In some aspects, the present methods further comprise introducing a first fluid into the flow channel of the microfluidic device, wherein the first fluid is introduced into the flow channel before the second fluid is introduced into the flow channel. In some aspects, the first fluid comprises an oil. In further aspects, the oil is selected from a fluorinated oil, a hydrocarbon oil, a silicone oil, or a combination thereof.

In some aspects, the methods further comprise introducing a third fluid into the flow channel of the microfluidic device. In certain aspects, the third fluid is introduced into the flow channel after the second fluid is introduced into the flow channel. In other aspects, the first fluid is an oil, the second fluid is an aqueous solution, and the third fluid is an oil.

In some aspects, the methods further comprise introducing a fourth fluid into the flow channel of the microfluidic device. In certain aspects, the fourth fluid is introduced into the flow channel after the first fluid is introduced into the flow channel and before the second fluid is introduced into the flow channel. In other aspects, the fourth fluid is introduced into the flow channel after the second fluid is introduced into the flow channel and before the third fluid is introduced into the flow channel. In some aspects, the fourth fluid is introduced into the flow channel after the third fluid is introduced into the flow channel. In further aspects, the first fluid is an oil, the second fluid is an aqueous solution, the third fluid is an oil, and the fourth fluid is an oil, and wherein the first, third, and fourth fluids are independently the same or different from one another. In yet further aspects, each of the oils are independently selected from a fluorinated oil, a hydrocarbon oil, a silicone oil, or a combination thereof.

In some aspects, the methods further comprise introducing a fifth fluid into the flow channel of the microfluidic device. In certain aspects, the fifth fluid is introduced into the flow channel after the second fluid is introduced into the flow channel. In other aspects, the fifth fluid is introduced into the flow channel after the third fluid is introduced into the flow channel. In some aspects, the method further comprises introducing a fourth fluid into the flow channel, wherein the fourth fluid is introduced into the flow channel after the first fluid is introduced into the flow channel and before the second fluid is introduced into the flow channel. In certain aspects, the first fluid is an oil, the second fluid is an aqueous solution, the third fluid is an oil, the fourth fluid is an oil, and the fifth fluid is an oil, and wherein the first, third, fourth, and fifth fluids are independently the same or different from one another. In further aspects, each of the oils are independently selected from a fluorinated oil, a hydrocarbon oil, a silicone oil, or a combination thereof.

In various aspects, the present disclosure provides methods for introducing a fluid into a microfluidic device, the method comprising: providing a microfluidic device according to the present disclosure; introducing a first fluid into the flow channel of the microfluidic device; introducing a second fluid into the flow channel of the microfluidic device; introducing a third fluid into the flow channel of the microfluidic device; introducing a fourth fluid into the flow channel of the microfluidic device; and introducing a fifth fluid into the flow channel of the microfluidic device, wherein the first fluid is an oil, the second fluid is an aqueous solution, the third fluid is an oil, the fourth fluid is an oil, and the fifth fluid is an oil, and wherein the first, third, fourth, and fifth fluids are independently the same or different from one another.

In some aspects, each of the oils are independently selected from a fluorinated oil, a hydrocarbon oil, a silicone oil, or a combination thereof. In certain aspects, the first fluid is the initial fluid that is introduced into the flow channel, the second fluid is introduced after the first fluid, the fourth fluid is introduced after the second fluid, the third fluid is introduced after the fourth fluid, and the fifth fluid is introduced after the third fluid. In further aspects, the first fluid is the initial fluid that is introduced into the flow channel, the fourth fluid is introduced after the first fluid, the second fluid is introduced after the fourth fluid, the third fluid is introduced after the second fluid, and the fifth fluid is introduced after the third fluid.

In various aspects, the present disclosure provides methods of introducing a fluid into a microfluidic device, the methods comprising: providing a microfluidic device according to the present disclosure; introducing a first fluid into the flow channel of the microfluidic device; introducing a second fluid into the flow channel of the microfluidic device; introducing a third fluid into the flow channel of the microfluidic device; optionally introducing a fourth fluid into the flow channel of the microfluidic device; and optionally introducing a fifth fluid into the flow channel of the microfluidic device, wherein the first fluid is an oil, the second fluid is an aqueous solution, the third fluid is an oil, the fourth fluid is an oil, and the fifth fluid is an oil, and wherein the first, third, fourth, and fifth fluids are independently the same or different from one another.

In some aspects, the first fluid is introduced first, the second fluid is introduced after the first fluid, the fourth fluid is introduced after the second fluid, the third fluid is introduced after the fourth fluid, and the fifth fluid is optionally introduced after the third fluid. In other aspects, the first fluid is introduced first, fourth fluid is introduced after the first fluid, the second fluid is introduced after the fourth fluid, the third fluid is introduced after the second fluid, and the fifth fluid is optionally introduced after the third fluid.

In some aspects, the sequence of fluid introduction into the flow channel is selected from: (a) an oil, an aqueous solution, and an oil; (b) an oil, an oil, an aqueous solution, an oil, and an oil; (c) an oil, an oil, an aqueous solution, and an oil; or (d) an oil, an aqueous solution, an oil, and an oil, wherein the compositions of each of the oils are independently the same or different. In certain aspects, the methods further comprise the introduction of one or more additional fluids selected from an oil or an aqueous solution at any point in the sequence. In some aspects, the first fluid to be introduced into the flow channel is an oil. In further aspects, the first fluid to be introduced into the flow channel is not an aqueous solution. In certain aspects, the fluid is introduced into the flow channel by applying a fluid pressure selected from an air pressure, a pneumatic pressure, a hydraulic pressure, or a combination thereof, and wherein the fluid pressure is a positive or negative fluid pressure. In yet further aspects, the fluid is introduced into the flow channel by capillary action or wicking. In other aspects, the fluid is introduced into the flow channel by centrifugal force driven flow. In further aspects, the methods further comprise introducing the fluid into the flow channel via the fluid inlet port of the microfluidic device. In other aspects, the fluid is introduced into the flow channel via the fluidic harbor of the microfluidic device.

In some aspects, the methods further comprise performing digital polymerase chain reaction (PCR) within the plurality of fluidic harbors. In certain aspects, the methods further comprise performing isothermal amplification within the plurality of fluidic harbors. In other aspects, the analyte undergoes crystallization in the fluidic harbor. In further aspects, the analyte comprises at least one rare cell selected from cells expressing a malignant phenotype, fetal cells, circulating endothelial cells, tumor cells, cells infected with a virus, cells transfected with a gene of interest, a subtype of an immune cell, or T-cells or B-cells present in the peripheral blood of subjects afflicted with autoimmune or autoreactive disorders.

In some aspects, the methods further comprise introducing the first fluid into a first fluid inlet port and the second fluid into a second fluid inlet port, wherein the first fluid inlet port and the second fluid inlet port are the same port or different ports. In certain aspects, the methods further comprise introducing the third fluid into a third fluid inlet port, the fourth fluid into a fourth inlet port, and the fifth fluid into a fluid inlet port, wherein the third fluid inlet port, the fourth fluid inlet port, and the fifth fluid inlet port are independently the same ports or different ports, and wherein the third fluid inlet port, the fourth fluid inlet port, and the fifth fluid inlet port are independently the same or different ports from the first fluid inlet port and the second fluid inlet port.

Systems for Self-Digitization of Sample Volumes

The devices and methods described herein can further include detection, imaging and/or analysis. In some aspects, the present invention can include analytical systems that can include, e.g., a chamber configured to accept or house the microfluidic devices described herein. In some aspects, the system is configured for housing, rotating, and processing a plurality of microfluidic devices. An exemplary system according to an aspect of the present disclosure is depicted in FIG. 20. The analytical systems can also include a plurality of fluid reservoirs for containing one or more fluids. The plurality of fluid reservoirs can be, e.g., configured to provide the fluid to the fluid inlet port of the microfluidic devices. The systems can also include components to facilitate loading of fluids onto the devices. For example, the systems can include a fluid pressuring unit configured to apply pressure to the flow channel so as to drive or urge the fluid through the flow channels. The systems can also include a rotation component (e.g., a motor) that couples to the devices and is configured to spin or rotate the devices, e.g., about a central axis of the microfluidic device. In some aspects the rotation component is part of a modified optical disc drive, such as a compact disc (CD) drive, a digital video disc (DVD) drive, a Blu-ray drive, or a modified version thereof, or a combination thereof.

A variety of reactions can be carried out using the analytical systems. For reactions, the systems can include a heat-control component configured to apply heat to at least one of the fluidic harbors. Detection and/or imaging can be provided using an optical detection component for optically analyzing at least one of the fluidic harbors of the microfluidic device. The systems can also be coupled to a computer system that, e.g., can include a processing unit configured to control the heat control component and the optical detection component, and being configured to store data generated from the optical detection component.

Figure 22C:
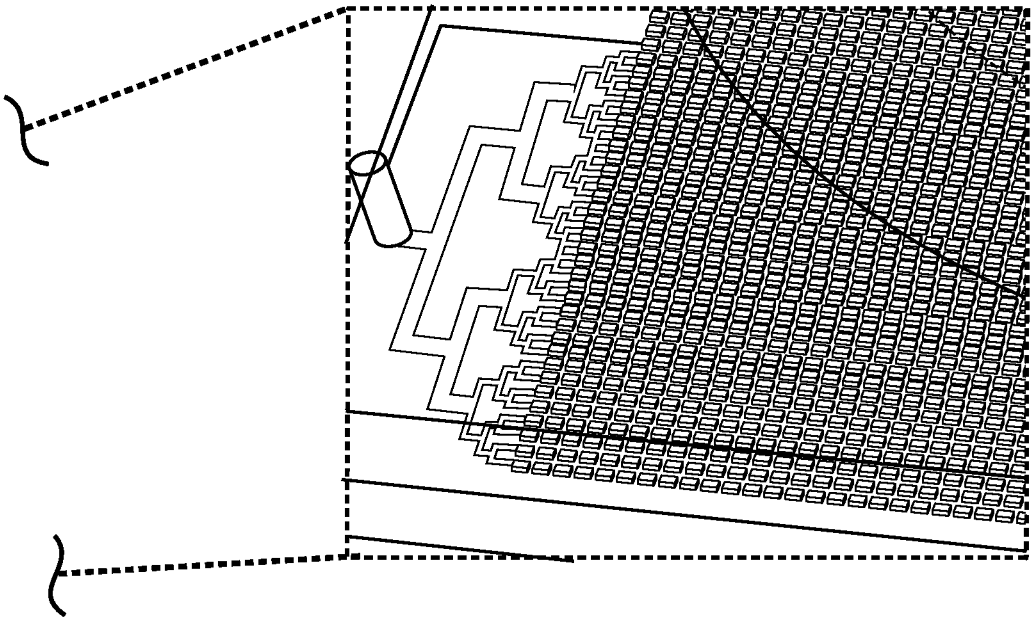

In some embodiments, a basic wide area microscopic imaging setup can be used to acquire bright field and/or fluorescent images of SD devices. For devices that have multiple arrays, an automated stage/positioning system can be used to quickly image all arrays in a single device, such as centrifugal devices with multiple arrays (see, e.g., FIG. 20), or devices based off of 96-well plates (see, e.g., FIG. 22) or other automation supporting layouts. In another embodiment the imaging can be coupled to the rotational position of a device using rotary encoders that have high rotational resolution, which would enable imaging of devices while they are spinning. This can further speed data acquisition and can also be used to monitor loading of centrifugal devices in real time.

In another embodiment devices can be scanned rather than imaged using point detection (e.g., with laser based excitation or light-emitting diode (LED) based excitation). One embodiment would utilize a laser scanning (linear scanning) system such as those used in commercial laser scanners such as the Typhoon FLA 7000. In another embodiment the scanning system can be similar to those used by optical disc (e.g., CD, DVD, Blu-ray disc) systems (see, e.g., FIGS. 21 and 23). In some aspects the optical detection component is part of a modified optical disc drive, such as a compact disc (CD) drive, a digital video disc (DVD) drive, a Blu-ray drive, or a modified version thereof, or a combination thereof.

In some aspects, the present disclosure provides an optical measurement instrument comprising a point detector, an image detector, or other suitable measurement device. In some aspects, a point detector can be a photomultiplier tube (PMT). In certain aspects, the image detector can be a CCD.

In some aspects, the optical detection component comprises a source of electromagnetic radiation, such as a laser or LED, configured to excite a point on the device with a focused beam of light excitation. In some aspects, the source of electromagnetic radiation scans the radial axis of a disc-shaped device as the device rotates. In further aspects, optical components such as a lens can be used to focus the source of excitation. In still further aspects, the optical detection component further comprises a sensor configured to detect a signal emitted from the point of excitation on the device. In certain aspects, the sensor relays the detected signal to a processor, wherein the processor is configured to store the detected signal for subsequent analysis.

In some aspects the rotation component is configured to adjust the speed of rotation of the microfluidic device to match a readout speed of the optical detection component. In certain aspects the rotation component is configured to reduce the rotational speed of the device when the point of excitation is near the outer edge of the device, and/or to increase the rotational speed of the device when the point of excitation is near the center region of the device.

In various aspects, the present disclosure provides analytical systems comprising: a chamber configured to accept a microfluidic device according to the present disclosure; a fluid pressuring unit configured to apply pressure to the flow channel, the pressure being sufficient to urge the fluid through the flow channels; an optical detection component for optically analyzing at least one of the fluidic harbors of the microfluidic device; and a processing unit configured to control the optical detection component, and being configured to store data generated from the optical detection component.

In various aspects, the present disclosure provides analytical systems comprising: a chamber configured to accept a microfluidic device according to the present disclosure; a fluid introducing component configured to introduce a fluid through at least a portion of a flow channel; an optical detection component configured to optically analyze a fluidic harbor; and a processing unit configured to control the optical detection component, and configured to store data generated from the optical detection component.

In some aspects, the fluid introducing component is configured to move a fluid through at least one of a plurality of flow channels. In other aspects, the fluid introducing component is selected from an air pressure source, a pneumatic pressure source, a hydraulic pressure source, or a combination thereof, and wherein the fluid introducing component comprises a source of positive or negative pressure sufficient to move a fluid into a flow channel. In further aspects, the fluid introducing component is configured to move the fluid at least partially through a flow channel by capillary action, wicking, centrifugal force or a combination thereof. In further aspects, the optical detection component is configured to optically analyze a plurality of fluidic harbors. In some aspects, the present apparatuses further comprise a heat-control component configured to apply heat to at least one of the fluidic harbors. In some aspects, the optical detection component comprises an imaging device, an optical disc drive, a laser scanner, or a combination thereof.

In some aspects, the systems further comprise a plurality of fluid reservoirs for containing a fluid wherein the plurality of fluid reservoirs are configured to provide the fluid to the fluid inlet port of the microfluidic device. In some aspects, the systems further comprise a second fluid reservoir and a third fluid reservoir, wherein the second fluid reservoir comprises a second fluid and the third fluid reservoir comprises a third fluid, wherein the second fluid comprises an aqueous solution and the third fluid comprises an oil. In certain aspects, the microfluidic device is loaded with a first fluid and the second fluid, wherein the first fluid comprises an oil. In further aspects, the optical detection component is configured to detect an analyte present in a fluidic harbor. In other aspects, the optical detection component and the processing unit are configured to determine a volume of the aqueous solution in at least some of the fluidic harbors. In some aspects, each of the fluidic harbors are in fluidic communication with a flow channel through an opening conduit. In certain aspects, at least one of the fluidic harbors comprises at least one channel in fluidic communication with the flow channel.

In various aspects, the present disclosure provides apparatuses comprising: a flow channel having a flow axis, an upstream end, and a downstream end; and a plurality of fluidic harbors in fluidic communication with the flow channel and offset from the flow axis, wherein each of the fluidic harbors has an upstream and a downstream end, and wherein the flow channel comprises a constriction positioned upstream or downstream of each of the fluidic harbors.

In some aspects, the constriction is approximately ⅓ of the width of the largest width of the flow channel. In other aspects, the fluidic harbors are positioned in a plane below or above a plane of the device comprising the flow channel. In certain aspects, the flow channel is in fluidic communication with a source of a second fluid and a source of a third fluid immiscible with the second fluid. In some aspects, either one of the flow channel or the plurality of fluidic harbors is loaded with a first fluid, wherein the first fluid is an oil. In further aspects, each of the fluidic harbors is tapered on the downstream end. In certain aspects, the difference between the width of the flow channel and the width of a fluidic harbor is between 0.001 and 1.5 times the width of the fluidic harbor. In other aspects, the height of a fluidic harbor is greater than the height of the flow channel. In further aspects, the length of a fluidic harbor is greater than the width of the fluidic harbor.

In certain aspects, the downstream end of a first fluidic harbor and the upstream end of a second fluidic harbor are separated by a distance, wherein the distance is between 0.1 and 3 times the length of the first fluidic harbor. In certain aspects, the width of the flow channel is greater than the width of a fluidic harbor, and wherein no downstream end of a fluidic harbor overlaps with the upstream end of another fluidic harbor. In some aspects, the apparatus comprises a device of the present disclosure.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention can be embodied in practice.

Unless otherwise specified, the presently described methods and processes can be performed in any order. For example, a method describing steps (a), (b), and (c) can be performed with step (a) first, followed by step (b), and then step (c). Or, the method can be performed in a different order such as, for example, with step (b) first followed by step (c) and then step (a). Furthermore, those steps can be performed simultaneously or separately unless otherwise specified with particularity.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Specific elements of any foregoing embodiments can be combined or substituted for elements in other embodiments. Furthermore, while advantages associated with certain embodiments of the disclosure have been described in the context of these embodiments, other embodiments can also exhibit such advantages, and not all embodiments need necessarily exhibit such advantages to fall within the scope of the disclosure.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention. It is intended that the following claims define the scope of the invention and that methods and structures within the scope of these claims and their equivalents be covered thereby.

EXAMPLES

The following examples are included to further describe some aspects of the present invention, and should not be used to limit the scope of the invention

Example 1

Sample Digitization Over a Wide Volume Range

This example describes a device for digitizing samples over a wide volume range.

As described herein, one feature of the self-digitization (SD) platforms of the present invention is the ability to digitize samples over a wide volume range and array size. This enables handling large sample volumes for high sensitivity assays, large fluidic harbor numbers (small fluidic harbor volumes) for high resolution assays and intermediate fluidic harbor volumes and/or numbers for standard experimental applications. In one embodiment, FIG. 11*a* shows a design comprising of 640 fluidic harbors that are approximately 90 nL in volume. At a total volume of nearly 60 μL a detection limit of almost 50 molecules/mL was achieved. Fluidic harbors can be, e.g., 520 μm wide by 1000 μm long, with a 100 μm bevel and can be approximately 175 μm tall. The flow channel can be about 200 μm wide and about 40 μm tall. There can be, e.g., two drainage channels per fluidic harbor and three junctions per channel to better facilitate oil drainage. Drainage channel junctions can be approximately 8 μm wide. In some aspects, the drainage channel widens as junctions merge, and splits as it meets the flow channel to maintain a minimal cross section to prevent aqueous sample of travelling through the drainage channel. Devices can be filled in approximately 5 minutes at a rate of 20 μL/minute.

Another embodiment, as shown, e.g., in FIG. 11*b*, includes a design comprising of 1024 fluidic harbors that can be approximately 7.5 nL in volume. The total sample volume needed (approximately 8 μL) is comparable to a reasonable minimal sample volume for many assays. Fluidic harbors can be, e.g., 200 μm wide×400 μm long with a 50 μm bevel and can be approximately 100 μm tall. The flow channel can be 80 μm wide, approximately 25 μm tall and feature small indents (approximately 20 μm×approximately 30 μm) on both sides to help direct fluid flow and encourage stable break-off of the aqueous sample (second fluid) when the final oil stream (third fluid) comes through to digitize the sample. A pair of drainage channels (approximately 8 μm wide) with two junctions per channel can be used for each fluidic harbor. This provided rapid enough oil drainage to produce nearly stepwise sample loading. Loading can be achieved, e.g., in <2 minutes at a flow rate of approximately 8 μL/minute. Devices have been filled with a coefficient of variation (CV) of approximately 3% or less.

Another embodiment, shown, e.g., in FIG. 11*c*, includes a design including >10,000 fluidic harbors which are approximately 1 nL in volume. With this number of fluidic harbors samples that are different in concentration by a factor of approximately 1.05-1.1 can be achieved with a confidence level of at least 95% at a 95% power level. Designs for 25,600 fluidic harbors that are 80 μm×160 μm with 20 μm bevel and 80 μm tall, and 10,240 fluidic harbors that are 100 μm×200 μm with 25 μm bevel and 80 μm tall have been filled and digitized. The flow channel is 50 μm wide and approximately 20 μm tall. The drainage channel is simpler since less volume must be displaced, with two sets of single junction drainage channels (approximately 8 μm wide) per fluidic harbor. Devices were filled and digitized in <5 minutes at 15 μL/minute.

Another embodiment includes a design comprising of 10,240 fluidic harbors which are approximately 150 pL in volume. With this number of fluidic harbors samples that are different in concentration by a factor of approximately 1.05-1.1 can be achieved with a confidence level of at least 95% at a 95% power level. Designs for 10,240 fluidic harbors that are 50 μm×80 μm with 10 μm bevel and approximately 40 μm tall have been filled and digitized. The flow channel is approximately 25 μm wide and approximately 17 μm tall. The drainage channel is simpler since less volume is displaced, with one single junction drainage channel (approximately 8 μm wide) per fluidic harbor. Devices were filled and digitized in <5 minutes at 2 μL/minute.

Another embodiment, shown, e.g., in FIG. 11*d*, includes a design comprising of 10,240 fluidic harbors which are approximately 50 pL in volume. With this number of fluidic harbors samples that are different in concentration by a factor of approximately 1.05-1.1 can be achieved with a confidence level of at least 95% at a 95% power level. Designs for 10,240 fluidic harbors that are 50 μm×30 μm with 10 μm bevel and approximately 40 μm tall have been filled and digitized. The flow channel is approximately 25 μm wide and approximately 17 μm tall. The drainage channel is simpler since less volume must be displaced, with one single junction drainage channel (approximately 8 μm wide) per fluidic harbor. Devices were filled and digitized in <5 minutes at 2 μL/minute.

All of these embodiments functioned with multiple oil systems including silicone oil based, mineral oil based or fluorocarbon based oil systems. One embodiment of the fluorocarbon system consisted of a 10:1 ratio of FC-40:1H,1H,2H,2H-perfluoroctanol (PFO). Another embodiment utilized the ddPCR oil from BioRad with PFO. Another embodiment utilized Pico-Surf 1 and PFO in FC-40. One embodiment of the mineral oil system consisted of Abil WE 09 as a surfactant, Tegosoft DEC as a wetting agent and also to lower viscosity and can also include hexadecane to further lower viscosity. Abil was typically used at approximately 0.02% volume/volume. If Abil concentrations are too high it can result in droplets (that can be generated during flow) to not coalesce. Droplet formation can form either at the inlet or at the flow channel/fluidic harbor junction. Droplet formation at the flow channel/fluidic harbor junction is more prominent in larger fluidic harbors as the increased oil drainage creates the dual aqueous:oil flow that can lead to droplet formation. Tegosoft was used over a wide range (approximately 3.5-approximately 83%), but is not restricted to this range. Hexadecane was used in some aspects to lower viscosity and typically used at approximately 30%, but hexadecane can cause swelling of PDMS. Another embodiment of the mineral oil system consisted of 0.02% sorbitan monooleate (span 80) in mineral oil. One embodiment of the silicone oil system consisted of 50 centistoke silicone oil with 0.01% weight/weight Gransurf 77 surfactant.

Some parameters for successful digitization include the wetability of the device by the oil, the oil/aqueous surface tension, the flow rate, the oil viscosity, and the device dimensions. When devices are properly (i.e., completely) silanized with a fluorosilane (1H,1H,2H,2H-perfluorooctyltrichlorosilane) the surface tension and viscosity of the FC-40:PFO is suitable to achieve rapid oil drainage enabling stepwise filling of the fluidic harbors and clean break-off of the oil/aqueous interface as the final oil displaces aqueous from the flow chamber resulting in completely filled fluidic harbors. In the mineral oil system, the Tegosoft provides outstanding wetability of the oil to the device, but if the viscosity is too high drainage can slow resulting in slower filling of individual fluidic harbors and greater droplet generation resulting in less stepwise filling.

Example 2

Centrifugal Design where the Outlet is Proximal to the Center of a Disc-Shaped Device This example describes a disc-shaped device having a flow channel and an outlet port, wherein the distance from the center of the device to at least part of the flow channel is greater than the distance from the center of the device to the outlet port.

In one embodiment of the SD platform, individual arrays are positioned in a radial fashion on a disc. The disc can be spun and centrifugal forces generated by the spinning can drive the oil and sample through the device resulting in sample digitization. This method enables multiple arrays to be filled simultaneously. The inlet and inlet reservoir are positioned at an interior section of the disc as centrifugal forces will drive the sample towards the outside part of the disc. A large inlet reservoir enables the storage of all the sample and oil, so that additional loading steps are not needed during the filling process and to prevent all the liquid from passing through the chip. An inlet/inlet reservoir design is shown in FIG. 19*b*, where the large chamber tapers toward the inlet to direct fluid flow and is capped with two small holes. One hole is used to load the oil and sample, while the other allows air to escape, while the presence of the cap keeps the sample contained within the device. The inlet then branches out to the flow channels.

In one embodiment the channels are positioned in a radial fashion (see, e.g., FIG. 12). In another embodiment the channels are positioned in a linear fashion (see, e.g., FIG. 13) similar to the devices in Example 1. Fluidic harbors have been filled when they are positioned on either side of the channel, but can also be positioned on the opposite side of the spin direction. Drainage channels can be positioned on one or both sides of the fluidic harbor, but can be positioned on the downstream side of the fluidic harbor, which can sometimes offer better digitization. The fluidic harbors tested are 150 μm wide by 300 μm long with a 25 μm bevel and are approximately 85 μm tall.

For the outlet channel, in one embodiment each flow channel has an individual outlet channel that connects directly to the outlet reservoir (see, e.g., FIG. 12). In another embodiment the outlet channel reconnect through a branching network and connect to the outlet reservoir at a single point (see, e.g., FIG. 13).

The actual outlet that lets excess fluid (air or liquid) escape from the outlet reservoir can be positioned at multiple locations (see, e.g., FIG. 16). In one embodiment the outlet(s) are positioned at an outer part of the device. This provides a low resistance path for excess fluid to be released which can speed the rate of sample loading; however, this also results in oil and potentially sample from exiting the chip in an uncontrolled fashion. In another embodiment the outlet is positioned back towards the interior of the device (as shown, e.g., in the designs in FIGS. 12-14). The outlet can be at the same radial position of the inlet, or closer to the exterior or edge of the device than the inlet, or even closer to the interior or center of the device than the inlet. The outlet reservoir can be large enough to contain enough oil and excess sample to allow the device to be fully filled and digitized, as fluid will be unable to exit the disc. The liquid can drive air out through the outlet but significant volumes of liquid will not be able to be driven back up the outlets under standard loading speeds. This embodiment creates a closed system, preventing sample from leaking and potentially contaminating other samples or equipment, and also serves a self-metering function. Once the outlet reservoir is filled fluid flow essentially stops in the device. This helps prevent all the liquid from draining out, which introduces air bubbles, and keeps the digitized samples stable even if continued spinning occurs (e.g., during imaging or detection).

Example 3

Angled Fluidic Harbors

This example describes a device having fluidic harbors positioned at an angle other than perpendicular to a flow channel.

While fluidic harbors are typically positioned perpendicular to the flow channels, which helps maximize fluidic harbor packing density, it is not a requirement of this mechanism. Fluidic harbors can be positioned at an angle with respect to the flow channel (see, e.g., FIG. 14) and still fill and be digitized. FIG. 14*a* depicts a centrifugal design with fluidic harbors that are at a 45° angle to the main channel and positioned in a linear array (with main channels parallel to each other) and with outlet port or ports positioned at an interior location near the inlet port, with reconnecting channel outlets. The zoom shows the design of the drainage channels. FIG. 14*b* shows a fluorescent image of device filled with PCR mix. FIG. 14*c* shows a bright field image of device filled with PCR mix containing food dye.

Example 4

Centrifugal Loading

This example describes a method of loading or filling a disc-shaped device with a fluid using centrifugal force.

Figure 24:
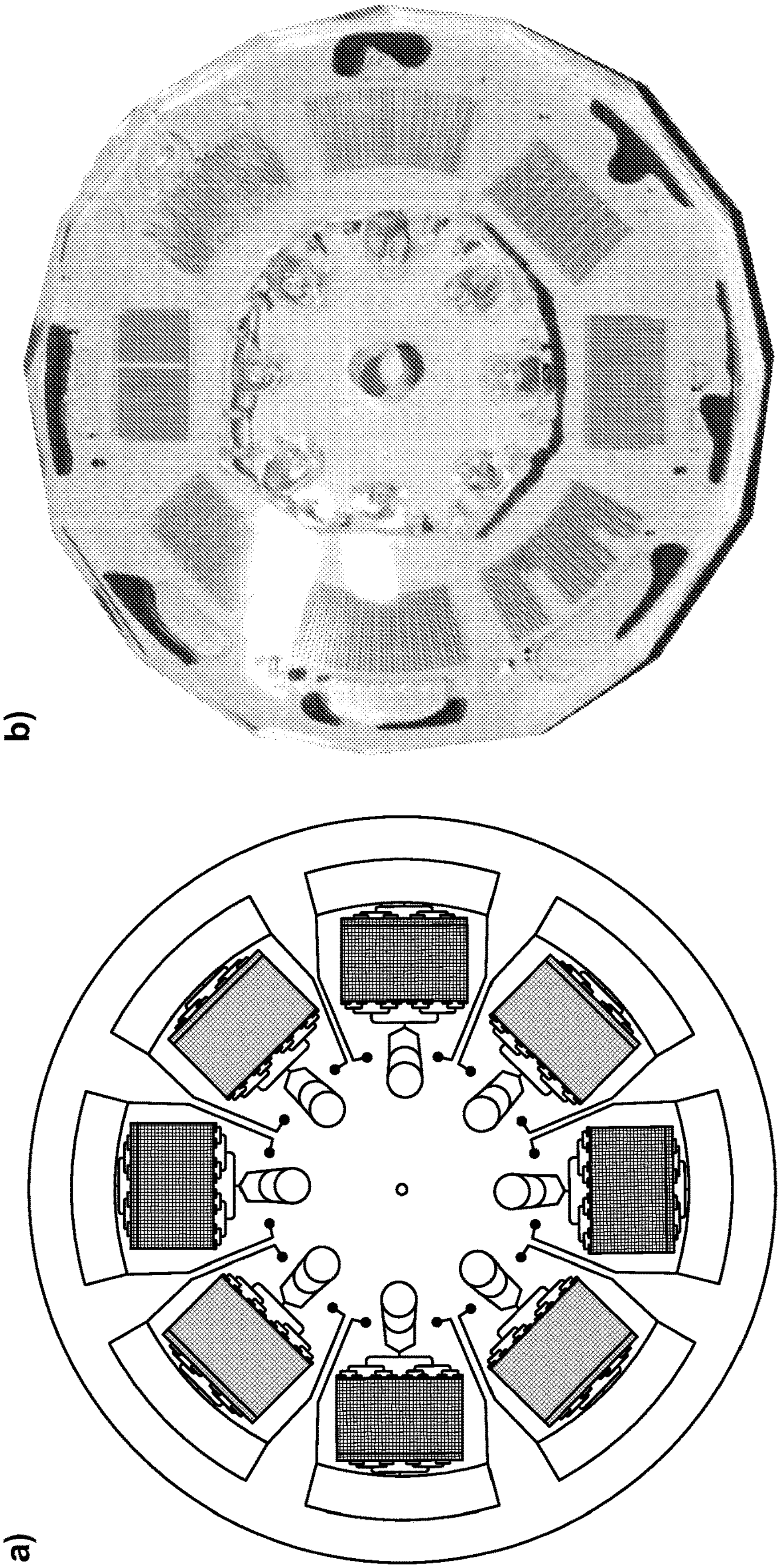
FIG. 24*a* depicts a schematic of an 8× array of the centrifugal design from FIG. 13.
FIG. 24*b* shows the results from filling an 8× device containing designs from both FIGS. 12 and 13.

Loading and digitization of SD disc devices can use the following protocol in some example experiments performed. The typical oil system used was 0.02% Abil, 33% Tegosoft and 67% mineral oil. Fluorocarbon can also be used. In this embodiment SD disc devices were spun using a bench-top centrifuge with a custom rotor designed for discs, as shown e.g., in FIG. 17A. In another embodiment other rotary mechanisms including optical disc drives can be used. And in another embodiment multiple discs can be loaded at once (see, e.g., FIG. 20). PDMS devices were degassed in a vacuum desiccator for >5 minutes; other plastic materials besides PDMS can also be used. Then oil (approximately 20-30 μL) was loaded into each inlet reservoir and the disc spun at approximately 1250 RPM for 1 minutes. Then aqueous sample (approximately 10 μL) was loaded and the remaining reservoir filled with oil. For devices with the outlet at the outer portion of the disc they can be filled by spinning at approximately 1250 RPM for 2 minutes. For devices with the outlet at the inner portion of the disc they can be filled by spinning at approximately 1250 RPM for 4 minutes. Once filled these devices were stable under speeds up to approximately 3000 RPM. Filled arrays can be seen, e.g., in part B and C of FIGS. 12-14, and filled devices comprising of several arrays are shown in FIGS. 20A and 24B. A time series during filling can be seen in FIGS. 17B-17E.

Example 5

Disc Detection and Scanning Method

This example describes a method and system for detecting an optical signal from a rotating disc-shaped device.

Figure 21:
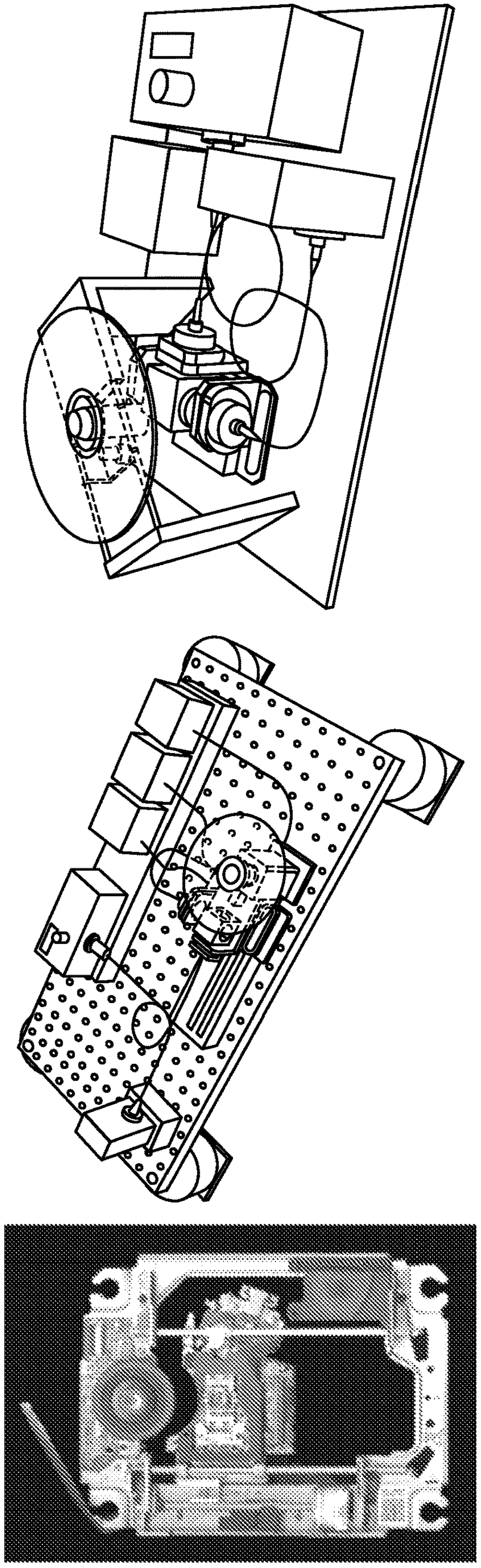
FIGS. 21A-21C illustrate an optical disc style loading and imaging system.

For data analysis the fluorescence intensity of individual fluidic harbors can be measured. Standard fluorescence microscope techniques are suitable for this application and all images of individual arrays were obtained in this manner. Full chip images were obtained using a standard DSLR camera. Scanners such as a Typhoon FLA 9000 are also suitable for image detection. However to maximize data acquisition efficiency and minimize cost, a more custom imaging or detection setup may be appropriate. The existing optical disc (OD) platforms (e.g., CD, DVD, Blu-ray) offer a model for how rapid imaging or detection can be achieved. The standard read speed for discs is approximately 200-500 RPM, but write speeds can be several times faster resulting in a low cost system that can achieve the appropriate speed range and control for loading and reading SD disc devices. As all OD platforms require positioning of the laser scanner (linear scanner) to submicron levels the motion control systems of OD platforms is more than suitable for the requirements to image SD disc devices. FIG. 21 shows two potential platforms for imaging or detecting and motion control of an SD disc system. In one embodiment all optical components would be reduced to the scale of OD components and all would fit on the tracking platform of a standard OD motion control drive.

In another embodiment, (see, e.g., FIG. 21C) fiber optics are used to reduce the number of components that must be moved by the linear motion control drive. One fiber optic cable would direct laser light from the light source to the fluorescence filter setup. It passes through the first filter and off the dichroic into a second fiber optic cable, which delivers the light to a lens attached to the fiber to focus the light onto the disc. The same fiber also can collect the fluorescent light, which passes through the dichroic and the second filter and into a third fiber connected to a detector, such as an avalanche photodiode (APD) or a regular diode or a photomultiplier tube or a CCD sensor or a CMOS sensor. In this embodiment the fiber leading to the sample can be attached to the linear motion control stage. In another embodiment (similar to FIG. 21B) the laser and APD (or other detector) are stationary and fibers link them to the motion control stage where miniaturized filters, dichroics and lenses direct the light to and from the sample.

If optical feedback cannot be provided to the motion control components, then the control over rotational speed and linear position can be reduced. Some modifications can be made. A rotary encoder can be attached to the rotation motor (typically a brushless DC) to obtain precise measurements of the speed and this can be used to then feedback and control the motor speed. Some linear motors are stepper motors and so has some inherent positional control. While this may be insufficient, on its own, for the submicron positioning resolution of OD systems, it can be sufficient for the positional control of the SD disc imaging/detection requirements. Alternatively a lead screw with a higher thread count can also be utilized to gain greater positional control. Ultimately the resolution will be dependent both on the fluidic harbor size and whether the entire fluidic harbor must be scanned or whether a few line scans per fluidic harbor is sufficient. This can depend largely on the robustness of the filling mechanism. If only a few line scans are needed then positional control on the order of 10-20 μm can be sufficient, but even if full fluidic harbor imaging is required a pixel (and thus positioning size) of 2-5 μm should provide sufficient resolution. Imaging or detection would not necessarily have to follow the spiral profile that OD systems follow and can go in a stepwise fashion scanning at a set position for a full rotation then moving to the next position.

Example 6

Disc Imaging Method

This example describes a method for imaging a plurality of fluidic harbors.

In certain embodiments, the scanning method described in Example 5 can provide a lower cost option for obtaining assay information from fluidic harbors. In another embodiment entire arrays or large sections of arrays can be imaged at once. Cameras equipped with wide area optical components can enable data acquisition of an entire array in an instant. In one embodiment the device would be stationary while image acquisition takes place. In another embodiment the image acquisition can be coupled to a specific rotational position and images acquired while the device is spinning. This can be used to monitor device loading during centrifugal filling, or to rapidly image multiple arrays on one radial device.

Example 7

Well-Plate Design

This example describes an integrated well-plate microfluidic device design.

The integration of digital PCR with existing lab equipment/infrastructure can greatly increase adoption of the technology. As automated sample handling in a, for example, 96 well plate format, as well as thermal cyclers and imagers compatible with this technology exist it makes sense to develop SD technology that takes advantage of this. As such one embodiment of the SD platform is a device that can take advantage of 96 well plate technology (see, e.g., FIG. 22). In this embodiment each well has two concentrically positioned compartments per well. The interior circular well is for sample loading, and by being positioned in the center of the well structure and having geometries comparable to 384 well designs should work seamlessly with either multi-channel pipettes or automated sample handling systems. The outer ring would then be an outlet. During device filling pressure can be provided (through a gasket/manifold) to the inlet and/or vacuum can be applied to the outlet. This force would then drive the sample from the inlet into the microfluidic channels that then branch and deliver the sample to the flow channels and into the fluidic harbors. This can include a multi-level channel network to fit in the approximately 9 mm×approximately 9 mm footprint of each well of a 96-well plate. In this embodiment an array of 10,240 fluidic harbors that are approximately 50 pL in volume can be achieved. Fluidic harbor dimensions would be approximately 30 μm×approximately 50 μm×approximately 40 μm, and there would be a single drainage channel positioned downstream of the fluidic harbor. For implementation of this platform an instrument to deliver pressure/vacuum to the well may be needed, but existing fluorescence imaging systems should be sufficient. In this embodiment a layer of the device (above the fluidic harbors, but below the inlet, outlet and upper channels) can be made black to eliminate background signal. This layer was omitted from FIG. 22 for visualization purposes, but can be in the layer with the vertical channels that connect the upper branch to the lower branch.

Example 8

Fabrication Technique

This example describes a method of fabricating microfluidic devices.

Fabrication of SD devices can be, e.g., a two and sometimes a three step processes. The first step establishes the height of the flow channel and drainage channel. The second step establishes the height of the fluidic harbors and inlet and outlet channels. For centrifugal SD devices a third step can be added to establish the height of the inlet and outlet reservoir in order to accommodate the relatively large volumes that must be stored. If each step is done separately it can increase the risk of air bubbles/defects being introduced into the second layer as the small densely packed features in the first layer can pin air bubbles when the second layer of SU-8 is poured (in this case SU-8 is used to fabricate SU-8 on silicon features, but other processes can also be used, such as deep reactive ion etching that does not involve the use of SU-8). To avoid this, the second step is combined with the first step before any feature development takes place. The following protocol can be used. An SU-8 layer is spun and baked and exposed through a mask containing only alignment markers, after which the wafer is post baked developed and hard baked. This provides alignment markers for both the first and second layer. The alignment markers are covered with tape and the first SU-8 layer is spun. Then the tape is removed and the wafer pre baked. The wafer is then exposed through the first layer mask and post-baked. After this new tape is used to cover the alignment marks and the second SU-8 layer is spun. Then the tape is removed and the wafer pre baked. The wafer is then exposed through the second layer mask and post-baked. It is then developed and hard baked. For two layer devices the process is done. It may be appropriate to shorten the exposure time and/or post exposure bake time of the first layer to minimize any broadening that can occur during the second layer baking steps. For three layer devices since the third layer is primarily helpful at the inlet and outlet any air bubbles trapped by the fluidic harbor/channel features will not be in the exposed region so the third layer can be applied to a previously developed chip. This prevents further development of the fine features in the first and second layer. In addition to fabrication using SU-8, silicon micromachining as is known in the art, such as deep reactive ion etching, can also be used for the fabrication of masters for replicating SD devices. Embossing and injection molding, as is known in the art, can also be used to make replicas of SD devices.

Example 9

Devices with Fluidic Harbors in Fluidic Communication with the Bottom of the Flow Channels This example describes a device having fluidic harbors positioned below a flow channel.

Fluidic harbors can be connected to the flow channel either at the side of the main channel or on the bottom/top of the flow channel (see, e.g., FIG. 3B). When positioned at the bottom/top the interface between the two regions is larger allowing for more rapid fluid exchange.

In one embodiment, where the flow channel had no constrictions the fluidic harbors were 100 μm wide×200 μm long×100 μm deep giving a volume of 2 nL. The main channel was 20 μm deep and at least as wide as the fluidic harbor with overhang lengths on each side of 1, 25, 50 or 100 μm, and the spacing between fluidic harbors was 50, 100 or 200 μm. The number of fluidic harbors per array included 1024, 4096, 10240 and 25600. With this design the number of fluidic harbors that contained aqueous sample was typically between 80-90%, with 80-90% of the fluidic harbors being isolated and the rest showing some amount of interconnection between fluidic harbors.

In another embodiment the fluidic harbor dimensions were the same but the main channel comprised constrictions upstream of each of the fluidic harbors. In one embodiment the constrictions were 25 μm long and 100 μm wide (half the largest width of the channel). There was 25 μm of wider main channel on either side of the constriction before the fluidic harbor (FIG. 7). The number of fluidic harbors per array can be, for example, 1024, 4096, 10240, 25600 or more. With the constriction, the number of fluidic harbors containing sample increases to approximately 99% with the number of isolated harbors approximately 90%.

In another embodiment, the channel width at the constriction was only 50 μm wide or ⅓ the largest width of the flow channel. The fluidic harbors also showed a tapering on the downstream end of the device (FIG. 8*a*). The number of fluidic harbors in an array consisted of 1024, 4096, 25600 or 38400 fluidic harbors per array. The percent of isolated fluidic harbors further increased to approximately 95% with this embodiment.

Example 10

Systematic Studies of Sample Digitization

This example describes systematic studies of sample digitization in designs with fluidic harbors on the bottom of flow channels.

Three-dimensional multiphase computational fluid dynamic (CFD) simulations were carried out to study several design parameters. The model was a single channel and one or more fluidic harbors. Parameters studied included but were not limited to the capillary number (ca) and several ratios that look at channel and fluidic harbor size and spacing.

For computational studies three-dimensional multiphase fluid simulations of the sample digitization in bottom fluidic harbors were conducted with a Computation Fluid Dynamics (CFD) package (Fluent, Version 6.3.26; Fluent Inc.; ANSYS, Inc., Lebanon, N.H.). The droplet digitization was simulated for different viscous/interfacial properties (Ca) and varying dimensions of the main channel ($W_m$, $H_m$) with a bottom fluidic harbor measuring 100 μm×200 μm×100 μm (w×l×d). The designs were converted into finite elements using a hexahedral meshing strategy with a resolution of 2.5-5.0 μm between node points. In simulations, water (ρ=998 kg $m^{-3}$, μ=1.003×$10^{-3}$ kg $m^{-1}$ $s^{-1}$) and silicone oil (50 cSt; p=980 kg $m^{-3}$, μ=0.049 kg $m^{-1}$ $s^{-1}$) were used as aqueous solution and oil phase, respectively. The model solver was defined as pressure-based, three-dimensional, with an absolute velocity formulation, and a first-order implicit unsteady formulation with non-iterative time advancement.

A volume of fluid (VOF) solver was used for the multiphase model with two phases, explicit VOF scheme, and a Courant number of 0.25. The phase interaction was defined with wall adhesion properties and different γ values for the water-oil interface ranging from, for example, 5-30 mN $m^{-1}$. The boundary conditions were set as follows: The single inlet was defined by a flat velocity profile depending on the parameter studied; the outlet was defined as outflow with a constant pressure ($P_{Outlet}$=$P_{atm}$=101325 Pa); the walls enclosing the main channel and fluidic harbor were set to have a hydrophobic contact angle of 175°. The main channel and bottom fluidic harbor can then be prefilled with the oil phase and aqueous solution using Fluent's "Adapt" tool resulting in an aqueous plug with a volume of 1.5-2.0 times the fluidic harbor volume and reaching up to 25 μm before the fluidic harbor. The fluid flow profile and the volume fractions can be simulated with fractional steps for the pressure-velocity coupling. The spatial discretization was implemented by a first-order upwind scheme for the momentum and a pressure staggering option (PRESTO!) set for the pressure. The volume fraction was discretized using the Geo-Reconstruct option. Residual tolerances were set to 0.001. The simulations were subsequently iterated with time steps ranging from 0.1 to 5.0 μs.

Figure 25:
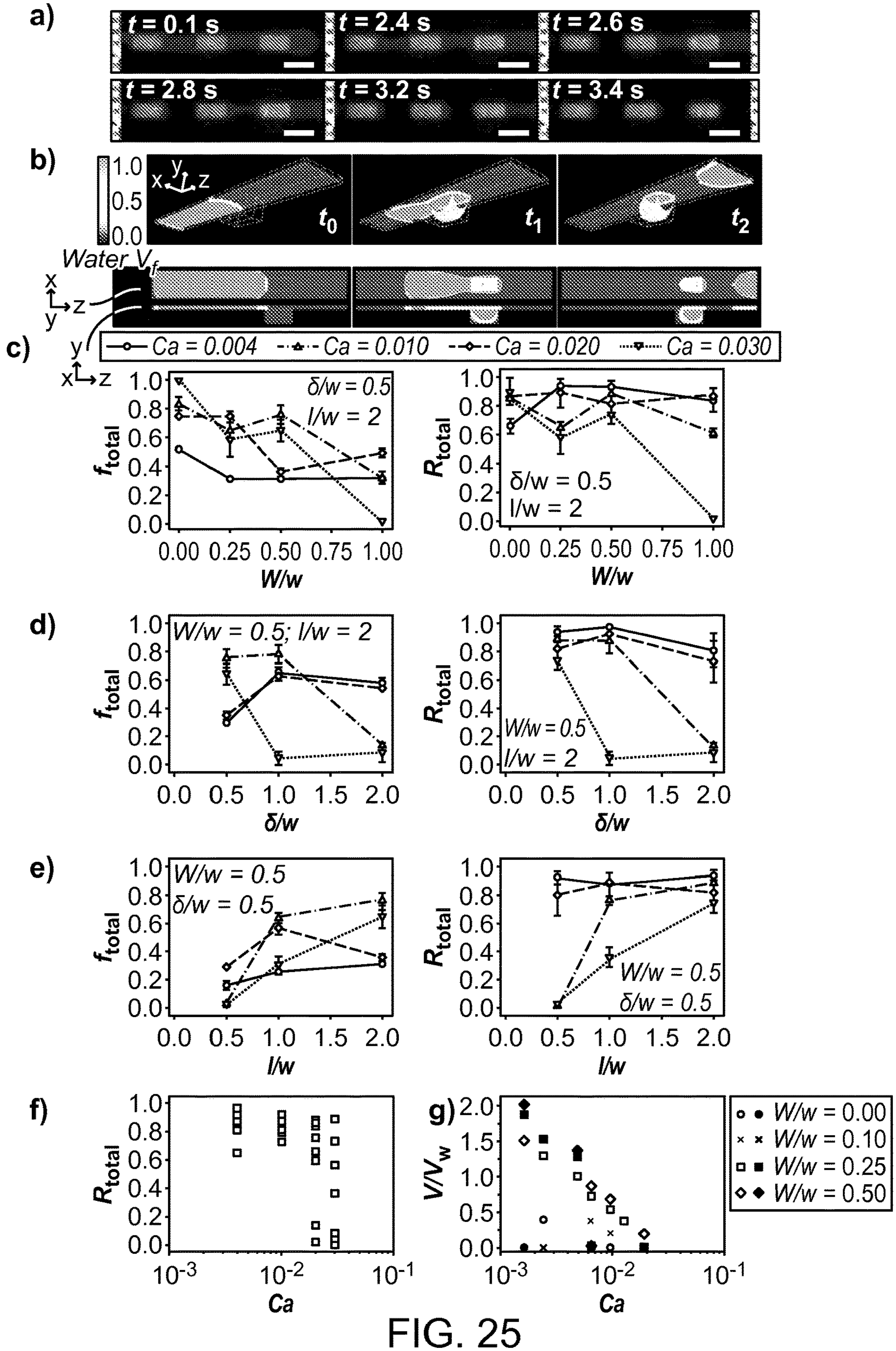
FIG. 25*a* depicts fluorescence image sequence of sample digitization in a 1,024-fluidic harbor chip.
FIG. 25*b* depicts an example of fluidic harbor filling by 3-dimensional water-in-oil multiphase flow CFD analysis before ($t_0$), during ($t_1$), and after droplet breakup ($t_2$).
FIG. 25*c-e* summarize the characterization of different design parameters, specifically: normalized main channel overhang (W/w) (FIG. 25*c*), normalized inter-fluidic harbor spacing (δ/w) (FIG. 25*d*), and the fluidic harbor aspect ratio with respect to the flow direction (l/w) and its effect on the filling efficiency ($f_{total}$) and sample retention ratio ($R_{total}$) (FIG. 25*e*).
FIG. 25*f* shows combined results showing the trend of sample retention in fluidic harbors with respect to Ca from on-chip studies with 1,024 fluidic harbors based on $R_{total}$.
FIG. 25*g* shows results from a parametric CFD study with different $H_m$ (white symbols=25 μm, grey symbols=50 μm).

The self-digitization of sample volumes in chips with fluidic harbors below straight main channels showed a strong dependence on the main channel's dimensions and capillary number (Ca). Different parameters of device design were studied. In one embodiment arrays of 1,024 fluidic harbors per chip were used to investigate different parameters that affected the filling and digitization. These parameters included the main channel's overhang, W, with respect to the fluidic harbor width, w, (W/w), the normalized spacing between fluidic harbors (δ/w), and the aspect ratio of the fluidic harbor with respect to the flow direction (l/w). The results from the parameter study were based on fluorescence microscopy images of filled fluidic harbors (bright in FIG. 25*a*) with respect to the oil-filled, non-fluorescent chip (black in FIG. 25*a*). FIG. 25*a* depicts fluorescence image sequence of sample digitization in a 1,024-fluidic harbor chip at Ca=0.015. Shown is the shearing of an aqueous sample (supplemented with fluorescein) by 50 cSt silicone oil with 0.01% w/w Gransurf 77 in three fluidic harbors imaged at the x-z-midplane. Note the nicking of the aqueous phase between fluidic harbors before digitization from the bulk aqueous solution. Scale bar corresponds to 200 μm.

FIG. 25*b* depicts an example of fluidic harbor filling by 3-dimensional water-in-oil multiphase flow CFD analysis before ($t_0$), during ($t_1$), and after droplet breakup ($t_2$); shown are the contours in isometric, top, and side view at the x-z- and y-z-midplane of the water volume fraction ranging from oil to water and the water/oil-interface shown as an isosurface. The flow in FIGS. 25*a* and 25*b*) is from left to right.

The results are presented as the retention ratio (R) and the total filling (or digitization) efficiency ($f_{total}$). The retention ratio can be defined as the number of fluidic harbors filled per chip, independent of fluidic harbors that remain connected to the main channel (as the connection through the main channel is filtered out by the thresholding scheme), and is normalized to the total number of fluidic harbors per chip. In contrast, the filling efficiency or digitization efficiency accounts for fluidic harbors which remain connected by an aqueous bridge through the main channel. An aqueous sample that spreads over several fluidic harbors and remains connected through the main channel is treated as one droplet. The filling efficiency can also be normalized by the total number of fluidic harbors per chip. A filling efficiency of 1 represents the filling of the entire chip with aqueous samples occupying single fluidic harbors without any interconnection through the main channel to neighboring fluidic harbors (perfect digitization). With decreasing filling efficiency, the fraction of aqueous samples that are larger in volume than a single fluidic harbor is increasing (e.g., as a result of an aqueous bridge connecting neighboring fluidic harbors). Therefore, the retention ratio describes how many fluidic harbors per SD chip are filled with aqueous sample and the filling efficiency is a measure of the quality of the digitization (i.e., low f corresponds to many interconnected droplets and high f corresponds to a few to none). The goal of the study was to achieve complete filling of the entire chip with digitized aqueous samples each with a volume of a single fluidic harbor.

FIG. 25*c-e* summarize the characterization of different design parameters, specifically: normalized main channel overhang (W/w) (FIG. 25*c*), normalized inter-fluidic harbor spacing (δ/w) (FIG. 25*d*), and the fluidic harbor aspect ratio with respect to the flow direction (l/w) and its effect on the filling efficiency ($f_{total}$) and sample retention ratio ($R_{total}$) (FIG. 25*e*). The studies were conducted in chips with 20 μm tall ($H_m$) main channels with fluidic harbors below them. Data are shown as mean±SD (n=2).

In one aspect the experimental study showed that more than 50% in sample retention was achieved for the entire range of channel overhang (W) and Ca range studied, except for the highest Ca and W/w (right panel in FIG. 25*c*). At the same time, the filling efficiency appeared to be decreasing with increasing W/w (left panel in FIG. 25*c*). In experimental studies with supposedly no overhang (W/w of 0), the filling efficiency showed an increase with increasing Ca. Overall, it can be expected that the filling efficiency decreased with decreasing Ca and increasing W/w. This is due to higher shear flow of the oil phase in thinner channels (low W/w) when compared to wider channels (high W/w). For the parameter W/w, experiments indicate that relatively high sample retention and filling efficiency can be achieved for W/w values of 0 to 0.5 and for high Ca (0.02-0.03). High Ca values used during digitization can also be beneficial to minimize the time required to fill and digitize a chip because Ca is directly proportional to the linear flow velocity of the oil phase. However, at the highest Ca studied, the shear flow resulted in the generation of many small emulsified droplets per fluidic harbor and artificially raised the filling efficiency above the calculated retention (FIG. 25*c*). This emulsification was only seen for the parameter with supposedly no overhang and high Ca.

FIG. 25*g* shows results from a parametric CFD study with different $H_m$ (white symbols=25 μm, grey symbols=50 μm). Note the distinct cutoff in sample retention above Ca>0.02 and the similarity in retention cutoff (Ca) between f) and g) despite the difference in data used (area vs. volume of retained sample). CFD simulations of the sample digitization showed that actually no sample was retained when there was no overhang, that is, when W/w=0, except when Ca was very low (see circle symbols in FIG. 25*g*). The simulations also indicated that a small W was required to allow for samples to be digitized and retained. This simulation result contrasted with on-chip experiments described above, which showed sample retention even when W/w was supposedly 0 (FIG. 25*c*). This apparent contradiction can be explained by imperfections in the multi-layer microfabrication process. Minor misalignments in the fabrication process between the first layer (main channel) and the second layer containing the fluidic harbors can result in edges that supported droplet retention. Indeed, a ~1-2 μm misalignment, as measured by bright-field microscopy, was present in the master that supposedly should not have any overhang; this slight misalignment was difficult to overcome with the current fabrication process. From the simulations, this slight overhang would have allowed for sample digitization into the fluidic harbors, consistent with the experimental observations.

In contrast, a larger W reversed the effect of high filling efficiency, which was explained by the way the bulk aqueous solution was digitized in each fluidic harbor (FIG. 25*a,b*). The aqueous compartment in each fluidic harbor was pinched off from the bulk aqueous solution by the shearing of the oil phase between adjacent fluidic harbors. Wider main channels resulted in weaker shear forces, thus reducing the pinching of the aqueous droplet after it filled in the fluidic harbor; as a result, aqueous droplets in adjacent fluidic harbors remained interconnected by an aqueous bridge in the main channel, which also increased the chances that they became dislodged from the fluidic harbors by flow in the main channel.

Based on the results from the overhang study (W/w), it is tempting to argue that a large inter-fluidic harbor spacing (b) can be beneficial to facilitate digitization and achieve high sample retention and filling efficiency. In order to investigate the impact of fluidic harbor spacing W/w can be fixed at 0.5 and the results for different δ normalized to the fluidic harbor width. Experimental results showed that a small δ/w resulted in high sample retention for the Ca range studied, albeit for a decrease in $R_{total}$ with increasing Ca (FIG. 25*d*). The results for large δ/w showed a pronounced impact of the Ca on sample retention. Here, small Ca allowed the retention of the aqueous sample while at large Ca (≤0.02), the aqueous sample can be flushed out of the SD chip. At small δ/w and low Ca, there was a low $f_{total}$, indicating that many of the aqueous compartments remained interconnected through bridges between adjacent fluidic harbors. The use of higher Ca, and thus higher shear rates of the oil phase, allowed for increasing the filling efficiencies. But these increases were limited to low δ/w. These results suggested that δ has similar effects on the breakup of individual droplets from the bulk aqueous solution as the main channel overhang (i.e., by nicking or pinching during shearing by the oil phase). A small δ tended to support digitization of fluidic harbor-sized aqueous droplets while large δ led to strongly reduced sample retention. Furthermore, the interfluidic harbor spacing had a strong impact on the density of fluidic harbors located below a microfluidic channel. Larger interfluidic harbor spacing reduced the overall sample volume that can be digitized or retained in a chip for a given chip area.

Another parameter which affected sample retention was the fluidic harbor length (l), which was in the direction of the main channel flow. For W/w of 0.5, l/w of 0.5 (i.e., a wide fluidic harbor perpendicular to the flow direction) can be least beneficial for high $f_{total}$ and $R_{total}$. Fluidic harbors with a square cross-section (l/w of 1.0) showed higher $f_{total}$ and $R_{total}$ with increasing Ca. The overall trend in sample digitization and retention suggested rectangular fluidic harbor placed in the flow direction (l/w), so that the "long" axis of the fluidic harbor was parallel to the flow direction, was most beneficial for high $f_{total}$ and $R_{total}$ (FIG. 25*e*).

To highlight the importance of Ca on the sample retention, the data from the parametric study was combined into a single plot (FIG. 25*f*). The plot shows there was a distinct trend in the retention of sample ($R_{total}$) with increasing Ca.

Almost 100% of the sample can be retained in the chip at a Ca smaller than 0.020. At higher Ca, the majority of the aqueous sample can be flushed out of the chip by the shearing oil phase, thus decreasing $R_{total}$.

CFD can be a powerful tool to study process parameters for the side-chamber SD chips. A similar approach was used to investigate parameters that can improve the sample digitization in SD chips with fluidic harbors below the main channel. Preliminary simulation and experimental studies with bottom-fluidic harbor SD chips with varying main-channel heights ($H_m$) indicated a critical height above which the sample digitization was greatly reduced. In these studies, bottom-fluidic harbor SD chips with fluidic harbor volumes of 2 nL were used. These chips had a normalized channel overhang (W/w) of 0.25, a normalized fluidic harbor spacing (δ/w) of 0.5, and a fluidic harbor aspect ratio (l/w) of 2.0. The experimental studies indicated that $R_{total}$ and $f_{total}$ approached zero when $H_m$ was greater than 30-40 μm. To further investigate the effects of main channel geometry and changes in Ca on the sample digitization, CFD models were used to simulate the filling of a single fluidic harbor. An example of the CFD study is shown in FIG. 25*b* with the stages before and during fluidic harbor filling with aqueous solution ($t_0$, $t_1$) and after shearing by the oil phase ($t_2$). The material properties (oil and water) used in on-chip experiments were also used in the CFD studies. Unlike the on-chip studies, the CFD study allowed for the direct readout of the retained aqueous sample volume; the results are presented normalized to the fluidic harbor volume, $V_w$, in the Ca plot (FIG. 25*g*).

In the studies with a main channel height of 25 μm (open symbols in FIG. 25*g*), $V/V_w$ was found to decrease with increasing Ca and approached zero at Ca of 0.020 (except for studies with W/w=0). Furthermore, with increasing W/w, the ratio of retained sample volume increased. At a W/w of 0, the sample was only retained at low Ca. This result indicates the requirement for a small main channel overhang to allow the sample to be retained in the fluidic harbor. When the Ca was used as an indicator for retention or no retention of sample in the fluidic harbor, the overall trend was found to be similar between the on-chip and CFD data shown in FIG. 25. The change in volume of the retained droplet can be directly quantified by the CFD data. Therefore, it must be noted that the retention data shown in FIG. 25*f* was based on the samples' cross-sectional area, while in FIG. 25*g*, the entire sample volume of the retained droplet was taken into account.

When $H_m$ increased to 50 μm (grey symbols in FIG. 25*g*), a larger fraction of the digitized sample expanded into the main channel, as the sample droplet filled out the main channel volume above the fluidic harbor (therefore $V/V_w$>>1.0). The sample retention abruptly approached zero at a much lower Ca (~0.0065) when compared to $H_m$ of 25 μm (retention below Ca of 0.020). However, at W/w<0.25, none of the aqueous sample was retained in the fluidic harbor when $H_m$ was 50 μm and for the Ca range used in the CFD study (Ca=0.0016-0.0196).

The results from the CFD study for variations in main channel height indicated that the sample retention and sample digitization were not only dependent on the main channel's overhang (W), but also were greatly affected by the main channel's height. This observation suggested that the pinching of the aqueous solution by the shearing oil phase was dominated by the main channel geometry ($H_m$ and $W_m$). The data also show that if $H_m$ exceeded a critical value, none of the aqueous solution sample can be digitized.

Additional Aspects

In some aspects, the disclosure provides a microfluidic device, comprising a disc-shaped body having a center region and an outer edge, the body being configured for rotating about a central axis and further comprising: a fluid inlet port located in the center region of the disc-shaped body; a flow channel having a proximal end, a distal end, and a flow axis, the flow channel in fluid communication with the fluid inlet port; a plurality of fluidic harbors in fluid communication with the flow channel and offset from the flow axis; and a fluid outlet port in communication with the flow channel, wherein the fluid outlet port is located closer to the center region of the disc-shaped body than the distal end of the flow channel.

In some aspects, the microfluidic device comprises a plurality of flow channels each in fluid communication with the fluid inlet port and the fluid outlet port. In some aspects the plurality of flow channels are configured such that the flow axis of each flow channel is perpendicular to the outer edge of the disc-shaped body. In some aspects, the plurality of flow channels are arranged in parallel. In some aspects, at least one of the plurality of fluidic harbors is at an angle other than orthogonal to the flow axis. In some aspects, each of the plurality of fluidic harbors are in fluid communication with the flow channel by an opening conduit. In some aspects, at least one of the plurality of fluidic harbors further comprises at least one channel in fluid connection with the flow channel. In some aspects, the flow channel and the plurality of fluidic harbors comprise a hydrophobic surface. In some aspects, at least a portion of the disc-shaped body comprises natively hydrophobic or surface treated polydimethylsiloxane (PDMS), polycarbonate (PC), glycol modified polyethylene terephtalate (PETG), cyclic olefin copolymer (COC), cyclic olefin polymer (COP), and multilaminate materials to provide a hydrophobic surface for the flow channel, the plurality of fluidic harbors, or a combination thereof. In some aspects, at least one of the flow channel and the plurality of fluidic harbors comprise a fluorophilic surface. In some aspects, the device is loaded with a primer fluid.

In some aspects, the fluid comprises an aqueous liquid, a fluid immiscible with the aqueous liquid, an organic solvent, a fluorinated oil, a hydrocarbon oil, a silicone oil, a mineral oil, or any other suitable oil. In some aspects, the distal end of each of the plurality of flow channels are in fluid communication with a common fluid reservoir on the device, wherein the common fluid reservoir is in fluid communication with the fluid outlet port. In some aspects, the fluid outlet port is located closer to a center of the disc-shaped body than the fluid inlet port. In some aspects, the fluid outlet port is located farther from a center of the disc-shaped body than the fluid inlet port. In some aspects, the at least one fluid outlet port is located as close to the center of the disc-shaped device as the at least one fluid inlet port. In some aspects, the microfluidic device is comprising a plurality of flow cells, each flow cell comprising a plurality of flow channels and independently including at least one fluid inlet port and at least one fluid outlet port, wherein the at least one fluid outlet port is located closer to the center region of the disc-shaped body than the distal ends of the plurality of flow channels.

In some aspects, the disclosure provides a method of filling a microfluidic device, comprising providing the microfluidic device in claim 1; providing a first fluid to the fluid inlet port. In some aspects, the method comprises rotating the microfluidic device about its central axis to load the first fluid on the microfluidic device. In some aspects, the method comprises applying pressure to the first fluid, wherein the pressure is sufficient to urge the first fluid through the flow channel of the microfluidic device. In some aspects, the pressure is a positive or negative pressure. In some aspects, the microfluidic device is loaded with a primer fluid, and the first fluid comprises an aqueous solution. In some aspects, the method comprises providing a second fluid to the fluid inlet port or a different fluid inlet port on the microfluidic device. In some aspects, the method comprises providing a third fluid to the fluid inlet port or a different fluid inlet port on the microfluidic device. In some aspects, the first fluid comprises an oil and the method further comprises providing a second and third fluid to the fluid inlet port or a different fluid inlet port on the microfluidic device, wherein the second fluid comprises an aqueous solution and the third fluid comprises an oil. In some aspects, the second fluid comprises an analyte and the method further comprises performing analysis of the second fluid within at least one of the plurality of fluidic harbors. In some aspects, the analyte comprises a biological material. In some aspects, the biological material is selected from a cell, a bacteria, a virus, a prion, a nucleic acid, a protein, an expressed product of a genetic material, a crystallizing molecule, or a particle. In some aspects, the second fluid comprises a plurality of nucleic acid molecules and the method comprises distributing at least some of the plurality of nucleic acid molecules in the plurality of fluidic harbors such that no more than one nucleic acid molecule is contained within at least some of the plurality of fluidic harbors. In some aspects, the second fluid comprises a plurality of nucleic acid molecules and the method comprises distributing at least some of the plurality of nucleic acid molecules in the plurality of fluidic harbors such that at least one nucleic acid molecule is contained within at least some of the plurality of fluidic harbors. In some aspects, the method further comprises performing digital polymerase chain reaction (PCR) within the plurality of fluidic harbors. In some aspects, the method further comprises performing isothermal amplification within the plurality of fluidic harbors. In some aspects, the analyte undergoes crystallization in the fluidic harbor. In some aspects, the analyte contains at least one rare cell selected from cells expressing a malignant phenotype, fetal cells, circulating endothelial cells, tumor cells, cells infected with a virus, cells transfected with a gene of interest, a subtype of an immune cell, or T-cells or B-cells present in the peripheral blood of subjects afflicted with autoimmune or autoreactive disorders. In some aspects, the method comprises providing a second fluid to the fluid inlet port or a different fluid inlet port on the microfluidic device, wherein the first fluid comprises an oil and the second fluid comprises an aqueous solution.

In some aspects, the disclosure provides an analytical system comprising a rotation component configured for rotating the microfluidic device of claim 1 about its central axis; an optical detection component configured to optically analyze at least one of the plurality of fluidic harbors of the microfluidic device; and a processing unit configured to controlling rotation component and the optical detection component, and configured for storing data generated from the optical detection component. In some aspects, the analytical system comprises a plurality of fluid reservoirs each capable of containing a fluid, wherein the plurality of fluid reservoirs are configured to provide the fluid to the fluid inlet port of the microfluidic device. In some aspects, the analytical system further comprises a heat-control component configured to apply heat to the plurality of fluidic harbors. In some aspects, the heat control component is configured for heating the plurality of fluidic harbors sufficient to perform polymerase chain reactions. In some aspects, the analytical system further comprises a pressure applying component in fluidic communication with at least one of the plurality of fluid inlet ports, wherein the pressure applying component is configured to apply a pressure sufficient to urge the fluid through the flow channel. In some aspects, the optical detection component is configured to analyze the microfluidic device rotating at between 1 and 5,000 RPM. In some aspects, the rotation component is configured to adjust a speed of rotation of the microfluidic device to match a readout speed of the optical detection component. In some aspects, the analytical system is configured for housing, rotating, and processing a plurality of the microfluidic devices of claim 1.

In some aspects, the disclosure provides a microfluidic device, comprising a microwell plate comprising a plurality of wells, wherein each of the plurality of wells further compromises at least one fluid inlet port in fluid communication with at least one of the plurality of wells; at least one fluid outlet port; at least one flow channel having a flow axis, the flow channel in fluid communication with the at least one fluid inlet port and the at least one fluid outlet port; and a plurality of fluidic harbors in fluid communication with the at least one flow channel and offset from the flow axis. In some aspects, the plurality of fluidic harbors are arranged in an array. In some aspects, the plurality of fluidic harbors are arranged in square matrix array. In some aspects, the plurality of wells are in an array in a 2:3 rectangular matrix. In some aspects, the microfluidic device contains 6, 12, 24, 48, 96, or 384 wells in a standard well plate format. In some aspects, at least one of the plurality of fluidic harbors is at an angle other than orthogonal to the flow axis. In some aspects, at least one of the plurality of fluidic harbors is at an angle orthogonal to the flow axis. In some aspects, each of the plurality of fluidic harbors are in fluid communication with the flow channel by an opening conduit. In some aspects, at least one of the plurality of fluidic harbors comprises at least one channel in fluid connection with the flow channel. In some aspects, the plurality of flow channels and plurality of fluidic harbors comprise a hydrophobic surface. In some aspects, at least a portion of the device comprises natively hydrophobic or surface treated polydimethylsiloxane (PDMS), polycarbonate (PC), glycol modified polyethylene terephtalate (PETG), cyclic olefin copolymer (COC), cyclic olefin polymer (COP), polychlorotrifluoroethylene (PCTFE) and multilaminate materials to provide a hydrophobic surface for the flow channel, the plurality of fluidic harbors, or a combination thereof. The microfluidic device of claim 44, wherein the inlet port is in fluid communication with a fluid. In some aspects, the fluid comprises an aqueous liquid, a fluid immiscible with the aqueous liquid, an organic solvent, a fluorinated oil, a hydrocarbon oil, a silicone oil, or any other suitable oil, or a combination thereof.

In some aspects, the disclosure provides a method of filling a microfluidic flow cell, comprising providing a microfluidic device as recited in claim 44; providing a first fluid to at least one of the plurality of flow channels; applying pressure to at least one of the plurality of wells, wherein the pressure is sufficient to urge the first fluid through at least one of the plurality of flow channels. In some aspects, the method of filling a microfluidic flow cell further comprises providing a second fluid to at least one of the plurality of wells; and applying pressure to at least one of the plurality of wells sufficient to urge the second fluid through at least one of the plurality of flow channels. In some aspects, the second fluid contains an analyte and the method further comprises performing analysis of the second fluid within at least one of the plurality of fluidic harbors. In some aspects, the analyte comprises a biological material. In some aspects, the biological material is selected from a cell, a bacteria, a virus, a prion, a nucleic acid, a protein, an expressed product of a genetic material, a crystallizing molecule, or a particle. In some aspects, the second fluid comprises a plurality of nucleic acid molecules and the method comprises distributing at least some of the plurality of nucleic acid molecules in the plurality of fluidic harbors such that no more than one nucleic acid molecule is contained within at least some of the plurality of fluidic harbors. In some aspects, the second fluid comprises a plurality of nucleic acid molecules and the method comprises distributing at least some of the plurality of nucleic acid molecules in the plurality of fluidic harbors such that at least one nucleic acid molecule is contained within at least some of the plurality of fluidic harbors. In some aspects, the method further comprises performing digital polymerase chain reaction (PCR) within the plurality of fluidic harbors. In some aspects, the method further comprises performing isothermal amplification within the plurality of fluidic harbors. In some aspects, the analyte undergoes crystallization in the fluidic harbor. In some aspects, the analyte contains at least one rare cell selected from cells expressing a malignant phenotype, fetal cells, circulating endothelial cells, tumor cells, cells infected with a virus, cells transfected with a gene of interest, a subtype of an immune cell, or T-cells or B-cells present in the peripheral blood of subjects afflicted with autoimmune or autoreactive disorders. In some aspects, the microfluidic device is loaded with primer fluid, and the first fluid comprises an aqueous solution.

In some aspects, the disclosure provides an analytical system, comprising a chamber configured to accept the microfluidic device of claim 1; a fluid pressuring unit configured to apply pressure to the flow channel, the pressure being sufficient to urge the fluid through the flow channels; an optical detection component for optically analyzing at least one of the plurality of fluidic harbors of the microfluidic device; and a processing unit configured to control the optical detection component, and being configured to store data generated from the optical detection component. In some aspects, the analytical system is further comprising a plurality of fluid reservoirs for containing a fluid wherein the plurality of fluid reservoirs are configured to provide the fluid to the fluid inlet port of the microfluidic device. In some aspects, the analytical system is further comprising a heat-control component configured to apply heat to at least one of the plurality of fluidic harbors. In some aspects, the optical detection component comprises an imaging device. In some aspects, different fluid reservoirs of the plurality of fluid reservoir contain a first fluid and a second fluid. In some aspects, the microfluidic device is loaded with primer fluid, and the first fluid comprises an aqueous solution. In some aspects, the optical detection component is configured to image at least some of the plurality of fluidic harbors containing the aqueous solution. In some aspects, the optical detection component and the processing unit are configured to determine a volume of the aqueous solution in at least some of the plurality of fluidic harbors. In some aspects, each of the plurality of fluidic harbors are in fluid communication with the flow channel by an opening conduit. In some aspects, at least one of the plurality of fluidic harbors comprises at least one channel in fluid connection with the flow channel.

In some aspects the disclosure provides an apparatus comprising a flow channel having a flow axis, an upstream end, and a downstream end; and a plurality of fluidic harbors in fluid communication with the flow channel and offset from the flow axis, wherein each of the plurality of fluidic harbors has an upstream and a downstream end, wherein the flow channel comprises a constriction upstream and/or downstream of each of the plurality of fluidic harbors. In some aspects, the constriction is ⅓ of the width of the largest width of the flow channel. In some aspects, the plurality of fluidic harbors are positioned in a plane below or above a plane of the device comprising the flow channel. In some aspects, the flow channel is in fluid communication with a source of a first fluid and a source of a second fluid immiscible with the first fluid. In some aspects, at least the flow channel and/or the plurality of fluidic harbors is loaded with a first fluid. In some aspects, the each of the plurality of fluidic harbors is tapered on the downstream end. In some aspects the disclosure provides an apparatus comprising a flow channel having a flow axis, an upstream end, and a downstream end, a width, and a height; and a plurality of fluidic harbors, having an upstream end, and a downstream end, a length parallel to the flow axis, a width, and a height, in fluid communication with the flow channel and offset from the flow axis, wherein the width of the flow channel is greater than the width of the plurality of fluidic harbors, and wherein no downstream end of any of the plurality fluidic harbors overlaps with the upstream end of another of the fluidic harbors. In some aspects, the difference between the width of the flow channel and the width of the plurality of fluidic harbors is between 0.001 and 1.5 times the width of the plurality of fluidic harbors. In some aspects, the plurality of fluidic harbors are positioned in a plane below or above a plane of the device comprising the flow channel. In some aspects, the flow channel is in fluid communication with a source of a first fluid and a source of a second fluid immiscible with the first fluid. In some aspects, at least the flow channel and/or the plurality of fluidic harbors is loaded with a first fluid. In some aspects, each of the plurality of fluidic harbors is tapered on the downstream end. In some aspects, the height of the fluidic harbor is greater than the height of the flow channel. In some aspects, the length of the fluidic harbor is greater than the width of the fluidic harbor. In some aspects, the space between the downstream end of a first one of the plurality of fluidic harbors and the upstream end of a second one of the plurality fluidic harbors downstream from the first fluidic harbor is between 0.1 and 3 times the length of the plurality of fluidic harbors.

In some aspects, the disclosure provides an apparatus comprising a flow channel having a flow axis, an upstream end, and a downstream end, a width, and a height; and a plurality of fluidic harbors, having a width and a height, in fluid communication with the flow channel and offset from the flow axis, wherein each of the plurality of fluidic harbors has an upstream and a downstream end, wherein the height of the fluidic harbor is greater than the height of the flow channel. In some aspects, the plurality of fluidic harbors are positioned in a plane below or above a plane of the device comprising the flow channel. In some aspects, the flow channel is in fluid communication with a source of a first fluid and a source of a second fluid immiscible with the first fluid. In some aspects, at least the flow channel and/or the plurality of fluidic harbors is loaded with a first fluid. In some aspects, the each of the plurality of fluidic harbors is tapered on the downstream end. In some aspects, the length of the fluidic harbor is greater than the width of the fluidic harbor. In some aspects, the space between the downstream end of a first one of the plurality of fluidic harbors and the upstream end of a second one of the plurality fluidic harbors downstream from the first fluidic harbor is between 0.1 and 3 times the length of the plurality of fluidic harbors. In some aspects, the width of the flow channel is greater than the width of the plurality of fluidic harbors, and wherein no downstream end of any of the plurality fluidic harbors overlaps with the upstream end of another of the fluidic harbors.

The invention claimed is:

1. A microfluidic device, comprising:

a disc-shaped body comprising a center, a center region, an outer edge, and a radius from the center to the outer edge, the disc-shaped body having a central axis and further comprising:

a fluid inlet port located in the center region of the disc-shaped body;

a flow channel having a proximal end near the center region, a distal end near the outer edge, the flow channel in fluidic communication with the fluid inlet port, wherein the flow channel is substantially straight and continuous from the proximal end to the distal end, and wherein the proximal end and the distal end define a flow axis of the flow channel;

a plurality of fluidic harbors, wherein each fluidic harbor of the plurality of fluidic harbors is directly connected to the flow channel and offset from the flow axis of the flow channel;

a plurality of drainage channels, wherein each drainage channel of the plurality of drainage channels is directly connected to and connects a fluidic harbor of the plurality of fluidic harbors and the flow channel; and a fluid outlet port in fluidic communication with the distal end of the flow channel, wherein the fluid outlet port is located in the center region and closer to the central axis of the disc-shaped body than the distal end of the flow channel, and wherein the fluidic communication between the distal end of the flow channel and the fluid outlet port comprises a channel, wherein the center region comprises a portion of the disc-shaped body from the center to 80% or less of the radius of the disc-shaped body.

2. The microfluidic device of claim 1, further comprising a flow cell, wherein the flow cell comprises the fluid inlet port, the fluid outlet port, and a plurality of the flow channels, wherein each of the flow channels is in fluidic communication with the fluid inlet port and the fluid outlet port.

3. The microfluidic device of claim 2, further comprising a common fluid reservoir, wherein the common fluid reservoir is directly connected to the distal end of each of the flow channels and wherein the common fluid reservoir is separately directly connected to the fluid outlet port.

4. The microfluidic device of claim 2, further comprising a plurality of the flow cells.

5. The microfluidic device of claim 2, wherein the plurality of flow channels is configured such that each flow channel is perpendicular to the outer edge of the disc-shaped body.

6. The microfluidic device of claim 2, wherein the flow channels of the plurality of flow channels are arranged in parallel.

7. The microfluidic device of claim 1, wherein at least one of the fluidic harbors is at an angle other than orthogonal to the flow channel.

8. The microfluidic device of claim 1, wherein at least one of the fluidic harbors is at an angle orthogonal to the flow channel.

9. The microfluidic device of claim 1, wherein each of the fluidic harbors are in fluidic communication with the flow channel by a conduit.

10. The microfluidic device of claim 1, wherein at least one of the fluidic harbors further comprises at least one channel in fluidic communication with the flow channel.

11. The microfluidic device of claim 1, wherein at least one of the flow channel and the plurality of fluidic harbors comprise a hydrophobic surface.

12. The microfluidic device of claim 1, wherein at least one of the flow channel and the plurality of fluidic harbors comprise a fluorophilic surface.

13. The microfluidic device of claim 1, wherein the fluid outlet port is located closer to a center of the disc-shaped body than the fluid inlet port.

14. The microfluidic device of claim 1, wherein the fluid outlet port is located farther from a center of the disc-shaped body than the fluid inlet port.

15. The microfluidic device of claim 1, wherein the fluid outlet port is located as close to a center of the disc-shaped device as the fluid inlet port.

16. The microfluidic device of claim 1, further comprising a plurality of flow cells, wherein each flow cell comprises:

a plurality of flow channels;

a fluid inlet port; and a fluid outlet port, wherein the fluid outlet port is located closer to the center region of the disc-shaped body than the distal ends of the flow channels.

17. The microfluidic device of claim 16, wherein each of the flow cells comprises a plurality of the fluid inlet ports, a plurality of the fluid outlet ports, or a combination thereof.

18. The microfluidic device of claim 1, wherein the disc-shaped body defines an aperture shaped to receive rotational motion from a rotation component of an optical disc drive to rotate the microfluidic device about the central axis of the microfluidic device.

19. The microfluidic device of claim 1, wherein fluid harbors of the plurality of fluidic harbors are positioned on a bottom of the flow channel.

20. The microfluidic device of claim 1, wherein each fluidic harbor of the plurality of fluidic harbors defines an opening directly connected to the flow channel, and wherein a first end of each drainage channel of the plurality of drainage channels is directly connected to and in fluidic communication with the flow channel at a position of the flow channel different from the opening.

21. The microfluidic device of claim 20, wherein a second end of each drainage channel of the plurality of drainage channels is directly connected to a fluidic harbor of the plurality of fluidic harbors at a portion of the fluidic harbor different than the opening.

22. The microfluidic device of claim 20, wherein each fluidic harbor of the plurality of fluidic harbors is directly connected to two or more drainage channels of the plurality of drainage channels, and wherein each of the two or more drainage channels are directly connected to the flow channel.

* * * * *